US008616958B2

(12) United States Patent
Hermansen et al.

(10) Patent No.: US 8,616,958 B2
(45) Date of Patent: Dec. 31, 2013

(54) DISCOVERY METHOD AND SYSTEM FOR DYNAMICALLY LOCATING NETWORKED GAMING COMPONENTS AND RESOURCES

(75) Inventors: William Dale Hermansen, Reno, NV (US); David L Salls, Reno, NV (US); Peter D Miles, Reno, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 1568 days.

(21) Appl. No.: 12/113,139

(22) Filed: Apr. 30, 2008

(65) Prior Publication Data

US 2009/0163279 A1    Jun. 25, 2009

Related U.S. Application Data

(60) Provisional application No. 60/987,338, filed on Nov. 12, 2007.

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC ............ 463/23; 463/39; 463/40; 463/41; 463/42; 709/207; 709/209; 709/210; 709/213; 709/203

(58) Field of Classification Search
USPC ............ 463/23, 42; 345/744, 738, 753, 765; 709/207, 209, 210, 213, 203
See application file for complete search history.

(56) References Cited

U.S. PATENT DOCUMENTS

| | | | |
|---|---|---|---|
| 4,339,798 A | 7/1982 | Hedges et al. | 364/412 |
| 5,007,649 A | 4/1991 | Richardson | |
| 5,083,800 A | 1/1992 | Lockton | 273/439 |
| 5,275,400 A | 1/1994 | Weingardt et al. | 273/85 CP |
| 5,321,241 A | 6/1994 | Craine | 235/380 |
| 5,324,035 A | 6/1994 | Morris et al. | 273/138 A |
| 5,326,104 A | 7/1994 | Pease et al. | 273/138 A |
| 5,398,932 A | 3/1995 | Eberhardt et al. | 273/138 A |
| 5,472,194 A | 12/1995 | Breeding et al. | 273/138 A |
| 5,505,449 A | 4/1996 | Eberhardt et al. | 273/138 A |
| 5,562,284 A | 10/1996 | Stevens | 273/139 |

(Continued)

FOREIGN PATENT DOCUMENTS

| | | |
|---|---|---|
| DE | 199 40 954 A1 | 3/2001 |
| EP | 1 074 955 A2 | 2/2001 |

(Continued)

OTHER PUBLICATIONS

"BOB and LDAP," Gaming Standards Association, Fremont, California, 7 pages, Oct. 26, 2003.

(Continued)

*Primary Examiner* — Omkar Deodhar
*Assistant Examiner* — Adetokunbo O Torimiro
(74) *Attorney, Agent, or Firm* — Frank Abramonte; Fearon Brown; Marvin Hein

(57) ABSTRACT

A slot management system including a download and configuration server-based sub-system and method is disclosed for use with game devices, systems, and methods is provided to enable users to monitor, control, and modify game devices and other related activities. A services discovery system and method is provided for providing dynamic access to gaming resources, services, and other components.

22 Claims, 32 Drawing Sheets

(56) References Cited

U.S. PATENT DOCUMENTS

| | | | |
|---|---|---|---|
| 5,605,334 A | 2/1997 | McCrea, Jr. | 273/309 |
| 5,605,506 A | 2/1997 | Hoorn et al. | 463/47 |
| 5,613,912 A | 3/1997 | Slater | 463/25 |
| 5,643,086 A | 7/1997 | Alcorn et al. | 463/29 |
| 5,655,961 A | 8/1997 | Acres et al. | 463/27 |
| 5,707,287 A | 1/1998 | McCrea, Jr. | 463/27 |
| 5,741,183 A | 4/1998 | Acres et al. | 463/42 |
| 5,745,110 A | 4/1998 | Ertemalp | 345/340 |
| 5,759,102 A | 6/1998 | Pease et al. | 463/42 |
| 5,770,533 A | 6/1998 | Franchi | 463/42 |
| 5,779,545 A | 7/1998 | Berg et al. | 463/22 |
| 5,800,268 A | 9/1998 | Molnick | 463/40 |
| 5,813,912 A | 9/1998 | Shultz | 463/25 |
| 5,823,879 A | 10/1998 | Goldberg et al. | 463/42 |
| 5,830,067 A | 11/1998 | Graves et al. | 463/40 |
| 5,830,068 A | 11/1998 | Brenner et al. | 463/42 |
| 5,851,149 A | 12/1998 | Xidos et al. | 463/42 |
| 5,890,963 A | 4/1999 | Yen | 463/42 |
| 5,911,626 A | 6/1999 | McCrea, Jr. | 463/27 |
| 5,957,776 A | 9/1999 | Hoehne | 463/25 |
| 5,971,851 A | 10/1999 | Pascal et al. | 463/24 |
| 5,999,808 A | 12/1999 | LaDue | 455/412 |
| 6,001,016 A | 12/1999 | Walker et al. | 463/42 |
| 6,047,322 A * | 4/2000 | Vaid et al. | 709/224 |
| 6,068,553 A | 5/2000 | Parker | 463/27 |
| 6,077,161 A | 6/2000 | Wisler | 463/11 |
| 6,080,063 A | 6/2000 | Khosla | 463/42 |
| 6,089,980 A | 7/2000 | Gauselmann | 463/27 |
| 6,093,103 A | 7/2000 | McCrea, Jr. | 463/27 |
| 6,102,799 A | 8/2000 | Stupak | 463/27 |
| 6,110,041 A | 8/2000 | Walker et al. | 463/20 |
| 6,110,043 A | 8/2000 | Olsen | 463/27 |
| 6,117,012 A | 9/2000 | McCrea, Jr. | 463/27 |
| 6,135,887 A | 10/2000 | Pease et al. | 463/42 |
| 6,146,273 A | 11/2000 | Olsen | 463/27 |
| 6,149,522 A | 11/2000 | Alcorn et al. | 463/29 |
| 6,152,824 A | 11/2000 | Rothschild et al. | 463/42 |
| 6,168,523 B1 | 1/2001 | Piechowiak et al. | 463/26 |
| 6,183,366 B1 | 2/2001 | Goldberg et al. | 463/42 |
| 6,185,184 B1 * | 2/2001 | Mattaway et al. | 370/230 |
| 6,186,892 B1 | 2/2001 | Frank et al. | 463/19 |
| 6,210,277 B1 | 4/2001 | Stefan | 463/27 |
| 6,217,447 B1 | 4/2001 | Lofink et al. | 463/12 |
| 6,219,836 B1 | 4/2001 | Wells et al. | 717/11 |
| 6,244,958 B1 | 6/2001 | Acres | 463/26 |
| 6,251,014 B1 | 6/2001 | Stockdale et al. | 463/16 |
| 6,254,483 B1 | 7/2001 | Acres | |
| 6,254,484 B1 | 7/2001 | McCrea, Jr. | 463/27 |
| 6,264,561 B1 | 7/2001 | Saffari et al. | 463/42 |
| 6,287,202 B1 | 9/2001 | Pascal et al. | 463/42 |
| 6,302,793 B1 | 10/2001 | Fertitta, III et al. | 463/25 |
| 6,312,332 B1 | 11/2001 | Walker et al. | 463/23 |
| 6,346,044 B1 | 2/2002 | McCrea, Jr. | 463/27 |
| 6,362,836 B1 * | 3/2002 | Shaw et al. | 715/744 |
| 6,383,076 B1 | 5/2002 | Tiedeken | 463/40 |
| 6,389,126 B1 | 5/2002 | Bjornberg et al. | |
| 6,394,900 B1 | 5/2002 | McGlone et al. | 463/20 |
| 6,400,272 B1 | 6/2002 | Holtzman et al. | 340/572.1 |
| 6,401,099 B1 | 6/2002 | Koppolu et al. | |
| 6,409,602 B1 | 6/2002 | Wiltshire et al. | 463/42 |
| 6,443,839 B2 | 9/2002 | Stockdale et al. | 463/16 |
| 6,459,882 B1 | 10/2002 | Palermo | 455/41 |
| 6,464,584 B2 | 10/2002 | Oliver | 463/25 |
| 6,490,285 B2 | 12/2002 | Lee et al. | |
| 6,503,147 B1 | 1/2003 | Stockdale et al. | 463/29 |
| 6,505,772 B1 | 1/2003 | Mollett et al. | 235/379 |
| 6,508,710 B1 | 1/2003 | Paravia et al. | 463/42 |
| 6,516,350 B1 * | 2/2003 | Lumelsky et al. | 709/226 |
| 6,527,638 B1 | 3/2003 | Walker et al. | |
| 6,607,441 B1 | 8/2003 | Acres | 463/25 |
| 6,609,978 B1 | 8/2003 | Paulsen | 463/42 |
| 6,629,184 B1 | 9/2003 | Berg et al. | 710/306 |
| 6,638,170 B1 | 10/2003 | Crumby | 463/42 |
| 6,645,077 B2 | 11/2003 | Rowe | 463/42 |
| 6,652,378 B2 | 11/2003 | Cannon et al. | 463/20 |
| 6,656,048 B2 | 12/2003 | Olsen | 463/25 |
| 6,675,152 B1 | 1/2004 | Prasad et al. | 705/64 |
| 6,676,522 B2 | 1/2004 | Rowe et al. | 463/42 |
| 6,682,421 B1 | 1/2004 | Rowe et al. | 463/25 |
| 6,682,423 B2 | 1/2004 | Brosnan et al. | 463/29 |
| 6,685,564 B2 | 2/2004 | Oliver | 463/25 |
| 6,685,567 B2 | 2/2004 | Cockerille et al. | 463/43 |
| 6,699,128 B1 | 3/2004 | Beadell et al. | 463/46 |
| 6,702,291 B2 | 3/2004 | Grebler et al. | 273/292 |
| 6,712,695 B2 | 3/2004 | Mothwurf et al. | 463/25 |
| 6,718,361 B1 | 4/2004 | Basani et al. | 709/201 |
| 6,722,985 B2 | 4/2004 | Criss-Puszkiewicz et al. | |
| 6,743,102 B1 | 6/2004 | Fiechter et al. | 463/42 |
| 6,746,330 B2 | 6/2004 | Cannon | 463/25 |
| 6,755,741 B1 | 6/2004 | Rafaeli | 463/25 |
| 6,800,029 B2 | 10/2004 | Rowe et al. | 463/25 |
| 6,811,488 B2 | 11/2004 | Paravia et al. | 463/42 |
| 6,817,948 B2 | 11/2004 | Pascal et al. | 463/42 |
| 6,823,419 B2 | 11/2004 | Berg et al. | 710/306 |
| 6,837,789 B2 | 1/2005 | Garahi et al. | 463/29 |
| 6,848,994 B1 | 2/2005 | Knust et al. | 463/25 |
| 6,866,581 B2 | 3/2005 | Martinek et al. | 463/16 |
| 6,884,173 B2 | 4/2005 | Gauselmann | 463/42 |
| 6,884,174 B2 | 4/2005 | Lundy et al. | 463/42 |
| 6,896,618 B2 | 5/2005 | Benoy et al. | 463/25 |
| 6,899,627 B2 | 5/2005 | Lam et al. | 463/40 |
| 6,908,387 B2 | 6/2005 | Hedrick et al. | 463/31 |
| 6,971,956 B2 | 12/2005 | Rowe et al. | 463/25 |
| 6,972,682 B2 | 12/2005 | Lareau et al. | 340/568.1 |
| 6,993,587 B1 | 1/2006 | Basani et al. | 709/229 |
| 6,997,803 B2 | 2/2006 | LeMay et al. | 463/20 |
| 7,013,469 B2 * | 3/2006 | Smith et al. | 719/328 |
| 7,025,674 B2 | 4/2006 | Adams et al. | 463/1 |
| 7,050,056 B2 | 5/2006 | Meyringer | 345/440 |
| 7,062,470 B2 | 6/2006 | Prasad et al. | 705/64 |
| 7,086,947 B2 | 8/2006 | Walker et al. | 463/25 |
| 7,099,035 B2 | 8/2006 | Brooks et al. | 358/1.15 |
| 7,100,184 B1 | 8/2006 | Kahn | |
| 7,112,138 B2 | 9/2006 | Hedrick et al. | 463/29 |
| 7,147,558 B2 | 12/2006 | Giobbi | 463/25 |
| 7,168,089 B2 | 1/2007 | Nguyen et al. | 726/4 |
| 7,186,181 B2 | 3/2007 | Rowe | 463/42 |
| RE39,644 E | 5/2007 | Alcorn et al. | 380/251 |
| 7,291,068 B2 | 11/2007 | Bryant et al. | 463/25 |
| 7,297,062 B2 | 11/2007 | Gatto et al. | |
| 7,309,065 B2 | 12/2007 | Yoseloff et al. | 273/292 |
| 7,311,605 B2 | 12/2007 | Moser | 463/25 |
| 7,329,185 B2 | 2/2008 | Conover et al. | 463/25 |
| 7,330,822 B1 | 2/2008 | Robson et al. | 705/9 |
| 7,331,520 B2 | 2/2008 | Silva et al. | 235/381 |
| 7,337,330 B2 | 2/2008 | Gatto et al. | |
| 7,346,682 B2 | 3/2008 | Basani et al. | 709/224 |
| 7,349,920 B1 | 3/2008 | Feinberg et al. | 707/102 |
| 7,351,147 B2 | 4/2008 | Stockdale et al. | 463/29 |
| 7,356,770 B1 | 4/2008 | Jackson | 715/736 |
| 7,363,342 B1 | 4/2008 | Wang et al. | 709/204 |
| 7,364,510 B2 | 4/2008 | Walker et al. | 463/42 |
| 7,370,282 B2 | 5/2008 | Cary | 715/772 |
| 7,384,339 B2 | 6/2008 | LeMay et al. | 463/30 |
| 7,419,428 B2 | 9/2008 | Rowe | 463/25 |
| 7,427,236 B2 | 9/2008 | Kaminkow et al. | 463/26 |
| 7,434,805 B2 | 10/2008 | Grauzer et al. | 273/149 R |
| 7,438,643 B2 | 10/2008 | Brosnan et al. | 463/42 |
| 7,455,591 B2 | 11/2008 | Nguyen | 463/42 |
| 7,460,863 B2 | 12/2008 | Steelberg et al. | 455/419 |
| 7,465,231 B2 | 12/2008 | Lewin et al. | 463/37 |
| 7,473,178 B2 | 1/2009 | Boyd et al. | 463/25 |
| 7,483,394 B2 | 1/2009 | Chang et al. | 370/254 |
| 7,484,207 B2 | 1/2009 | Sato | |
| 7,515,718 B2 | 4/2009 | Nguyen et al. | 380/278 |
| 7,534,169 B2 | 5/2009 | Amaitis et al. | 463/39 |
| 7,537,216 B2 | 5/2009 | Soltys et al. | 273/149 P |
| 7,549,576 B2 | 6/2009 | Alderucci et al. | 235/380 |
| 7,566,274 B2 | 7/2009 | Johnson et al. | |
| 7,575,234 B2 | 8/2009 | Soltys | 273/149 R |
| 7,585,217 B2 | 9/2009 | Lutnick et al. | 463/16 |
| 7,611,407 B1 | 11/2009 | Itkis et al. | 463/29 |
| 7,611,409 B2 | 11/2009 | Muir et al. | 463/29 |
| 7,617,151 B2 | 11/2009 | Rowe | 705/39 |

(56) References Cited

U.S. PATENT DOCUMENTS

| | | | |
|---|---|---|---|
| 7,618,317 B2 | 11/2009 | Jackson | 463/24 |
| 7,648,414 B2 | 1/2010 | McNutt et al. | 463/25 |
| 7,670,225 B2 | 3/2010 | Nishimura | |
| 7,674,179 B2 | 3/2010 | Baerlocher et al. | 463/27 |
| 7,682,249 B2 | 3/2010 | Winans et al. | 463/31 |
| 7,699,703 B2 | 4/2010 | Muir et al. | 463/29 |
| 7,702,719 B1 | 4/2010 | Betz et al. | |
| 7,706,895 B2 | 4/2010 | Callaghan | |
| 7,730,198 B2 | 6/2010 | Ruppert et al. | 709/230 |
| 7,747,741 B2 | 6/2010 | Basani et al. | 709/224 |
| 7,769,877 B2 | 8/2010 | McBride et al. | 709/230 |
| 7,778,635 B2 | 8/2010 | Crookham et al. | 455/426.1 |
| 7,780,526 B2 | 8/2010 | Nguyen et al. | 463/29 |
| 7,780,529 B2 | 8/2010 | Rowe et al. | 463/42 |
| 7,785,204 B2 | 8/2010 | Wells et al. | |
| 7,805,719 B2 | 9/2010 | O'Neill | |
| 7,841,946 B2 | 11/2010 | Walker et al. | 463/42 |
| 7,846,020 B2 | 12/2010 | Walker et al. | 463/29 |
| 7,850,528 B2 | 12/2010 | Wells | 463/42 |
| 7,862,425 B2 | 1/2011 | Cavagna | 463/25 |
| 7,867,081 B2 | 1/2011 | Schneider et al. | 463/25 |
| 7,874,920 B2 | 1/2011 | Hornik et al. | 463/42 |
| 7,874,921 B2 | 1/2011 | Baszucki et al. | 463/43 |
| 7,886,288 B2 | 2/2011 | Breckner et al. | |
| 7,898,679 B2 | 3/2011 | Brack et al. | 358/1.15 |
| 7,901,294 B2 | 3/2011 | Walker et al. | 463/42 |
| 7,908,486 B2 | 3/2011 | Gatto et al. | |
| 7,918,735 B2 | 4/2011 | Inamura | |
| 7,937,464 B2 | 5/2011 | Ruppert et al. | 709/224 |
| 8,025,574 B2 | 9/2011 | Hilbert | |
| 8,028,046 B2 | 9/2011 | Elliott et al. | 709/220 |
| 8,051,180 B2 | 11/2011 | Mazzaferri et al. | |
| 8,073,657 B2 | 12/2011 | Moore, III et al. | |
| 8,100,753 B2 | 1/2012 | Soltys | |
| 8,117,461 B2 | 2/2012 | Bigelow, Jr. et al. | |
| 8,197,344 B2 | 6/2012 | Rathsack et al. | |
| 8,201,229 B2 | 6/2012 | Ruppert et al. | |
| 8,280,777 B2 | 10/2012 | Mengerink et al. | |
| 8,285,740 B2 | 10/2012 | Graham et al. | |
| 8,308,554 B2 | 11/2012 | Rowe et al. | |
| 2001/0019966 A1 | 9/2001 | Idaka | 463/40 |
| 2002/0004824 A1 | 1/2002 | Cuan et al. | |
| 2002/0062375 A1* | 5/2002 | Teodosiu et al. | 709/226 |
| 2002/0111213 A1 | 8/2002 | McEntee et al. | 463/42 |
| 2002/0113371 A1 | 8/2002 | Snow | 273/292 |
| 2002/0115487 A1 | 8/2002 | Wells | 463/42 |
| 2002/0142825 A1 | 10/2002 | Lark et al. | 463/16 |
| 2002/0142844 A1 | 10/2002 | Kerr | 463/42 |
| 2003/0004871 A1 | 1/2003 | Rowe | 705/39 |
| 2003/0032474 A1 | 2/2003 | Kaminkow | 463/25 |
| 2003/0042679 A1 | 3/2003 | Snow | 273/292 |
| 2003/0064798 A1 | 4/2003 | Grauzer et al. | 463/29 |
| 2003/0075869 A1 | 4/2003 | Breeding et al. | 273/292 |
| 2003/0078103 A1 | 4/2003 | LeMay et al. | 463/43 |
| 2003/0090064 A1 | 5/2003 | Hoyt et al. | 273/292 |
| 2003/0130024 A1 | 7/2003 | Darby | 463/13 |
| 2003/0182414 A1 | 9/2003 | O'Neill | |
| 2003/0206548 A1 | 11/2003 | Bannai et al. | 370/389 |
| 2003/0224858 A1 | 12/2003 | Yoseloff et al. | 463/42 |
| 2003/0228912 A1 | 12/2003 | Wells et al. | 463/43 |
| 2003/0232651 A1 | 12/2003 | Huard et al. | 463/42 |
| 2004/0002386 A1 | 1/2004 | Wolfe et al. | 463/42 |
| 2004/0002388 A1 | 1/2004 | Larsen et al. | 463/43 |
| 2004/0029635 A1 | 2/2004 | Giobbi | 463/30 |
| 2004/0043815 A1 | 3/2004 | Kaminkow | 463/25 |
| 2004/0043820 A1 | 3/2004 | Schlottmann | 463/43 |
| 2004/0048671 A1 | 3/2004 | Rowe | 463/42 |
| 2004/0068654 A1 | 4/2004 | Cockerille et al. | 713/168 |
| 2004/0082385 A1 | 4/2004 | Silva et al. | 463/40 |
| 2004/0106452 A1 | 6/2004 | Nguyen et al. | 463/42 |
| 2004/0110119 A1 | 6/2004 | Riconda et al. | 434/350 |
| 2004/0127291 A1 | 7/2004 | George et al. | 463/42 |
| 2004/0133485 A1 | 7/2004 | Schoonmaker et al. | 705/30 |
| 2004/0142744 A1 | 7/2004 | Atkinson et al. | 463/29 |
| 2004/0166918 A1 | 8/2004 | Walker et al. | 463/16 |
| 2004/0166940 A1 | 8/2004 | Rothschild | 463/42 |
| 2004/0185936 A1 | 9/2004 | Block et al. | 463/42 |
| 2004/0229684 A1 | 11/2004 | Blackburn et al. | |
| 2004/0254010 A1 | 12/2004 | Fine | 463/25 |
| 2004/0254993 A1 | 12/2004 | Mamas | |
| 2005/0043094 A1 | 2/2005 | Nguyen et al. | 463/42 |
| 2005/0054438 A1 | 3/2005 | Rothschild et al. | 463/29 |
| 2005/0054445 A1 | 3/2005 | Gatto et al. | 463/42 |
| 2005/0055113 A1 | 3/2005 | Gauselmann | 700/91 |
| 2005/0070358 A1 | 3/2005 | Angell et al. | 463/39 |
| 2005/0080898 A1 | 4/2005 | Block | |
| 2005/0114534 A1 | 5/2005 | Lee | 709/320 |
| 2005/0119052 A1 | 6/2005 | Russell et al. | 463/42 |
| 2005/0143166 A1 | 6/2005 | Walker et al. | 463/25 |
| 2005/0153778 A1 | 7/2005 | Nelson et al. | 463/42 |
| 2005/0181856 A1 | 8/2005 | Cannon et al. | 463/16 |
| 2005/0181864 A1 | 8/2005 | Britt et al. | 463/25 |
| 2005/0192099 A1 | 9/2005 | Nguyen et al. | |
| 2005/0221882 A1 | 10/2005 | Nguyen et al. | 463/16 |
| 2005/0222891 A1 | 10/2005 | Chan et al. | 705/9 |
| 2005/0239542 A1 | 10/2005 | Olsen | 463/27 |
| 2005/0240663 A1 | 10/2005 | Wolber et al. | 709/220 |
| 2005/0282626 A1 | 12/2005 | Manfredi et al. | 463/25 |
| 2006/0004618 A1 | 1/2006 | Brixius | 705/8 |
| 2006/0009282 A1 | 1/2006 | George et al. | 463/29 |
| 2006/0015716 A1 | 1/2006 | Thornton et al. | 713/155 |
| 2006/0026499 A1 | 2/2006 | Weddle | 715/503 |
| 2006/0035707 A1 | 2/2006 | Nguyen et al. | 463/29 |
| 2006/0035713 A1 | 2/2006 | Cockerille et al. | |
| 2006/0066444 A1 | 3/2006 | Steeves | 340/10.5 |
| 2006/0079310 A1 | 4/2006 | Friedman et al. | 463/16 |
| 2006/0116208 A1 | 6/2006 | Chen et al. | 463/43 |
| 2006/0121970 A1 | 6/2006 | Khal | 463/16 |
| 2006/0183541 A1 | 8/2006 | Okada et al. | 463/29 |
| 2006/0195847 A1 | 8/2006 | Amano et al. | 718/103 |
| 2006/0196686 A1 | 9/2006 | Gatto et al. | |
| 2006/0205508 A1 | 9/2006 | Green | 463/40 |
| 2006/0247013 A1 | 11/2006 | Walker et al. | 463/20 |
| 2006/0247057 A1 | 11/2006 | Green et al. | 463/42 |
| 2006/0248161 A1 | 11/2006 | O'Brien et al. | 709/217 |
| 2006/0253702 A1 | 11/2006 | Lowell et al. | |
| 2006/0259604 A1 | 11/2006 | Kotchavi et al. | |
| 2006/0277487 A1 | 12/2006 | Poulsen et al. | 715/772 |
| 2006/0281556 A1 | 12/2006 | Solomon et al. | 463/43 |
| 2006/0287077 A1 | 12/2006 | Grav et al. | 463/27 |
| 2006/0287098 A1 | 12/2006 | Morrow et al. | |
| 2007/0006329 A1 | 1/2007 | Morrow et al. | 726/34 |
| 2007/0015583 A1 | 1/2007 | Tran | 463/40 |
| 2007/0026935 A1 | 2/2007 | Wolf et al. | 463/25 |
| 2007/0032288 A1 | 2/2007 | Nelson et al. | |
| 2007/0033247 A1 | 2/2007 | Martin | 709/201 |
| 2007/0054740 A1 | 3/2007 | Salls et al. | 463/42 |
| 2007/0057469 A1 | 3/2007 | Grauzer et al. | 273/309 |
| 2007/0060259 A1 | 3/2007 | Pececnik | 463/16 |
| 2007/0060307 A1 | 3/2007 | Mathis et al. | 463/25 |
| 2007/0060365 A1 | 3/2007 | Tien et al. | 463/42 |
| 2007/0077990 A1 | 4/2007 | Cuddy et al. | 463/25 |
| 2007/0077995 A1 | 4/2007 | Oak et al. | 463/42 |
| 2007/0082737 A1 | 4/2007 | Morrow et al. | 463/42 |
| 2007/0093298 A1 | 4/2007 | Brunet | 463/42 |
| 2007/0105628 A1 | 5/2007 | Arbogast et al. | 463/42 |
| 2007/0111775 A1 | 5/2007 | Yoseloff | 463/16 |
| 2007/0111791 A1 | 5/2007 | Arbogast et al. | 463/40 |
| 2007/0111794 A1 | 5/2007 | Hogan et al. | 463/42 |
| 2007/0117608 A1 | 5/2007 | Roper et al. | 463/16 |
| 2007/0124483 A1 | 5/2007 | Marples et al. | 709/228 |
| 2007/0129145 A1 | 6/2007 | Blackburn et al. | 463/42 |
| 2007/0150329 A1 | 6/2007 | Brook et al. | 705/8 |
| 2007/0155490 A1 | 7/2007 | Phillips et al. | 463/29 |
| 2007/0167235 A1 | 7/2007 | Naicker | 463/42 |
| 2007/0191102 A1 | 8/2007 | Coliz et al. | 463/42 |
| 2007/0192748 A1 | 8/2007 | Martin et al. | 715/856 |
| 2007/0198418 A1 | 8/2007 | MacDonald et al. | 705/52 |
| 2007/0207850 A1 | 9/2007 | Darrah et al. | 463/20 |
| 2007/0208816 A1 | 9/2007 | Baldwin et al. | 709/206 |
| 2007/0214030 A1 | 9/2007 | Shear et al. | |
| 2007/0218998 A1 | 9/2007 | Arbogast et al. | 463/42 |
| 2007/0235521 A1 | 10/2007 | Mateen et al. | 235/379 |
| 2007/0243925 A1 | 10/2007 | LeMay et al. | 463/20 |

(56) References Cited

U.S. PATENT DOCUMENTS

| | | | |
|---|---|---|---|
| 2007/0243927 A1 | 10/2007 | Soltys | 463/25 |
| 2007/0243935 A1 | 10/2007 | Huizinga | 463/42 |
| 2007/0259709 A1 | 11/2007 | Kelly et al. | 463/20 |
| 2007/0259711 A1 | 11/2007 | Thomas | 463/22 |
| 2007/0287535 A1 | 12/2007 | Soltys | 463/29 |
| 2007/0298868 A1 | 12/2007 | Soltys | 463/25 |
| 2008/0004108 A1 | 1/2008 | Klinkhammer | 463/29 |
| 2008/0009344 A1 | 1/2008 | Graham et al. | 463/25 |
| 2008/0026832 A1 | 1/2008 | Stevens et al. | 463/26 |
| 2008/0026848 A1 | 1/2008 | Byng | 463/42 |
| 2008/0038035 A1 | 2/2008 | Shuldman et al. | 400/76 |
| 2008/0045341 A1 | 2/2008 | Englman | 463/42 |
| 2008/0045342 A1 | 2/2008 | Crowder, Jr. et al. | |
| 2008/0045344 A1 | 2/2008 | Schlottmann et al. | 463/25 |
| 2008/0064501 A1 | 3/2008 | Patel | 463/40 |
| 2008/0065590 A1 | 3/2008 | Castro et al. | |
| 2008/0076572 A1 | 3/2008 | Nguyen et al. | 463/42 |
| 2008/0085772 A1 | 4/2008 | Iddings et al. | |
| 2008/0090651 A1 | 4/2008 | Baerlocher | 463/27 |
| 2008/0096659 A1 | 4/2008 | Kreloff et al. | 463/39 |
| 2008/0102919 A1 | 5/2008 | Rowe et al. | |
| 2008/0108405 A1 | 5/2008 | Brosnan et al. | |
| 2008/0108433 A1 | 5/2008 | DiMichele et al. | 463/40 |
| 2008/0113764 A1 | 5/2008 | Soltys | 463/22 |
| 2008/0113773 A1 | 5/2008 | Johnson et al. | 463/25 |
| 2008/0119284 A1 | 5/2008 | Luciano, Jr. et al. | 463/42 |
| 2008/0127174 A1 | 5/2008 | Johnson | |
| 2008/0146337 A1 | 6/2008 | Halonen et al. | 463/42 |
| 2008/0153599 A1 | 6/2008 | Atashband et al. | 463/42 |
| 2008/0153600 A1 | 6/2008 | Swarna | 463/43 |
| 2008/0154916 A1 | 6/2008 | Atashband | 707/10 |
| 2008/0155665 A1* | 6/2008 | Ruppert et al. | 726/5 |
| 2008/0162729 A1 | 7/2008 | Ruppert | 709/249 |
| 2008/0171588 A1 | 7/2008 | Atashband | 463/20 |
| 2008/0171598 A1 | 7/2008 | Deng | 463/40 |
| 2008/0200255 A1 | 8/2008 | Eisele | 463/42 |
| 2008/0243697 A1 | 10/2008 | Irving et al. | 705/54 |
| 2008/0244565 A1 | 10/2008 | Levidow et al. | |
| 2008/0261701 A1 | 10/2008 | Lewin et al. | 463/43 |
| 2008/0287197 A1 | 11/2008 | Ruppert et al. | 463/42 |
| 2008/0293494 A1 | 11/2008 | Adiraju et al. | 463/42 |
| 2008/0311971 A1 | 12/2008 | Dean | 463/20 |
| 2008/0313282 A1 | 12/2008 | Warila et al. | |
| 2008/0318685 A9 | 12/2008 | Oak et al. | 463/42 |
| 2009/0005176 A1 | 1/2009 | Morrow et al. | 463/43 |
| 2009/0005177 A1 | 1/2009 | Kishi et al. | |
| 2009/0011833 A1 | 1/2009 | Seelig et al. | 463/42 |
| 2009/0029775 A1 | 1/2009 | Ruppert et al. | 463/42 |
| 2009/0069076 A1 | 3/2009 | Silvestro | 463/25 |
| 2009/0115133 A1 | 5/2009 | Kelly et al. | 273/274 |
| 2009/0117994 A1 | 5/2009 | Kelly et al. | 463/25 |
| 2009/0118001 A1 | 5/2009 | Kelly et al. | 463/29 |
| 2009/0118005 A1 | 5/2009 | Kelly et al. | 463/31 |
| 2009/0118006 A1 | 5/2009 | Kelly et al. | 463/31 |
| 2009/0124329 A1 | 5/2009 | Palmisano | 463/20 |
| 2009/0124392 A1 | 5/2009 | Ruppert et al. | 463/42 |
| 2009/0124394 A1 | 5/2009 | Swarna | 463/43 |
| 2009/0125603 A1 | 5/2009 | Atashband et al. | 709/207 |
| 2009/0131144 A1 | 5/2009 | Allen | 463/20 |
| 2009/0131163 A1 | 5/2009 | Arbogast et al. | 463/29 |
| 2009/0132720 A1 | 5/2009 | Ruppert et al. | 709/231 |
| 2009/0170594 A1 | 7/2009 | Delaney et al. | 463/25 |
| 2009/0176556 A1 | 7/2009 | Gagner et al. | 463/25 |
| 2009/0176580 A1 | 7/2009 | Herrmann et al. | 463/43 |
| 2009/0181776 A1 | 7/2009 | Deng | 463/42 |
| 2009/0253483 A1 | 10/2009 | Pacey et al. | 463/20 |
| 2009/0270170 A1 | 10/2009 | Patton | 463/36 |
| 2009/0275394 A1 | 11/2009 | Young et al. | 463/25 |
| 2009/0275400 A1 | 11/2009 | Rehm et al. | 463/27 |
| 2009/0275401 A1 | 11/2009 | Allen et al. | 463/29 |
| 2009/0275402 A1 | 11/2009 | Backover et al. | 463/29 |
| 2009/0276341 A1 | 11/2009 | McMahan et al. | 705/30 |
| 2009/0298583 A1 | 12/2009 | Jones | 463/29 |
| 2009/0307069 A1 | 12/2009 | Meyerhofer | 705/14.12 |
| 2010/0016067 A1 | 1/2010 | White et al. | 463/25 |
| 2010/0016068 A1 | 1/2010 | White et al. | 463/25 |
| 2010/0029385 A1 | 2/2010 | Garvey et al. | 463/35 |
| 2010/0048291 A1 | 2/2010 | Warkentin | 463/25 |
| 2010/0058320 A1 | 3/2010 | Milligan et al. | |
| 2010/0093440 A1 | 4/2010 | Burke | |
| 2010/0093441 A1 | 4/2010 | Rajaraman et al. | 463/42 |
| 2010/0124990 A1 | 5/2010 | Crowder | |
| 2010/0125851 A1 | 5/2010 | Singh et al. | |
| 2010/0130280 A1 | 5/2010 | Arezina et al. | 463/20 |
| 2010/0131772 A1 | 5/2010 | Atashband et al. | |
| 2010/0151926 A1 | 6/2010 | Ruppert et al. | 463/1 |
| 2010/0161798 A1 | 6/2010 | Ruppert et al. | 709/225 |
| 2010/0234104 A1 | 9/2010 | Ruppert et al. | |
| 2010/0248842 A1 | 9/2010 | Ruppert | 463/42 |
| 2011/0009184 A1 | 1/2011 | Byng | 463/20 |
| 2011/0124417 A1 | 5/2011 | Baynes et al. | 463/43 |
| 2011/0179409 A1 | 7/2011 | Yoseloff et al. | |
| 2011/0269534 A1 | 11/2011 | Kelly et al. | |
| 2012/0110649 A1 | 5/2012 | Murphy | |
| 2012/0203692 A1 | 8/2012 | Olliphant et al. | |

FOREIGN PATENT DOCUMENTS

| | | |
|---|---|---|
| EP | 1 463 008 A2 | 9/2004 |
| GB | 2 380 143 A | 4/2003 |
| JP | 8255059 | 10/1996 |
| KR | 2001-0084838 | 9/2001 |
| KR | 2002-0061793 | 7/2002 |
| KR | 2003-0091635 | 12/2003 |
| WO | 02/05914 A1 | 1/2002 |
| WO | 2005/035084 A1 | 4/2005 |
| WO | 2007/033207 A2 | 3/2007 |

OTHER PUBLICATIONS

"GSA Point-to-Point SOAP/HTTPS Transport and Security Specification v1.0.3," Gaming Standards Association Transport Technical Committee, 16 pages, Jun. 5, 2007.

Olesiejuk, "Discovery Services for Gaming Devices on a Casino Floor," Gaming Standards Association, 3 pages, Mar. 12, 2007.

Bally Technologies, Inc., iVIEW, http://ballytech.com/systems/product.cfm?id=9, download date Nov. 6, 2007, 2 pages.

Bally TMS, "MP21—Automated Table Tracking/Features," 2 pages, Nov. 2005.

Bally TMS, "MPBacc—Specifications/Specifications," 2 pages, Nov. 2005.

Bally TMS, "MPLite—Table Management System/Features," 2 pages, Nov. 2005.

Burke, A., "Tracking the Tables," reprinted from *International Gaming & Wagering Business*, Aug. 2003, 4 pages.

Gros, R., "All You Ever Wanted to Know About Table Games," reprinted from *Global Gaming Business*, Aug. 1, 2003, 2 pages.

MagTek, "Port Powered Swipe Reader," Technical Reference Manual, Manual Part No. 99875094 Rev 12, Jun. 2003, 20 pages.

Mikohn, "Mikohn Tablelink—The Industry's Premier Table Tracking Solution Delivers Improvements Straight to the Bottom Line," 2 pages, before Jan. 1, 2004.

Terdiman, D., "Who's Holding the Aces Now?", reprinted from *Wired News*, Aug. 18, 2003, 2 pages.

Winkler, C., "Product Spotlight: MindPlay," reprinted from *Gaming and Leisure Technology*, Fall 2003, 2 pages.

Singh et al., U.S. Appl. No. 12/271,337, filed Nov. 14, 2008, 35 pages.

Crowder, U.S. Appl. No. 12/271,736, filed Nov. 14, 2008, 35 pages.

Atashband et al., U.S. Appl. No. 12/620,402, filed Nov. 16, 2009, 46 pages.

Ruppert et al., U.S. Appl. No. 12/620,404, filed Nov. 16, 2009, 70 pages.

Bulavsky, J., "Tracking the Tables," *Casino Journal*, May 2004, pp. 44-47, accessed Dec. 21, 2005, URL = http://www.ascendgaming.com/cj/vendors_manufacturers_table/Trackin9162004111411AM.htm, 5 pages.

Requirements document, "Game Authentication Terminal Program (GAT3)," to Gaming Standards Association, Aug. 2005, 27 pages.

(56) References Cited

OTHER PUBLICATIONS

Standards document, "Technical Standards for Gaming Devices and On-Line Slot Systems," to Nevada Gaming Commission and State Gaming Control Board, Aug. 17, 2005, 15 pages.

Hung et al., "Performance Evaluation of the Least Conflict Sharable Spreading Code Assignment Algorithm," IEEE, 1996, 5 pages.

Gwyddion User Guide, "False Color Mapping: Chapter 3. Getting Started," retrieved from URL=http://sourceforge.net/projects/gwyddion/files/user-guide/2007-06-28/gwyddion-user-guide-xhtml-2007-06-28.tar.gz/download, retrieved on Nov. 21, 2012, 2 pages.

\* cited by examiner

Fig. 3A  Download & Configuration context diagram
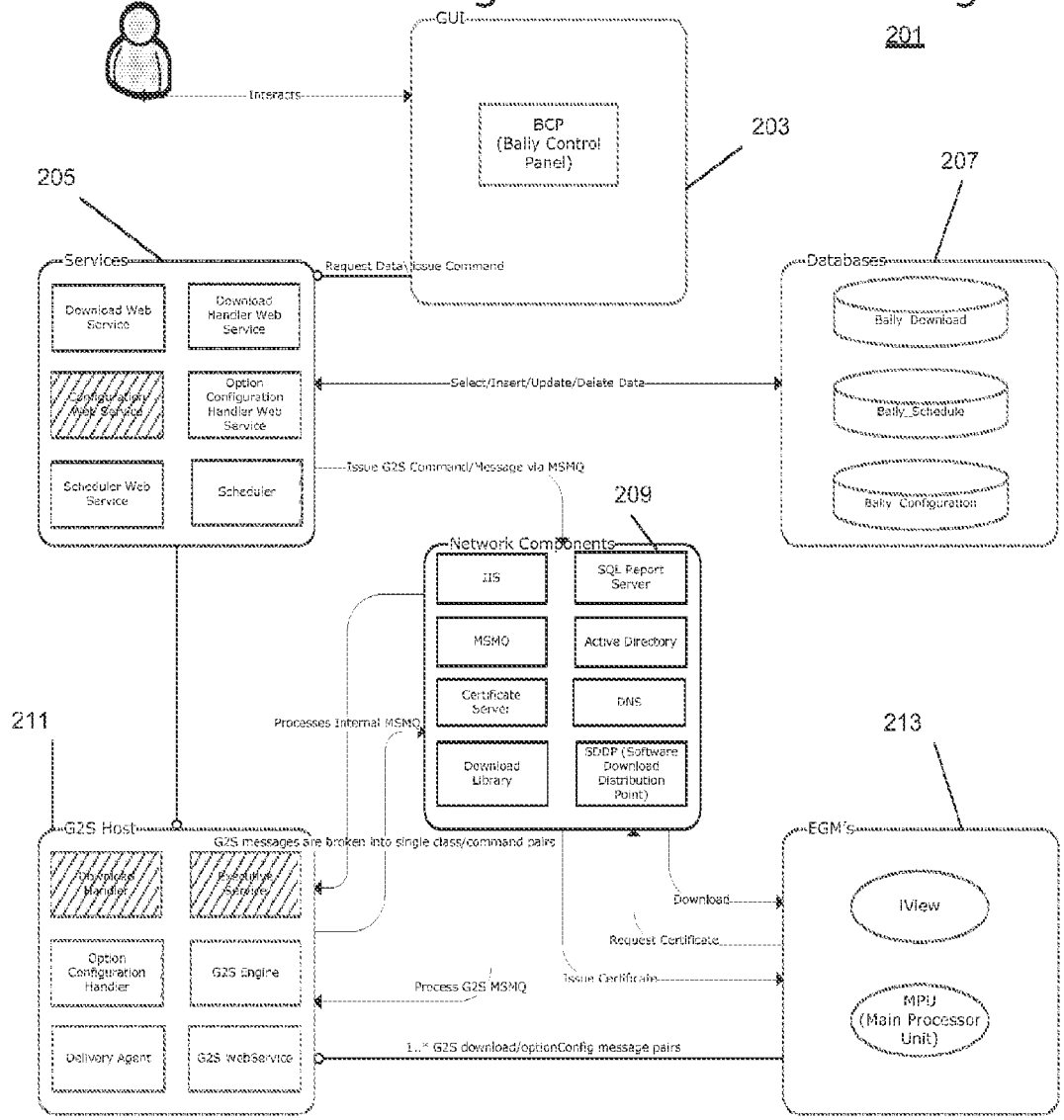

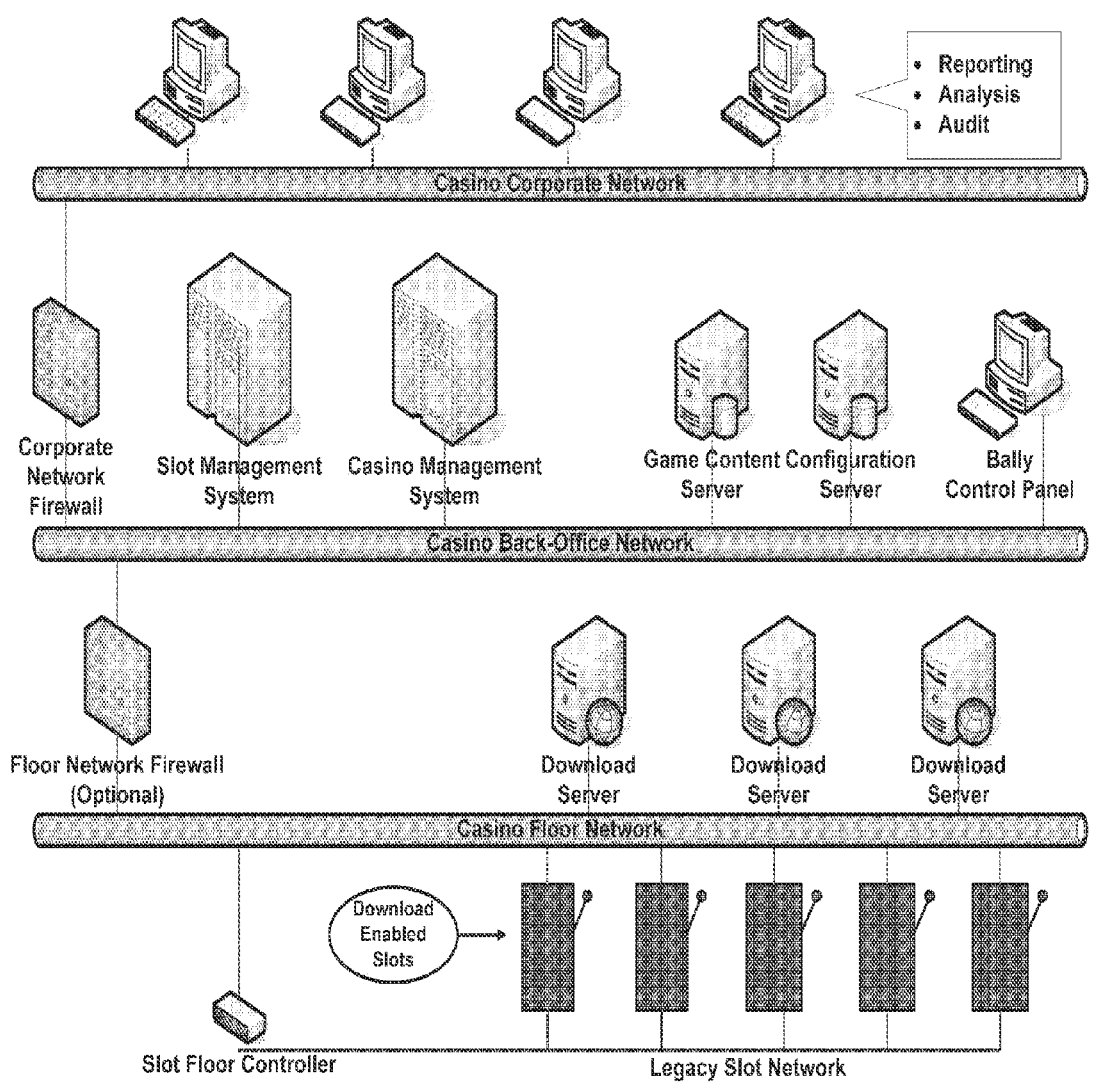
Fig. 3B Gaming Network System including Download and Configuration Server Fig. 3C Download and Configuration Network Diagram
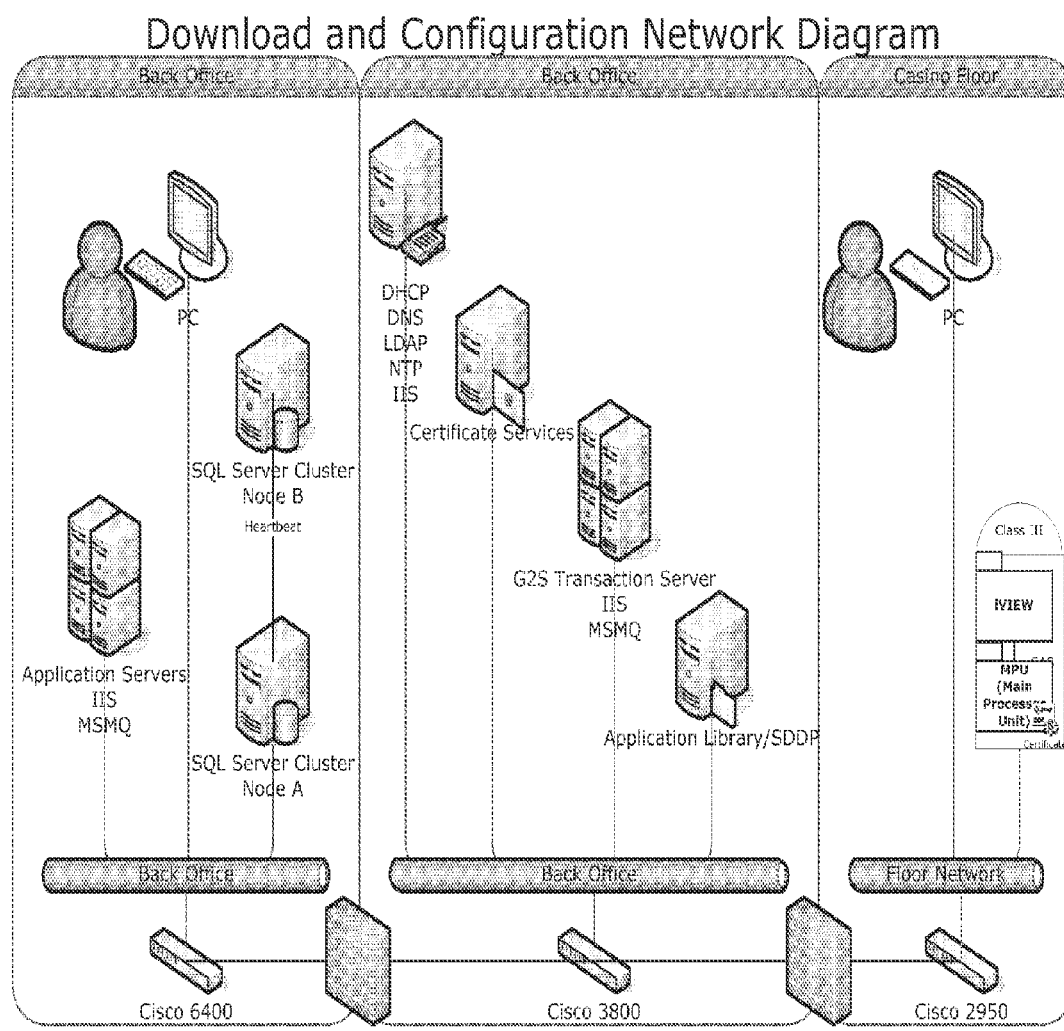

FIG. 25

DISCOVERY METHOD AND SYSTEM FOR DYNAMICALLY LOCATING NETWORKED GAMING COMPONENTS AND RESOURCES

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD

This invention pertains generally to management systems and methods. More particularly, the present invention relates to a computerized method and system for downloading gaming software and configuring gaming machines.

BACKGROUND

Various networked gaming systems have been developed over the years beginning at least in the 1980's. With acceptance and utilization, users such as casino operators have found it desirable to increase the computer management of their facilities and expand features available on networked gaming systems. For instance, there are various areas in the management of casinos that is very labor intensive, such as reconfiguring gaming machines, changing games on the gaming machines, and performing cash transactions for customers.

SUMMARY

In accordance with one or more aspects of the invention, a computerized download and configuration server-based system and method for use with game devices, systems, and methods is provided to enable users to monitor, control, and modify game devices and other related activities.

Further aspects, features and advantages of various embodiments of the invention will be apparent from the following detailed disclosure, taken in conjunction with the accompanying sheets of drawings.

BRIEF DESCRIPTION OF THE DRAWINGS

FIG. 3A illustrates a download and configuration context diagram.

FIG. 3B Download and Configuration Network Diagram

FIG. 3C Gaming Network System including Download and Configuration Server.

FIG. 25 illustrates a GUI display panel with the final step which is to review the completed and applied assignment.

DETAILED DESCRIPTION OF THE PREFERRED EMBODIMENT

Figure 1:
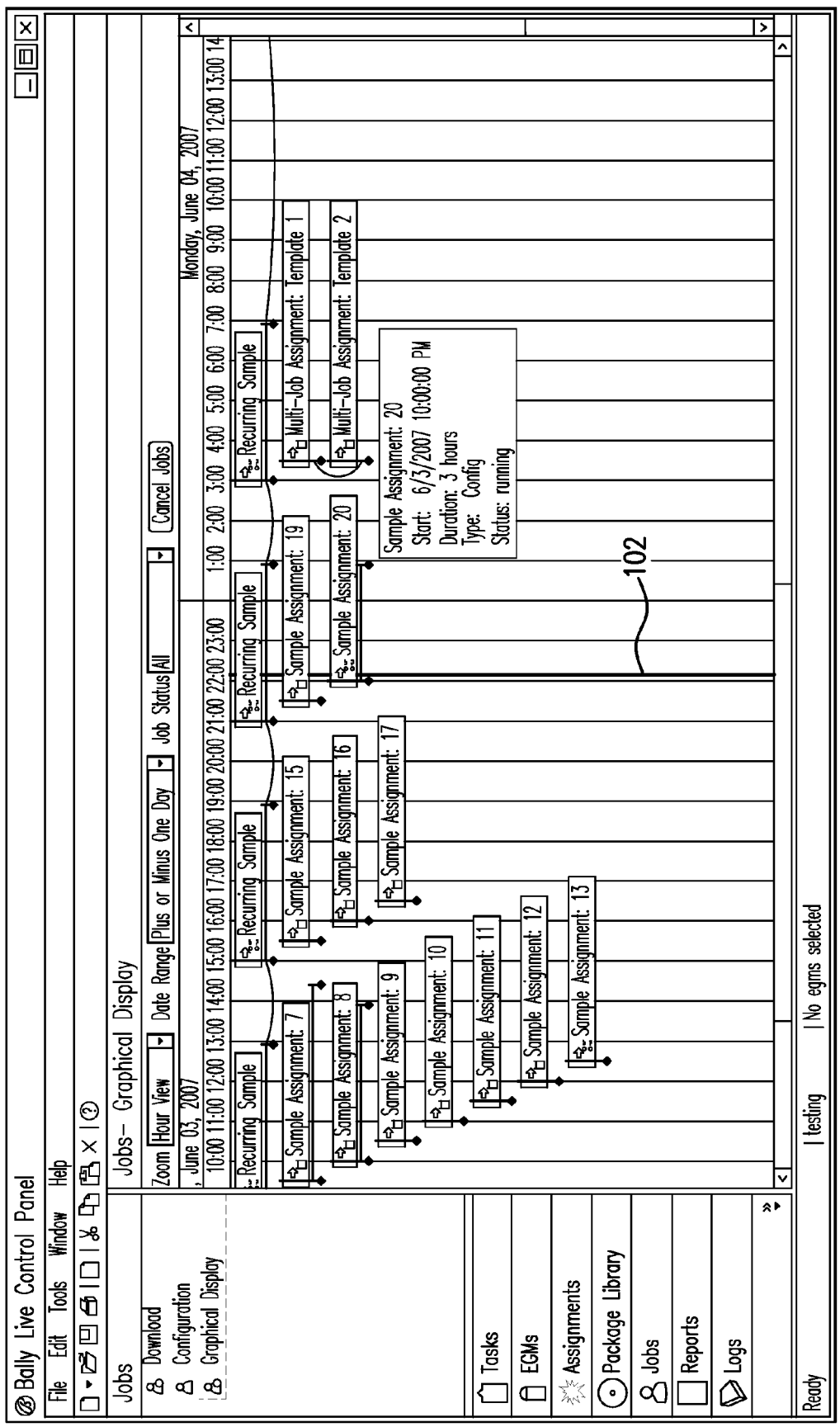
FIG. 1 illustrates a Scheduler Panel presenting a graphical display of Download and Configuration jobs scheduled in a gaming system in accordance with one or more embodiments.

Various embodiments are directed to a networked gaming system including one or more download and configuration servers, one or more game and player monitoring components, and at least one user control station enabling the monitoring and modification of networked gaming machines. The embodiments are illustrated and described herein, by way of example only, and not by way of limitation. Referring now to the drawings, and more particularly to FIGS. 1-30, there are shown illustrative examples of various GUI displays which may be generated on a user control stations to monitor and modify game and player activity, gaming networks including one or more user control stations with download and configuration features, and methods associated therewith, in accordance with various aspects of the invention.

Scheduler Panel

Referring to FIG. 1, a Scheduler Panel is shown that presents a graphical display of Download and Configuration jobs scheduled in a gaming system, such as may be displayed at a user control station (also referred to as a Control Panel herein) in accordance with one or more embodiments.

The Scheduler Panel is implemented as a GUI (graphical user interface) which may be integrated with a Control Panel, such as a Bally Technologies Control Panel, which may include a display, keyboard, and mouse for use by a casino operator. The Scheduler Panel is meant to provide an easy, intuitive way for operators to view, monitor status and manipulate the job assignments for download and configuration. Each assignment job is presented on the timeline showing when they start. There is a vertical lime-green bar indicating the current time as a reference. The entire content can be scrolled in any direction, however when scrolling vertically, the header showing the dates and hours will always remain visible.

The Toolbar:

Operating similarly to conventional toolbars, such as those provided in a Microsoft Windows Operating System, the toolbar has three filters and the cancel jobs button.

Zoom—Controls how much detail is shown on the timeline. Anticipated choices would be; Hour, Day and Week view.

Date Range—Allows user to specify how much time before and after the current time, data should be displayed. Anticipated choices would be; Today Only, Plus or Minus One Day, Plus or Minus One Week, Plus or Minus One Month. The user would use a report look at activity in the past outside of this range.

Job Status—Allow the user to only show jobs matching the status criteria. Anticipated choices would be; All, Active, Running, Pending Cancel Jobs—The user will be able to select assignments that have not yet been completed, and cancel them. This is the same functionality we support in Release-1.

Assignment Jobs:

Each of the assignment jobs are color coded to indicate their status, such as green, amber, red. They use the same icon as in the assignment navigator to show their type. The title is derived from the assignment's name. The start time is indicated by the vertical black bar on the left ending in the diamond. If the assignment is an override, then the duration of the override is indicated by the horizontal line heading to the terminator with the second diamond.

Figure 2:
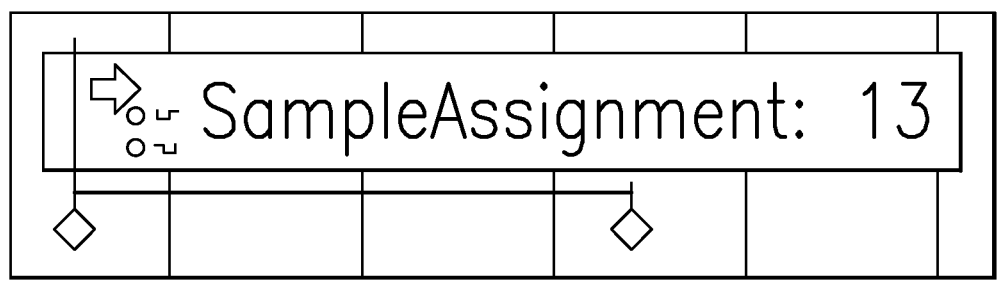
FIG. 2 illustrates a single assignment on a Scheduler Panel presenting a graphical display of Download and Configuration jobs scheduled in a gaming system in accordance with one or more embodiments.

Referring to FIG. 2, an example three hour configuration override resulted in an error and the assignment graphic bar is displayed in red. If the job is in progress, then a progress bar (not shown) may also be shown to show the percentage of completion of the job and the time elapsed. If the job is on time, then the progress bar may be green, if it is a little late, then it may be amber, and if the job is either stopped incomplete or a delay has caused a conflict with another assignment bar, then the progress bar may be red, may flash, and may display a warning message to alert a user.

Hovering the mouse cursor over an assignment will bring up a tool tip with additional details. It is expected that there will be more detail in the tooltip than shown in this screen shot, such as progress of particular gaming machines associated with the assignment. In the event that some gaming machines have completed the assignment or some have not, this information may be obtained by clicking the assignment graphic bar to obtain a summary of the status of the EGMs affected.

Linked Assignment Jobs:

Two new (for R2) concepts are displayed in this screen shot using the curved blue lines, recurring schedules, and assignments that run multiple jobs based on templates. The first row of assignment jobs represent a recurring schedule. Each blue line links the previous job with the next occurrence. The Multi-Job Assignment shown at about 3:30 am on Monday represents an assignment that was set up to run two jobs in sequence. In this case it is showing two downloads, but it might be a download followed by a Config, or any combination of two or more jobs.

In R2, assignments will be changed so that they schedule one or more job templates describing what to do. In this way that actual instructions about what to Config or download can be shared at different times or for different EGMs without doing the clumsy copy step used in R1.

Double-Clicking or Opening a job will open a detail window with a view much like the existing R1 expandable grid, but focused only on the job in question. You'll be able to see the individual status for each EGM and in the case of configurations, for each option. Two or more of these can be opened at once to aid in comparing results.

Coding:

Some care must be taken when locating the jobs so as to keep the display compact while at the same time avoiding overlaps. It is anticipated that all recurring jobs scheduled during the time period of interest will be displayed near the top as shown so that they can be horizontally aligned. Then each job will be taken in start time order and displayed beginning at the top left corner. Each job is displayed one row below the ones already displayed until the start time has shifted forward far enough that it can be drawn in a new column without overwriting the previous ones. At this point, we reset the current row to the top and begin again.

Additional Features: Each job rectangle will also have one or more 'progress' indicators that will show how much of the job has completed. Because a 'job' could involve more than one EGM, the percentage shown could be the average percent complete for all EGMs, or the percent complete for the one that is least complete (in order to give operator some idea of how much longer it will take to complete the job), or some other useful measure of completion. The GUI will also provide some obvious indicator that a job has had some kind of error. One will be able to click on that indicator to see details of the error, such as identify one or more EGMs (gaming machines) that have been unable to receive or have encountered delays in receiving a download or reconfiguration or have refused the download or reconfiguration because of an incompatibility issue.

Referring to FIG. 3A, B, C, gaming network 301 is shown including Slot Management System networked to Gaming Machines and Control Panel, such as may be implemented in conjunction with the Scheduler Panel of FIG. 1. The Gaming Machines may include a player interface unit (Bally Technologies iView), an MPU (main gaming processor unit), a game monitoring unit (GMU), and possibly other network enabled gaming components such as a game controller which may each connect to the network and may connect to each other to communicate as needed, such as communications related to the status of the gaming machine or game play.

Referring to FIG. 3A, and generally to FIG. 3B, C, an example context diagram of download and configuration server system 201 is shown including control station 203 (for example, a Control Station with a display and a user interface), download and configuration services block 205 (including for example a download server or accessible service, a download handler server or Web accessible service, a configuration server or Web accessible service, an option configuration server or Web accessible service, a scheduler server or Web accessible service and a scheduler server or Web accessible service), download and configuration database block 207 (including for example conventional storage depositories such as containing a download database, a schedule database, and a configuration database), network components block 209 (for example, conventional hardware and software to support IIS, MSMQ, and DNS, a SQL report server, an active directory, a certificate server, a download library, and an SDDP (Software Download Distribution Point)), G2S (Game-to-Server) host block 211 (including for example a download handler, an executive service, an option configuration handler, a G2S engine, a delivery agent, and a G2S Web accessible service), and EGM block 213 (including foe example a facility floor of network connected gaming machines and tables which may each include a iView or similar product features and/or a gaming management processor unit which are individually identifiable and addressable over the network. (The referenced Web service utilizes a secure (HTTP(s) transmission protocol used to communicate with the slot management service and vice-versa. This system operates using web protocol and web services to serve information and process transactions. It does not serve web pages in the traditional sense.)

Download and configuration server system 201 enables the transmission of software files, packages or modules to one or more clients, such as gaming machines or tables, via, for example, a casino network using the Gaming Standard Association's (GSA's) Game to System (G2S) message protocols. The configuration portion of server system 201 enables the selecting of specific settings and options on one or more clients using GSA's G2S message protocols, such as to modify the Alpha operating system on conventionally available gaming machines or third party gaming machine or table operating systems. The respective subsystems of server system 201 connect to control station 203 which includes a common user interface application, such as a Control Panel (BCP) software application, so that a user can request data and issue commands for the processing of download and configuration operations throughout the network.

Download and configuration server system 201 provides for the following G2S download class features:

The G2S download class provides a standardized protocol to manage the downloaded content on all G2S compliant gaming machines or tables (EGMs) from all G2S compliant host systems.

The G2S download class enables installation of downloaded packages.

The G2S download class enables the removal of software (uninstall).

The G2S download class enables scheduling of installation and/or removal of software including enabling scheduling options that relate to a specific time, EGM state, or interaction with a host server or technician.

The G2S message class supports reading an inventory of downloaded packages and installed modules. This provides the capability to effectively manage the content on the EGM.

The G2S message class enables recording transaction logs for packages and scripts on a transaction database accessible through control station 203. This feature provides an audit capability or transaction tracer for determining how content came to be on an EGM.

The Download and configuration server system also provides the following G2S option configuration (optionConfig) class features which allows for the selection of various configuration options:

The optionConfig class provides a convenient and efficient mechanism to remotely configure EGMs.

The G2S optionConfig class provides for downloading options available from within an EGM.

Download and Configuration server system 201 implemented G2S classes (optionConfig, download, and scheduler) are also integrate-able through secondary displays, such as the iView, by incorporating, for example an iView transaction server. Thus, download, configuration, and configuration options may be implemented at selected EGMs 213 through their respective MPU (Main Processor Unit) or iViews. In the case of using the Bally iViews for network communications, a separate processor board is provided along with a display and user interfaces. Communication channels are connectable between the iViews and the MPU to enable the download, configuration, and configuration option processes. Some definitions of terms and components follow:

Databases—The databases return information based on the results of a stored procedure call. By example, the following databases, which are descriptively named, may be utilized: Core; Configuration; Download; Activity; and Schedule.

BCP (Control Panel)—As an example, the control panel application, such as a Control Panel application, can be a smart client implemented on control station 203 encapsulating all the functionality to support the command and control portions of the download and configuration features of a facility or facilities. Downloads and configuration options can be remotely scheduled or deployed immediately by a user through control station 203. Notifications, approvals, searches, and reports produced through server system 201 can be viewed by a user through a display or through hardcopy provided by a connected printer to control station 203.

Control station 203 can be utilized for remote downloading and configuration of games and game operating systems of connected EGMs 213. Also, control station 203 can be utilized to download content to or to configure the iView (or similar components) and second game displays or monitors (for instance, in cases in which an EGM 213 has two or more major displays) (which may also include an additional processor unit such as for example in the case of multiple games operable on a single EGM 213 on separate displays), as well as peripheral software for components in the games like bill validators and ticket printers.

Control station 203 can be utilized for the throttling of system resources based on the requested changes. For example if the user requests several high bandwidth consuming jobs be initiated concurrently, the control station 203 would advise the user that this would utilize more than allocated bandwidth and require changes to the proposed schedule. It is also contemplated that the control station could 203 could recommend changes to the schedule to ease the work requirement for the user.

Control station 203 can be utilized for the broad based change to gaming floors to support special events. For example on Halloween a specialized background or theme could be downloaded or configured on all capable games and devices for the duration of the event. This concept can be further extended to enabling specialized bonus games on other player centric activities relating to the special event or holiday. This allows a user of control station 203 to fully customize the property without the manual effort required with current systems and technologies.

Control station 203 can be utilized to fully view in a graphical fashion gaming floor configurations that have occurred in the past or are proposed for the future. This will allow the user of control station 203 to easily and quickly compare past gaming floor configurations to configurations proposed for the future in an easy to understand graphical manner. It is contemplated that these configurations be animated in a manner that realistically depicts the activity on the gaming floor over a period of time allowing the user of control station 203 to 'watch' the impact of the proposed changes.

Control station 203 can be utilized to view machine utilization information over time to determine where certain groups of players spend their time while at the property. For example if certain demographic groups are inclined to utilize machines configured at 0.25 per play and this control station 203 capability can illustrate the fact that during certain times of the day this machine configuration is completely utilized and that a large group of this demographic is scheduled to visit the property, the casino manager could opt to enable more of this type of game so players are not waiting for an opportunity to play. It is contemplated that this feature is presented in an animated fashion such that the user of control station 203 may select a date range and analyze in real time game usage by time of day and by player demographic. This features also requires control station 203 have access to and have the capability to process information from the player marketing system or have access to the data stream feeding the player marketing system.

Control station 203 has the capability to allow groups of gaming devices be identified and operated upon via a number of query options. This will aid the user in quickly and effectively finding the machines to apply changes to. It is contemplated that advanced selection criteria such as performance over the last 30 days be considered as a query parameter. The control station 203 can provide the capability to utilize a graphical representation of the gaming floor. This will allow selected groups of games to graphically represented on this floor map as well as in a list form.

Control station 203 can utilize historical slot game performance data to provide guidance for new floor configuration options. The historical data may be accessed in the download system data stores or from an external business intelligence system. It is contemplated that the control station 203 may be programmed to allow for automated floor configuration changes based on the historical performance data. This capability may be applied automatically or via an interface requiring only approval from the user prior to applying the changes.

Database Web Services—These are world-wide Web (Web) services that are conventionally available to be re-used by other user interfaces and service applications connected to slot management system 101. In other words, this is a secure closed system network using web services connected on demand with the slot management system.

Handlers—These are the logic libraries that are responsible for executing the business logic of the system.

Network Components—The following list of network components, or portions thereof, may be implemented and/or required by server system 201: Certificate Server; DNS; DHCP, Application Firewalls, Hardware Firewalls, Network Load Balancers Third Party Software Applications—the following list of $3^{rd}$ party applications my be utilized or required by the server system 201: IIS, MSMQ, SQL Server, SQL Server Reporting Services, Active Directory, Microsoft Windows 2003 Server.

G2S Engine—This service will receive G2S messages directly from EGMs 213 and dispatch them to the respective subsystem of server system 201 based on the message component type.

EGMs—Electronic Gaming Machine, which may include tables with processor and/or display components.

iView—For example, a conventional apparatus providing a player user interface and display at EGMs 213 connected to the network including the player tracking server and enabling a player to request and receive information, to receive award notifications, to transfer credits, and to conduct such activities through the apparatus as is enabled on slot management system 110. One usage of an iVue-type apparatus may be to display marketing and player tracking information and various shows on the occurrence of an award or win by a player. Such apparatuses may also be utilized as vessels for gaming, such as with server-based games or even independent games stored on their respective processor boards. Thus, separate games may be implemented through the iView-type device, apart from the main game of EGM 213 controlled by the MPU. In turn, the content of the iView may be separately modified as through downloads or configurations or configuration options. Control station 203 is able to retrieve from the database and view all login attempts to the server both successful and failed. A user may be locked out of access to the control panel application at control station 203 after too many failed login attempts. The recorded transaction log may include the login ID, data, time of login and duration.

The Web services may support functionality between control station 203 and database block 207. The Web services may also support unsolicited messages between the G2S handlers and control station 203.

Server system 201 may maintain a record or transaction log of login attempts to the server both successful and failed. The log may include the login ID, data, time of login and duration. Server system 201 may also maintain a transaction record or log of all events and activity occurring on server system 201. The log may include a record of which login session in which the event occurred.

Server system 201 may also maintain a log of communication events with any EGM 213. Server system 201 may also maintain the status of each EGM 213 including: Game history data; Download status (available, requested, downloading, applied, rejected); Package information (available for install, requested, being downloaded, downloaded, installed); Hardware information; Software Module Information; and/or Error conditions.

Server system 201 may dynamically build packages to be downloaded based on EGM 213 inventory and available updates, fixes and new data for EGMs 213. Server system 201 may verify requests from EGM 213 including whether or not EGM 213 is valid and that it is in a state to make the request. All requests will be logged and contain EGM 213's identification number, time and date, specific request, and EGM status. Server system 201 may communicate with Software Distribution Point servers (SDDP) to maintain a list of packages that are available for supported EGMs 213. Server system 201 may supply the location of the SDDP when instructing EGM 213 to add a package. Server system 201 may verify that all required hardware and software for a package to be sent to an EGM exists before instructing EGM 213 to retrieve the package. Server system 201 may support multiple EGMs 213 in multiple sites and/or facilities and EGMs 213 produced by multiple manufacturers. Server system 201 may verify, using the information in the package header and the information stored about selected of EGM 213, that a software package can be installed on a selected EGM 213 before instructing EGM 213 to add a package. Server system 201 may be able to track which packages are installed on any given EGM 213 and verify the data by requesting a selected EGM 213 to send package install information. Server system 201 may report bad images and errors and log them when failed package installation information is received from an EGM 213. Server system 201 and SDDP may be used to control all network pacing, bandwidth, error recovery, and monitoring. Server system 201 may be utilized for maintaining the location of all SDDP and the packages available on each.

Software Download Distribution Point (SDDP) server may be utilized to maintain all downloaded software packages in a secure library with the required number of secure backups defined by a jurisdiction. The SDDP server may be used to restrict access to the library that stores all software download packages to only authorized personnel. The access may limit access, such as to only allow write access to those authorized to add, delete, and update packages and read access for all others authorized to access the library. The SDDP server may provide secure software level firewalls to restrict access to everything saved on the server. The SDDP server may maintain a log of login attempts to the server both successful and failed. The log may include the login ID of a user, data, time of login and duration. The SDDP server may maintain a log of all events and activity occurring on server system 201. The log may include which login session in which an event occurred.

Software packages added to the software library may be verified from the package data using an MD5 or SHA1 hashing algorithm to validate the data or some other verification tool. The verification string may be added to a package header and used to re-verify the package when it is downloaded to the EGM 213.

All verification failures and related errors may be logged and the log entry may contain the date and time, the ID of the person running the process at the time, and the specific type of error that occurred. They may also be displayed on the correct display area.

The SDDP server may be utilized to provide selected EGMs 213 with the communications port location and IP address used for sending software package data to the EGM 213. All data within a download package may be compressed using conventional compression techniques and transmitted in compressed format. On receipt, EGM 213 may decompress the downloaded software package.

Referring to FIGS. 3B and 3C, download and configuration server network 201 is shown in representative form. Download and configuration server network 201 is a portion of slot management system 101 which provides a suite of subsystems designed to provide customizable solutions by allowing users to select products within the suite to meet their needs for particular facilities, such as a casino manager seeking to manage a single or multiple properties. Download and Configuration (Download and Config) are two of the subsystems offered in the suite that provides a user, such as the Slot Operations staff, an efficient mechanism to remotely configure electronic gaming machine (EGM).

The Download and Config Software utilized together with the apparatuses as shown in the figures may be used to enable a casino Slot Operations staff to schedule and change a game(s) on the casino floor from a keyboard.

Using the Control Panel (BCP) interface, the staff may be able to schedule, configure, download and activate changes to games on the floor, without touching an EGM on the floor. Download and Config software application may be loaded on control station 203 to enable the sending of information over the casino network using G2S & HTTPS standardized message protocols that manage the downloaded content. From control station 203, a user, such as casino staff, can change cabinet or game options, or games in EGMs. There are numerous selections that the staff can schedule to configure or make a minor change. Some examples of the types of software that may be downloaded or options which may be re-configured are:

| Cabinet Options | Game Options | Download Options |
| --- | --- | --- |
| Sound | Game/Theme | Change a game, theme, &/or paytable |
| Reel spin speed | Paytable | |
| Background color | Denomination | |
| Attract mode | | Change game operating system |

In order to implement the download and configuration features, one approach is to install slot management system 101 at a facility, such as the Bally_Live slot management system. The implementation of the download and configuration features further contemplates the implementation of server hardware and related equipment as shown in the figures, and particularly FIGS. 3A-3C, including software to perform the needed functions for communicating relevant data and instructions, the implementation of download ready EGMs, such as EGMs with an Alpha operating system with remote download and configuration capability. An example system for implementing the download and configuration network 201 may be a Bally One System together with the Bally Live Floor program. Another example implementation of the Download and Configuration server network may be in conjunction with other slot management systems incorporating the Bally Live Core program.

An example process for using the Download and Config server network is as follows: a casino operator decides to change game themes on the Alpha V20D-20 EGMs. The software game themes are located on the SDDP Server. The Download management tools are located on the Application/Database Server System. One or more servers separate from the SDDP Server contain the game theme software, such as for security or redundancy purposes. The Alpha EGMs are identified on the casino floor using the BCP. A Download management tool, such as the BCP scheduler may be used through a menu to identify: the date and time to download the game packages; the game packages to send to the specific EGMs; the date and time to automatically activate the games on the EGMs after the download. At the selected date and time, the EGM may open communication with the Download Database. The EGM request software from the SDDP server. The SDDP server downloads the specified game information to the EGM using a secure transmission protocol such as HTTPS. The download to the EGM may occur in the background operation of the Alpha OS, so that gameplay is not interfered with. The EGM may de-activate game operation a pre-determined amount of time subsequent to the last play on the EGM, such as five minutes, and issue a message on one of its display panels that it is temporarily offline, at which point the EGM can initiate installation of the downloaded software. A record of the transmissions and corresponding activity of the EGM is relayed to a retrievable storage on the network, such that a privileged user may operate the BCP to run the reports identifying the old and new games, date changed, and by whom. User privileges may be restricted as discussed previously to provide additional levels of security and flexibility within the system and for the casino operator or users of slot management system 101 and download and configuration server network 201.

Example Download and Config components that are shown in FIGS. 3B and 3C indicate a system that supports up to 10 EGMs through a single Cisco 2950 switch. As the number of EGMs increase, the type and/or number of servers, switches, firewalls, and pipelines may be changed to accommodate higher traffic volumes and improve or avoid degradation of performance.

In an example embodiment, the following apparatuses and software are incorporated:

| Example Components | Example Hardware | Example Software |
| --- | --- | --- |
| SDDP Server (SDDP may be placed on its own server to comply with some jurisdiction requirements.) | Pentium IV 2 GB RAM 100 GB SATA 2 NIC cards | OS - Microsoft Windows 2003 Microsoft SQL 2005 |
| Application Library Server | Pentium IV 2 GB RAM 100 GB SATA 2 NIC cards | OS - Microsoft Windows 2003 Microsoft SQL 2005 |
| Databases: Scheduler Download Configuration | Pentium IV 2 GB RAM 100 GB SATA 2 NIC cards | OS - Microsoft Windows 2003 Microsoft SQL 2005 |
| Networking | Cisco 2950 Switch, 24-port Cisco ASA 5510 (firewall) | |
| Connecting wiring between devices | CAT-5 cables 15 feet long 2 cables per EGM | |

Discovery Method to Dynamically Find Gaming Networked Components Using DHCP, DNS, LDAP, and Active Directory to Locate Services within the Gaming Network that are Available in a Casino.

Figure 4:
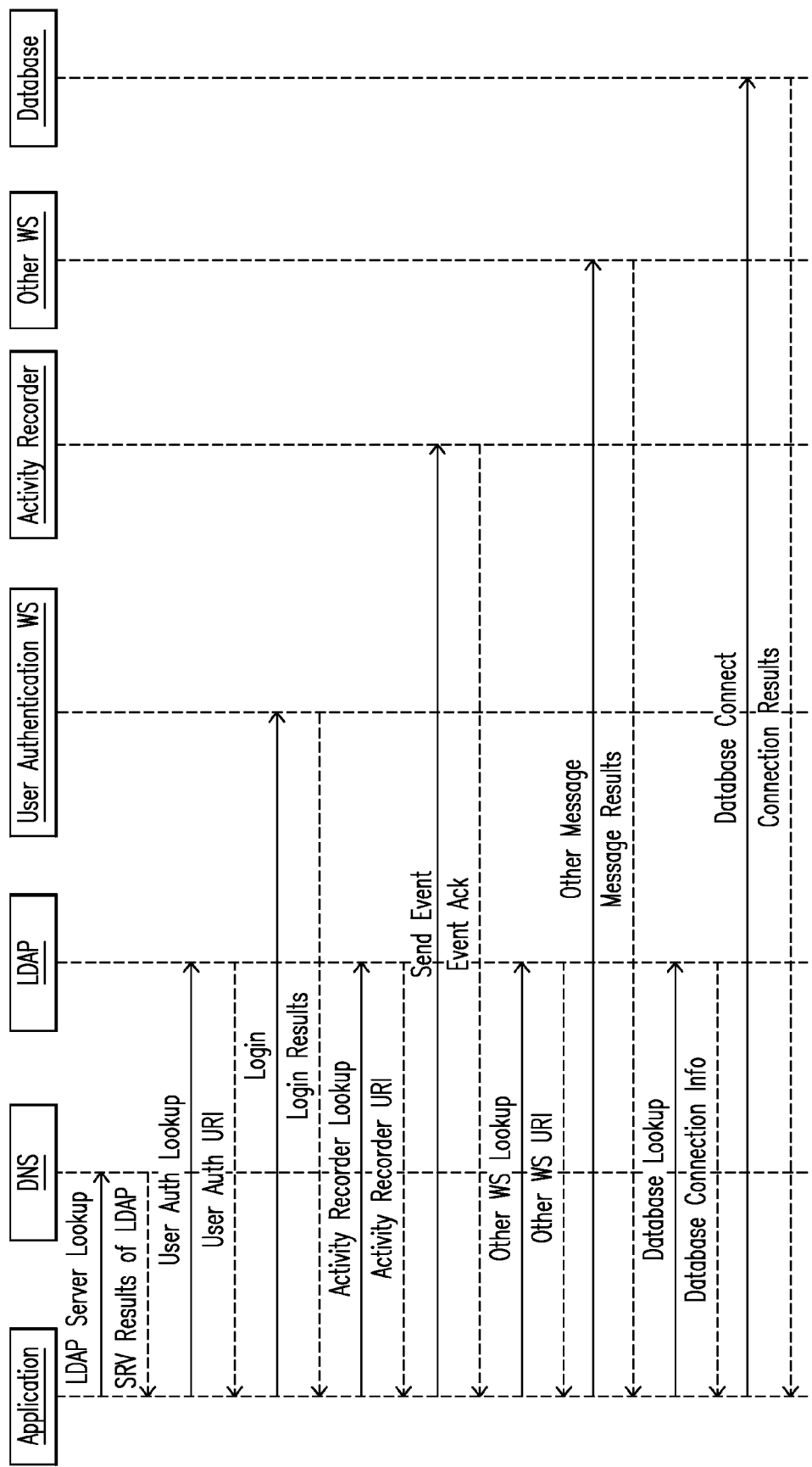
FIG. 4 illustrates an example networked component discovery process utilized by a gaming network in accordance with one or more embodiments.

Referring to FIG. 4 illustrates an example networked component discovery process utilized by a gaming network in accordance with one or more embodiments.

The following process mechanism takes advantage of the network infrastructure available on a Windows network, such as the Bally One slot management system:

Step 1. The application finds the DNS server referred to by the network setup. This setup may have been manual or by DHCP.

Step 2. The application then does a look-up of a specific name of an LDAP server in a scope guaranteed to be at all casinos if the service is available.

Step 3. From there, the application queries the LDAP server for the Assigned name of the resource (database entry, or web service entry).

Step 4. The Application then uses that information to connect either to the database or the web service. The entry may include the user name and password to use to connect to the database or may specify that the user is to use their own credentials.

There may be any number of DNS or LDAP servers to handle this task. Also, the data returned back from the LDAP or DNS servers may be different from results returned to other machines based off of information obtained from the network card connecting to the network. For example, the north-east portion of the casino may force all requests to a different web service than the South-east portion. The LDAP server may be implemented by a third party vendor (such as Microsoft) or by the system vendor (such as Bally Technologies). The same is true of the DNS server. The results may also be returned by the version of the software the client is able to support. A different server can be returned for version 1.0 of a protocol and version 2.0 of the same protocol.

Benefits and features of the discovery process and mechanism may include one or more of the following:

Benefit 1.

Currently every server and workstation has to be configured manually thus causing the casino significant work and the potential for mis-configuration that may cause serious side effects including system downtime.

Benefit 2.

This discovery method allows for dynamic configuration based on server availability and load. The system can report into the LDAP server the performance information about load and server availability. The LDAP server can then make decisions based on this information to route new connections to servers better able to handle the load.

Benefit 3.

Allows for upgrading a small part of the casino to a new version of code and not have everyone go to it until the code has proven itself in a live environment. This provides a staged deployment capability that does not require the casino to be down during an upgrade process. It also allows for field trial capability without risking the entire casino operation.

Benefit 4.

Resources can be spread throughout the casino. Not all servers need to be in the server room. There can be several closets on the floor with servers running. The servers can handle a section of the floor. This prevents a disaster in the computer room from downing the entire casino.

Benefit 5.

If a closet handling a section of the floor is no longer available, a different closet can then take over.

System and Method for One-Way Delivery of Notifications from Server-to-Clients Using a Modified UDP Multicast.

Figure 5:
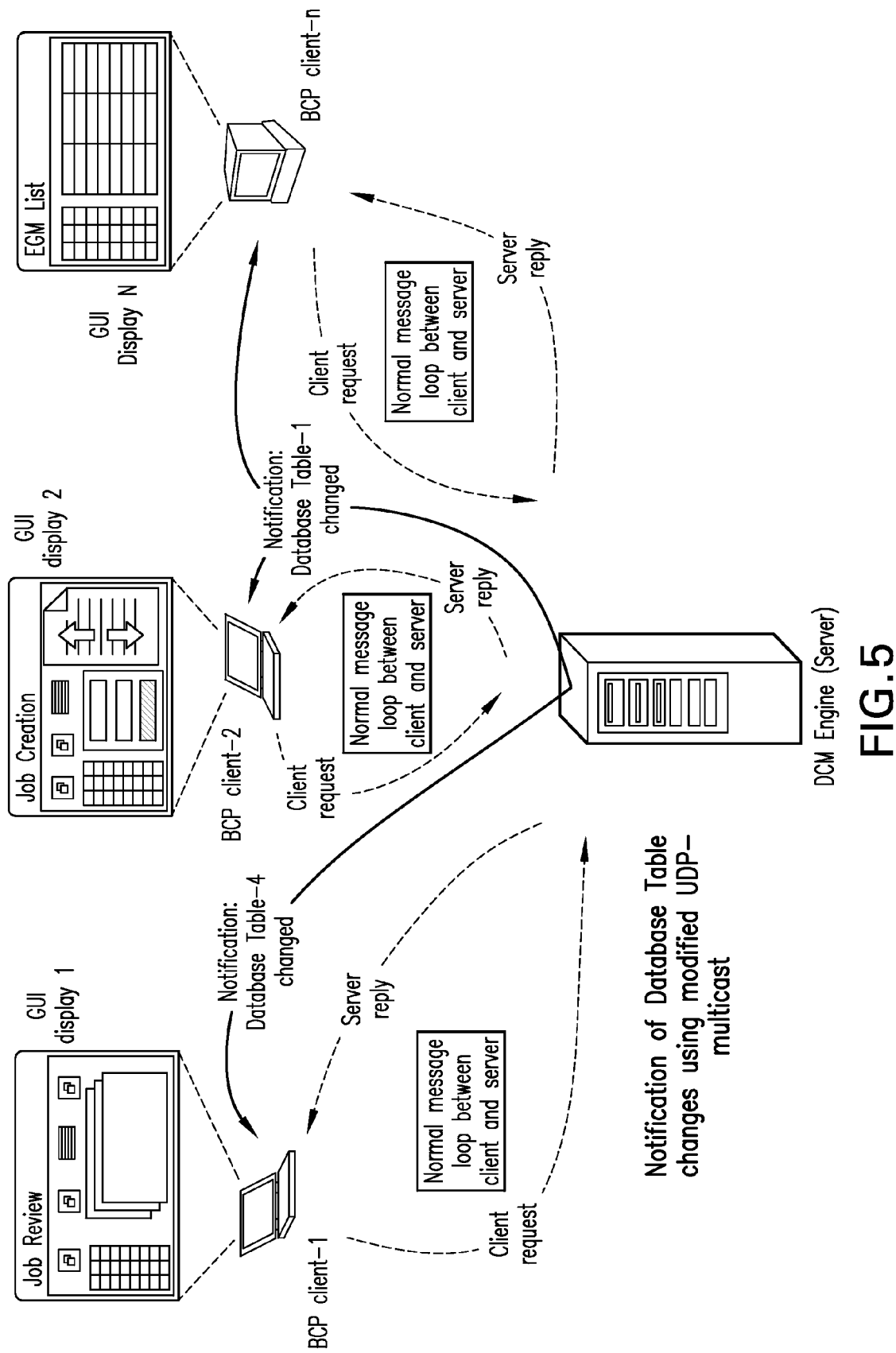
FIG. 5 illustrates an example notification process within a client-server architecture system with multiple clients in accordance with one or more embodiments.
Figure 6:
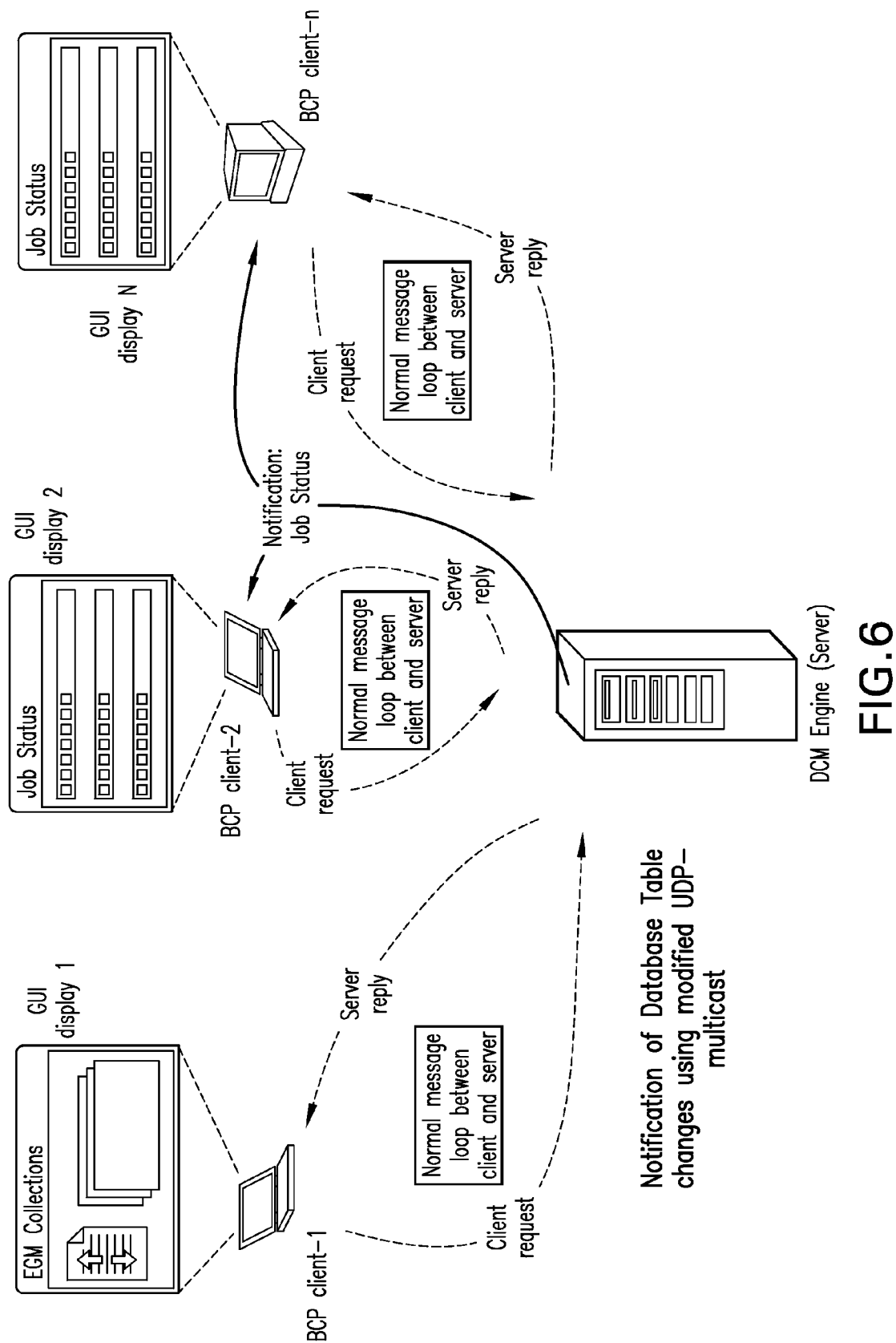
FIG. 6 illustrates a further example notification process within a client-server architecture system with multiple clients in accordance with one or more embodiments.

FIGS. 5 and 6 show an example client-server architecture system with multiple clients requesting information from a server. In a strict client-server system, the server doesn't initiate any messages. Any messages the server sends are in response to a client's request. Thus, a problem arises if the server becomes aware of something that has changed in the system and it needs to notify one or more of the clients that something in the system has changed that the client(s) might be interested in knowing or need to know. One technique to overcome this issue is for the clients to poll the server. Another approach is to use a modified form of the UDP-multicast protocol to implement a one-way notification method between the server and one or more clients.

Architecture:

FIGS. 5 and 6 show examples of how the Notification method may function. FIG. 5 shows a modified UDP multicast where a change occurred to database table-1 and database table-4. BCP client-1 has registered to receive notifications concerning database table-4, but not database table-1, so a notification message only about database table-4 is sent to BCP client-1. BCP client-2 and client-n have registered to receive notifications about changes to database table-1, but not to database table-4, so a notification message only about database table-1 is sent to BCP client-2 and client-n. FIG. 5 further shows the normal message loop between client and server which is initiated by a client request followed by a server reply.

FIG. 6 shows how the Notification method is used to send jobs status updates to BCP clients 2 and 'n' since the "Job Status" GUI is displayed on their monitors. The GUI on BCP client-1 does not involve job status information so BCP client-1 is not interested in Job Status, thus, it does not get sent Job Status notification messages.

Figure 7:
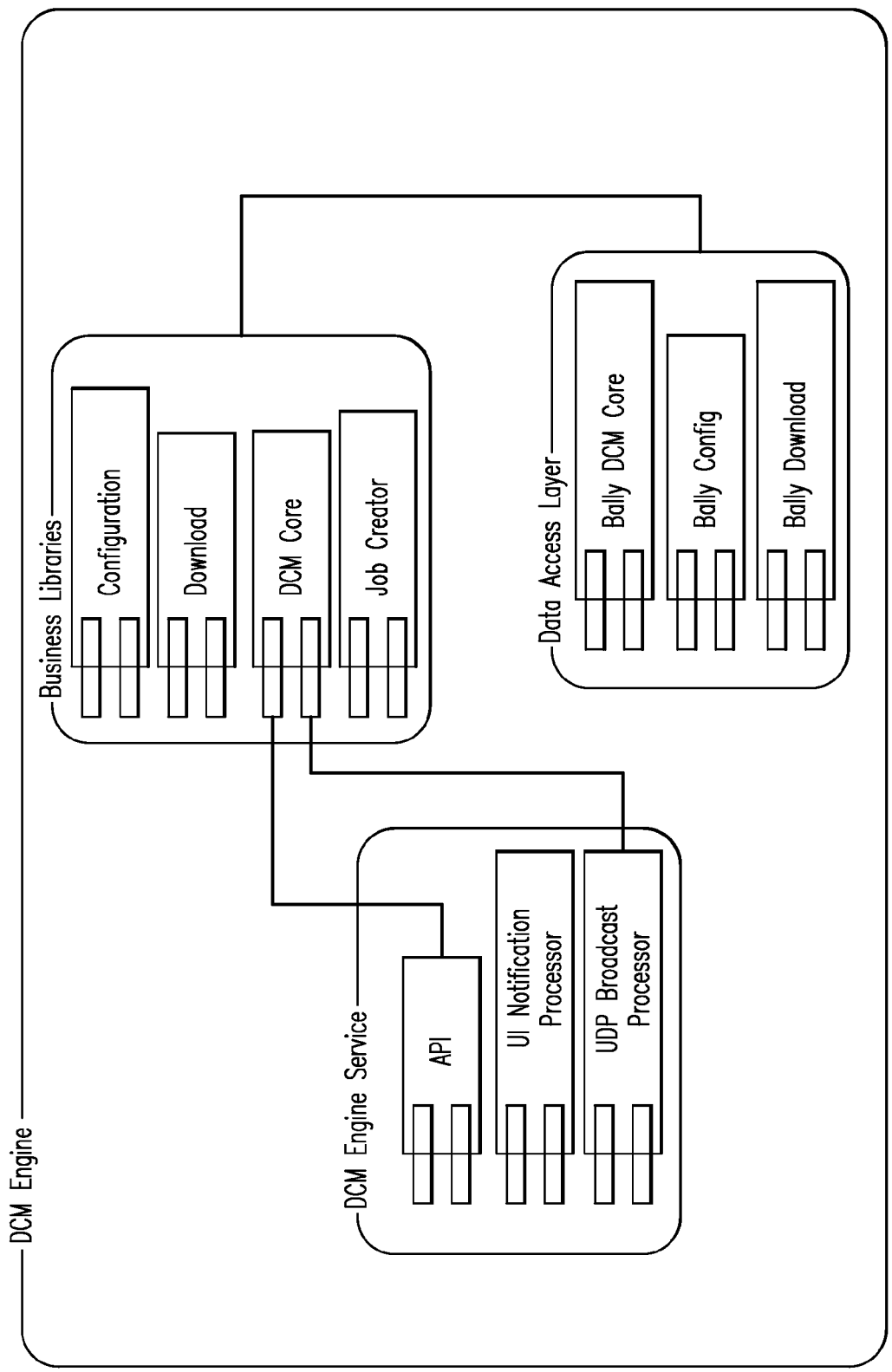
FIG. 7 illustrates a portion of an example DCM server incorporating a UDP Broadcast Processor function in accordance with one or more embodiments.
Figure 8:
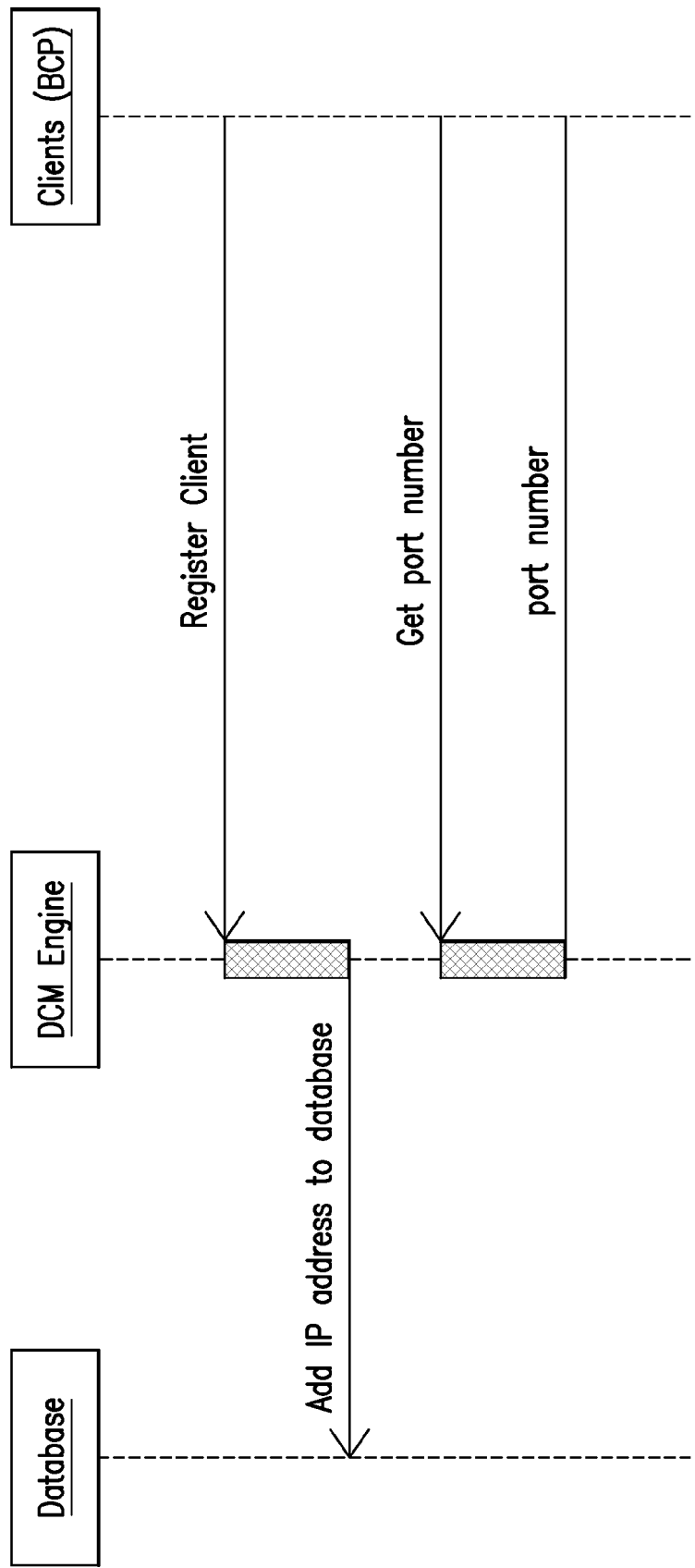
FIG. 8 illustrates an example client registration process with a UDP Broadcast Processor integrated with a DCM engine in accordance with one or more embodiments. An alternative is to use a direct web service call.

FIG. 7 illustrates a portion of an example DCM (Download and Configuration Module) server incorporating a UDP Broadcast Processor function in accordance with one or more embodiments. The UDP Broadcast Processor may be simply one of various components in the DCM engine (server). The UDP Broadcast Processor may be integrated as part of the DCM server CPU (central processing unit) by including executable UDP broadcast coding performing the functions as described above and utilizing accessible memory for storing information about each client, such as registration information. The UDP Broadcast Processor may be generally responsible for sending UDP messages to the registered clients in the network. The UDP Broadcast Processor will send UDP messages to all registered clients which are listening to receive UDP messages on a specific port. This allows one-way, server-to-client(s), communications in what is otherwise a strict client-to-server-to-client architecture.

Use of the Notification System begins with a Client application (in this scenario the BCP) sending a registration message to the DCM with its IP address in the message. It could also include what types of notifications it wants to receive; see FIG. 8. It then requests the port number from the DCM, and the DCM responds with the port number that the client should listen on.

Figure 9:
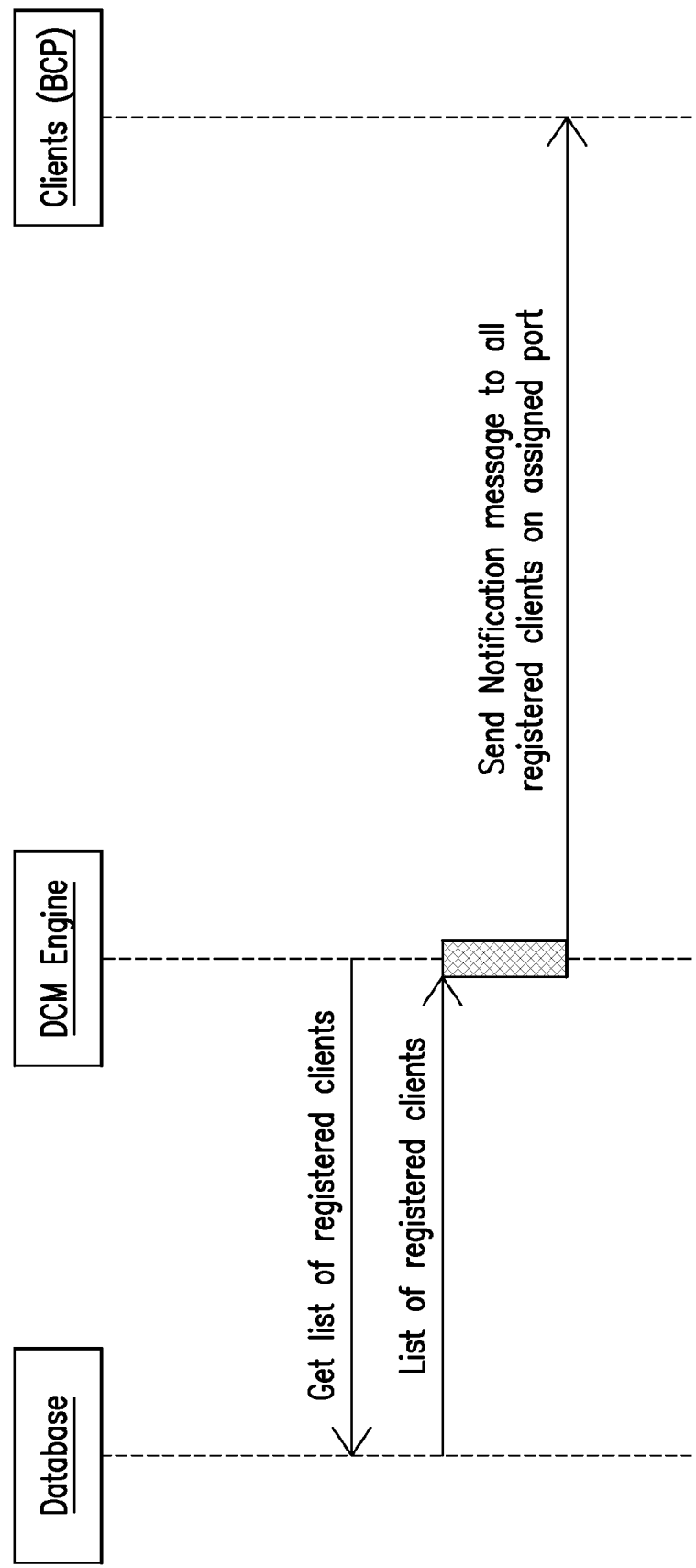
FIG. 9 illustrates sending a process of sending a notification in accordance with one or more embodiments.
Figure 10:
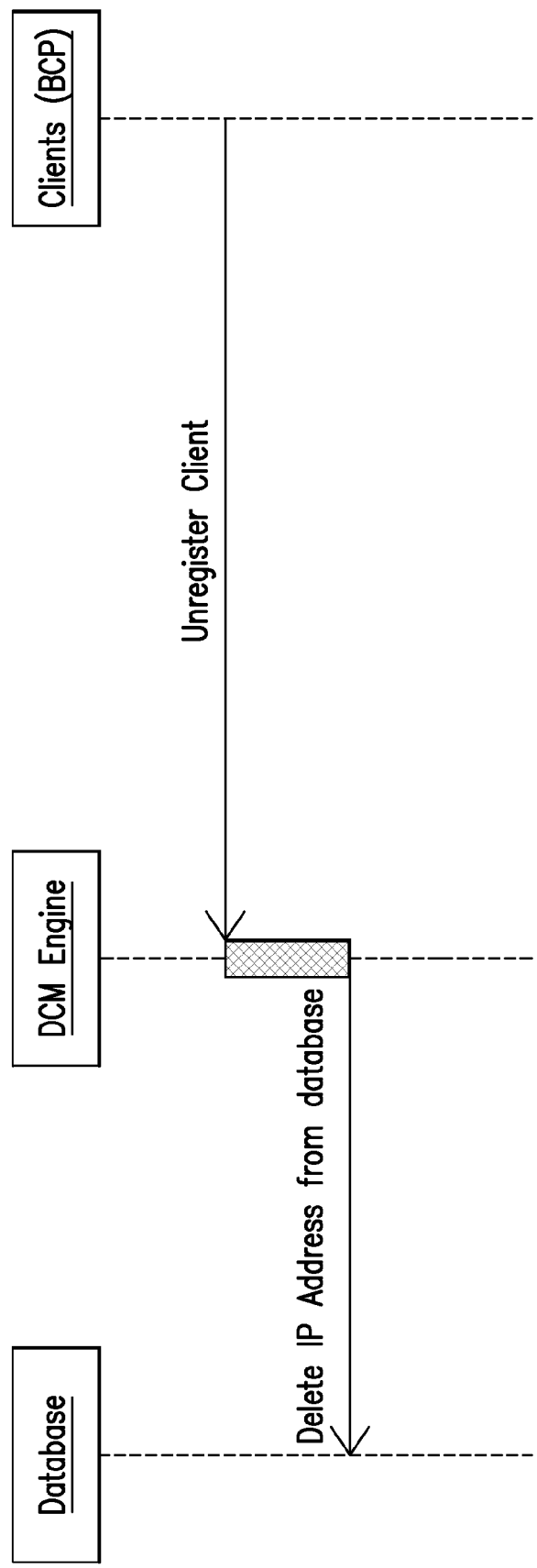
FIG. 10 illustrates a process of de-registering a client from a notification system in accordance with one or more embodiments.

FIG. 9 shows the process that occurs when the DCM engine wants to send out a notification. The UDP broadcast processor will query the database for a list of clients that have registered for a particular type of notification. The database replies with the list. The UDP broadcast processor then formats and sends the notification to all clients on the list using the assigned port number.

FIG. 6 is the message sequence that occurs when a client wants to 'unregister' from the notification system. If a user terminates the BCP application, the client would ask the DCM engine to unregister it from the notification system. This includes deleting it's IP address from the database.

Example Benefits and Aspects of the modified UDP Broadcast process and mechanism may include:

UDP message may be sent only to the registered clients, not broadcasted to all, which minimizes network traffic.
Enhances system security since only the registered clients will receive the UDP message.
Configuration of this system may be easily accomplished without a need to configure network devices in order to support multicast.
Any number of the client machines can be on a different network domain than the DCM engine.

EGM Group Collection Management

The ability to associate an Electronic Gaming Machine (EGM) to a group of EGMs. An EGM can belong to any number of groups, and an EGM group can be assigned to another EGM group allowing for 'nested' collections.

Within the Download and Configuration Management (DCM) Bally Control Panel (BCP), a user can associate an EGM with an EGM Collection Group. An EGM group is simply a collection of EGMs. An EGM group can contain other EGM groups. I.e. nested grouping. An EGM can belong to 0 or more EGM groups.

The user of the Bally Control Panel will be able to:
Create/Modify/Remove an EGM group.
Add/Remove EGMs and EGM collections of an EGM group.
Make a copy of an existing EGM group.

Associating a group of EGMs to a collection allows for the system to accomplish dynamic configuration assignments that can be applied concurrently, along with dynamic download assignments that can be scheduled independently of the configuration assignments.

For example, a new O/S version download can be scheduled to occur during off-peak hours for Sunday night. A configuration assignment can be scheduled to decrease the payout percentage of the bar top machines during happy hour each day of the week, and the Stars and Stripes configuration can have other configuration changes when a scheduled upcoming tournament is to be sponsored.

All of these assignments can be scheduled and allows for the casino manager to look at his casino from different perspectives and manage the casino effectively.

Figure 11:
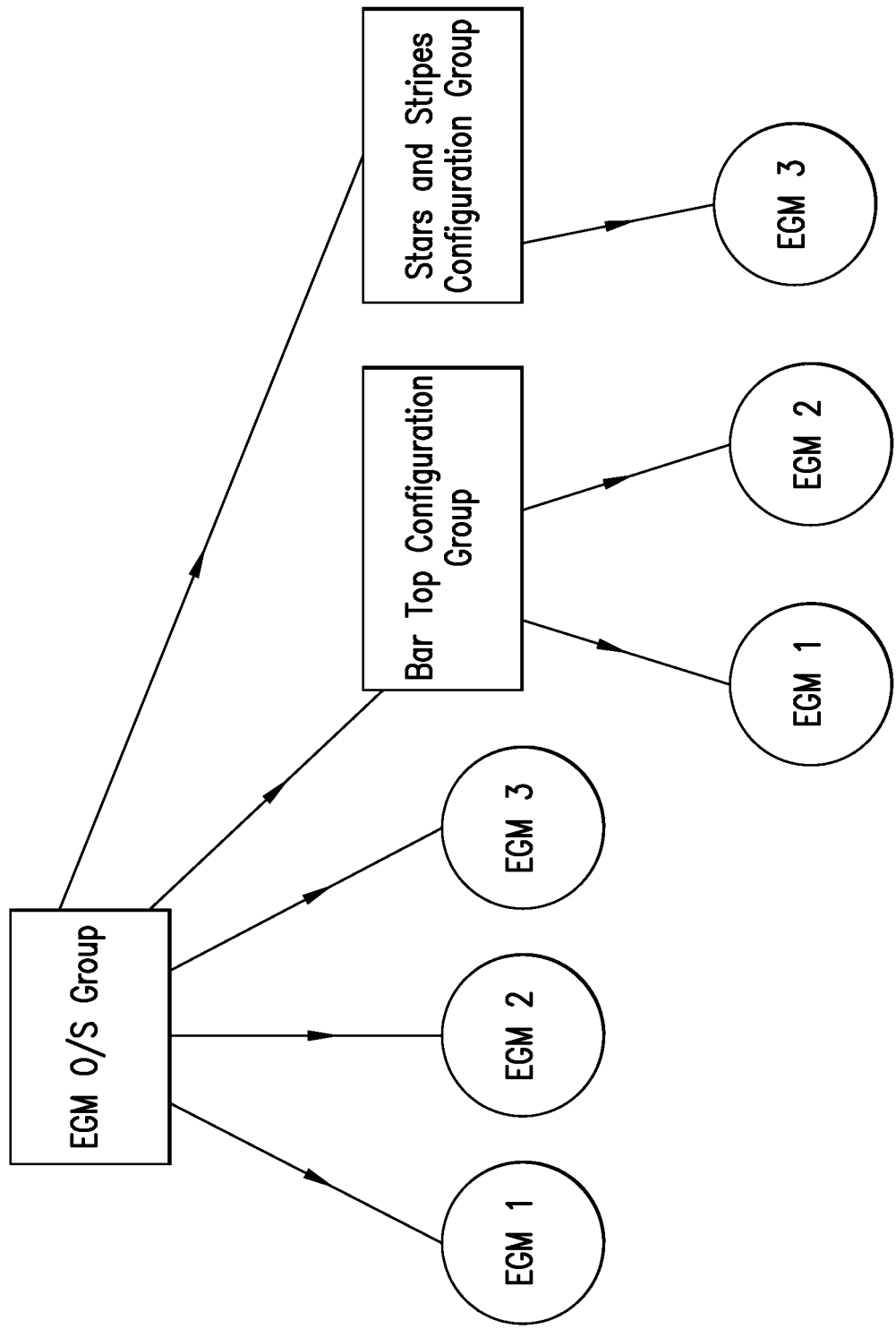
FIG. 11 illustrates a collection of gaming machines and associational relationships in accordance with one or more embodiments.

Referring to FIG. 11, a collection of gaming machines is shown including associational relationships that may be made by including relational coding in a control panel, such as a DCM server and a user interface including a display and keyboard. By using conventional relational programming, the features and capabilities of the DCM server may be extended from a single gaming machine or a floor of gaming machines, so that collections and groups of gaming machines may be virtually created. For instance, in FIG. 11, shown by example:

Three EGM collections are generated, one group includes EGMs with the same O/S software, another group includes EGMs based on casino location, and another group includes EGMs based on the game-theme.
EGMs may belong to multiple groups. E.g., EGM 1 is part of both the EGM O/S group and the Bar Top Configuration group.
Nested collections. Both the Bar Top Configuration Group and Stars and Stripes configuration group are part of the EGM O/S group.

By selectively grouping, a casino operator can download software specific to gaming machines having a particular operating system (O/S), location on the floor, or game theme, to name a few examples.

Method and System for Providing Download and Configuration Job Progress Tracking and Display Via Host User Interface.

The introduction of download and configuration capabilities in the gaming environment creates considerable operational challenges. Download will likely require a considerable volume of gaming content to be transferred over the network. Many casinos are open 24/7 which will require download to take place without disrupting normal gaming activities. In order to not tax the network resources it may be necessary to limit the download bandwidth at the expense of download time. It will not be unusual for some download jobs to take 30 minutes or more. Thus, a way of easily monitoring download progress would be invaluable to casino operators.

A Download system can be centralized and "push" the data down to the games. In this case, the content server knows how much has been downloaded at any time. However, in a "pull" system, where the games are told where to go for the data and the games are taking ('pulling') the data from the content server, the server generally does not know how much data a given game has downloaded. Thus, a way is needed for the games to keep the Download management system apprised of how far along they are in the download process.

Background:

Until recently, the gaming industry has been a collection of proprietary systems and communication protocols. In many cases, a casino had to buy the entire system (games, controllers and backend system) from one company. Most casinos would prefer to use a mix of manufacturers games on the gaming floor, and then pick the best backend system that suits their needs. Until recently, this was not a realistic expectation.

A few years ago, several gaming entities came together and created the Gaming Standards Association (GSA) in order to define standardized protocols by which games, gaming controllers and backend systems could communicate. This allows interoperability of different manufacturers equipment, as well as giving the casinos the freedom to choose whatever manufacturers they want for the various components of a gaming system. One of the GSA protocols is the Game-to-System (G2S) protocol, and is meant to define the messages between a gaming machine and a backend system. This protocol does include messages for handling software download and configuration of the gaming machines.

Diagram Explanation:

The Bally Download and Configuration system is using standard G2S messages to convey progress information from the EGMs to the G2S Host (see diagram). In this case, it uses the G2S 'packageStatus' message. The G2S Host then puts that message into a message queue. The Download and Configuration Manager (DCM) application reads the message from the message queue and processes it. So far in this communication chain, message structure and protocol is standard G2S, and uses standard Microsoft Message Queues (MSMQs).

The vast majority of communication between a Bally Control Panel (BCP) client (the GUI) and the DCM server is via a standard communication protocol, SOAP, which is a true client-server architecture where the server never initiates any communication. Therefore, if there is any information (like job progress info) that needs to be asynchronously sent to the BCP, the normal communication channel cannot be used. An inefficient method would have the BCP (a client) poll (ask) the DCM for any possible notification messages. Instead, a mechanism was devised that would allow for one-way messages from the server (DCM) to the clients (BCPs); this is the UDP Broadcast Processor (to be disclosed in a subsequent Initial Disclosure).

Figure 12:
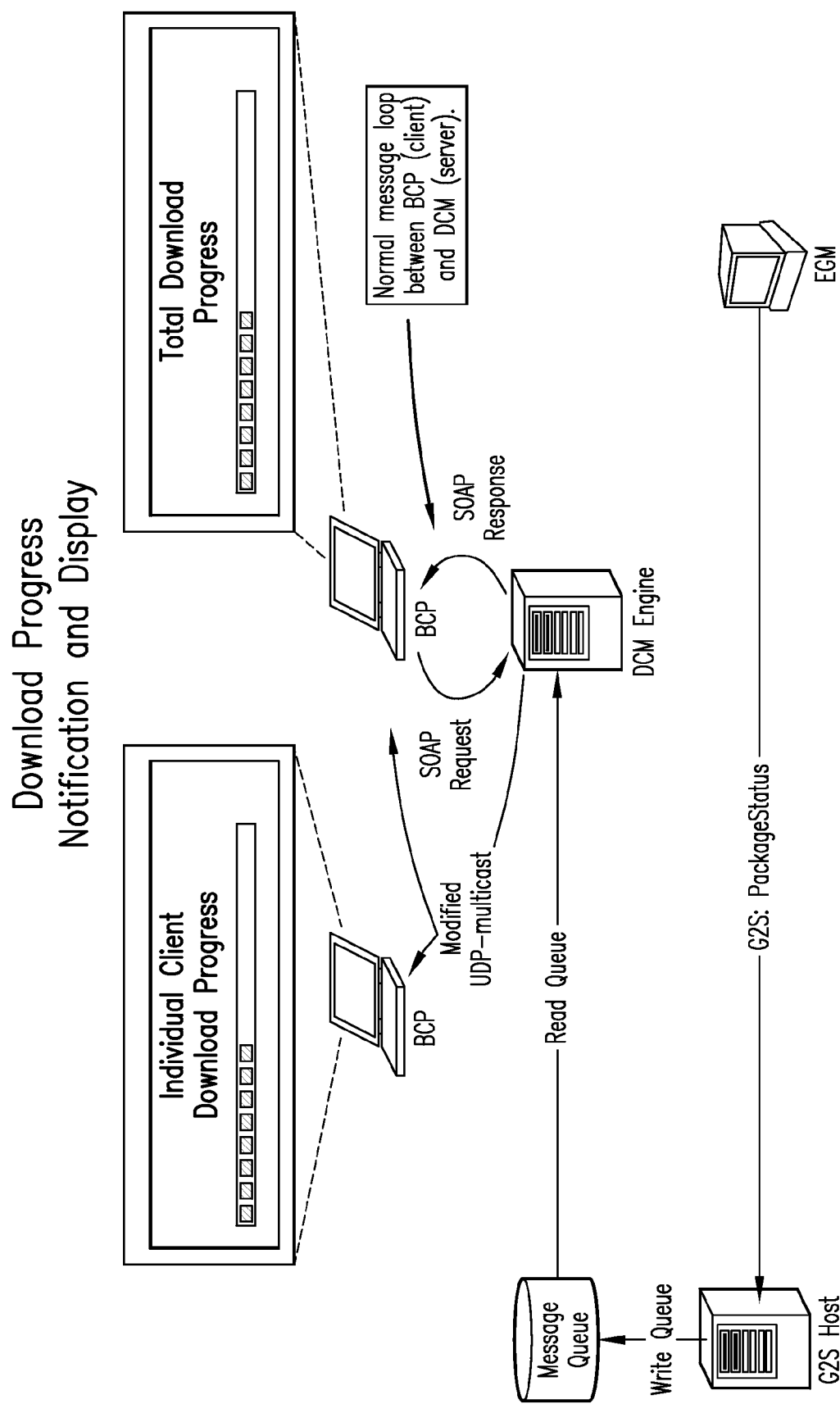
FIG. 12 illustrates a download progress notification and display incorporated as part of an example gaming network with download progress notification and display in accordance with one or more embodiments.

Solution:

Referring to FIG. 12, a download progress protocol used between the DCM message engine and other backend applications and/or system 'components'. The packageStatus message is converted into a proprietary one and given to the UDP Broadcast Processor for distribution to whatever Bally Control Panel (BCP) applications have registered with the UDP Broadcast Processor to receive download/config progress notification messages. The UDP Broadcast Processor uses a modified form of UDP-multicast for distributing the notification messages to the BCP client(s). This is not a true broadcast to all devices on the network which helps to minimize the bandwidth used to notify clients.

This feature provides the ability to view the percentage download progress in the Host UI (part of BCP) using a messaging scheme which overcomes the BCP-initiated protocol used for all other messaging between BCP and DCM (Client-Server). The Host UI displays the progress bar based on the percentage download communicated from the gaming device (downloading entity) to the DCM engine. All downloading gaming devices will also send a 'download complete' message. This information can also be used by the DCM and BCP to estimate future download time and bandwidth requirements.

A Method for Validating a Download or Configuration Assignment for an EGM or EGM Collection.

Using the Bally Control Panel (BCP) in a Bally Floor System (BFS) environment, a casino manager can schedule downloads or configuration settings to occur. Any number of assignments can be applied to an EGM. With this flexibility comes a potential for sending conflicting or contradictory assignments.

An example would be that a bank of EGMs may be scheduled to receive a new game theme to add to the list of games a player can choose from. It may, however, require that the EGMs also contain a specific version of the O/S in order to support the new game theme. In this case, the tool would validate the download assignment of the new game theme, displaying that the game theme requires an O/S download that has not yet been scheduled.

This feature would obviously save the casino manager the headache of downloading code that would not be able to either install and/or execute correctly once installed.

This feature helps the user in planning better in configuring the floor.

Basically, there two types of validations that are used, one for validating a download assignment and one for validating a configuration assignment.

Download Assignment Validation:

This feature validates a download assignment and calculates the chances of its success based on the current information. It verifies if the assignment would apply the changes successfully on the EGM at its execution time and inform the user about any reasons that would cause it to fail. The basic validation checks that would be performed are:

Checks if any download or install assignments are scheduled to occur at the same time. If scheduled, ensure that they are spaced well apart from each other so that they complete.

Checks if any configuration assignments are scheduled at the same time. If scheduled, ensure that they are spaced well apart from each other so that they completed.

Check if any configuration assignments are scheduled to run after the download and install to make the EGM playable.

Configuration Assignment Validation:

This feature validates a configuration assignment and calculates the chances of its success based on the current information. It verifies if the assignment would apply the changes successfully on the EGM at its execution time and inform the user about any reasons that would cause it to fail. The basic validation checks that would be performed are:

Checks if the options selected and their associated values in assignment apply to the selected EGMs.

If the configuration assignment is a game definition assignment and a game theme change, then check if the download and installation of the new game is scheduled to complete before the configuration assignment.

Check if there is any conflicting configuration or download assignments currently scheduled to run at the same time for the EGM.

With (in some cases), thousands of possible configuration options that can be modified and the way a casino manager may want to "manage" their floor, the potential for conflicting configurations to occur frequently. This feature can help the manager in planning floor configurations.

Profile Driven Device Configuration

The goal is affect configuration or content download changes on a device based on a pre-defined profile which may be time based.

Gaming machine configuration changes such as denomination, reel speed, game volume, bets per line and number of available lines and content download changes can be pre-defined on a time based schedule, called a profile. A slot manager or other authorized personnel can use a tool to select the gaming machine that is to be changed, select the configuration or content that should be changed, select the values for the configuration or the game theme to be changed, and the time and date profile for the change(s) and then implement that profile driven set of changes. A profile driven configuration change instruction set is comprised of a schedule and a set of machines assigned to that schedule.

For example, a slot manager may want to eliminate all penny and nickel denominations from games every Friday night at 5 pm and then add back the nickel denominations on Saturday morning at 9 am but continue to eliminate all penny denominations. The slot manager would create a time based profile that would affect that change precisely at 5 pm on every Friday and at 9 am on Saturday. This profile could be created and implemented in advance for one or more machines and then set to run.

Technical Challenges

There are several technical and operational challenges that must be overcome to be able to create a configuration change profile that will be executed in the future on a wide variety of device types.

First, you cannot set absolute values for configuration changes when each device doesn't handle or implement the configuration change in the same way. If you want to set the reel spin speed on a gaming device to low; that setting value may be completely different on a Bally machine compared to an IGT machine. A Bally machine may have a scale of 1-5 for reel speed with 1 being slow and 5 being fast compared to an IGT machine that has a scale of 1-10 with 1 being slow and 10 being fast. Instructing the system to change the reel speed to high across all machines on the floor would require a different configuration value for reel speed on a Bally machine and an IGT machine. So, there has to be a way to instruct the system to change the reel speed to low and then be able to translate that to the specific value for the machine that is being changed. Most of the profile driven changes will instruct the machine to change to a low, medium or high setting instead of an absolute setting like change to volume 3.

Second, because there are different machines from different manufacturers on the floor, each machine uses a different scale or value range for some configurable options and the type of machine or its settings may have changed between the time the profile was created and the change occurs, the machine has to be interrogated for its current configuration at the time of the configuration change. This is the only way to be able to know how to make the change in the correct way; by knowing exactly how the machine is configured at the time of the change. The system must be able to provide a dynamic machine "inventory" at the time that a configuration change is to occur.

Third, there must be some sort of lookup or translation table for each game theme/manufacturer that correlates the low, medium and high settings to a specific setting value. To use the reel speed example again, the profile will show a value of low, medium or high over a time period for one or more gaming devices. These gaming devices may be a combination of different manufacturers that have a different setting value for medium reel speed. When the system implements a profile driven change, it first must ask the machines what they are; "what manufacturer and game theme are you?" Once the system knows what kind of machine it is, it will refer to a lookup table (all in real-time) and lookup what reel speed value it needs to send to that machine to make it change to medium reel speed. It's possible that each machine may be different. Another scenario is that each Friday night, the reel speed is to be set to high. On one Friday night, the machine is a Bally Winning Times game but during the next week someone has gone and changed the chips in the machine and made it a Bally Fixin' 2 Win game with a different reel speed range. This can be handled with this interrogation method because the system will know what is on the machine when the change is to be done by getting its inventory.

Market

This product will work on a variety of games in the casino or arcade market for class 2 or 3, lottery or central determination.

What is Required to do Profile Driven Device Configurations from a Command and Control System?

1. A profile that defines a configuration value/level over time.
2. A definition of the configuration value that is to be set.
3. A means of knowing the current configuration of the machine that is to be changed.

Time Based Configuration Change Profile

Figure 13:
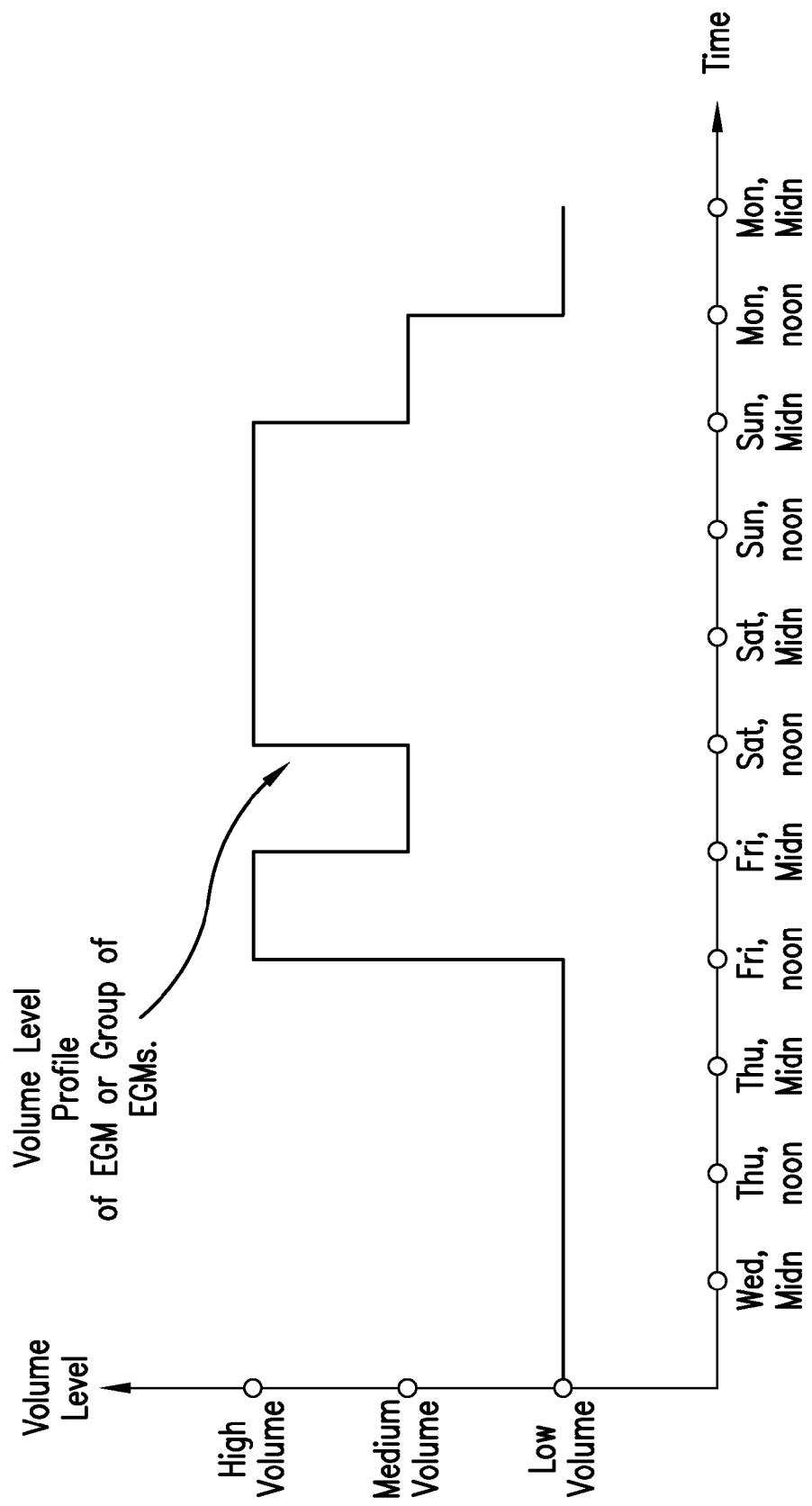
FIG. 13 illustrates a time versus volume profile that may be generated from a gaming machine in accordance with one or more embodiments.

Referring to FIG. 13, this profile shows a time versus volume profile that could be assigned to one or more gaming devices including electronic gaming machines, iView displays, signage displays, kiosks, audio systems, etc.

The horizontal axis shows time, in this case a week. The time duration can be any duration that you want. The vertical axis shows the value that is to be set on the machine relative to time. Note how we are not instructing the volume to be set to a specific number like 3 but instead to a low, medium or high level.

Note that the volume level indicators on the vertical axis are labeled as low, medium and high and not specific values such as volume 3. This is done because each gaming machine or game theme can have a different definition of low volume. For example, a Bally machine has a volume scale of 0-10. An IGT machine might have a volume scale of 0-100 and the command and control system would need to know what to set the volume to when instructed to set the volume to low based on what is on the machine when the change is due to occur.

Figure 14:
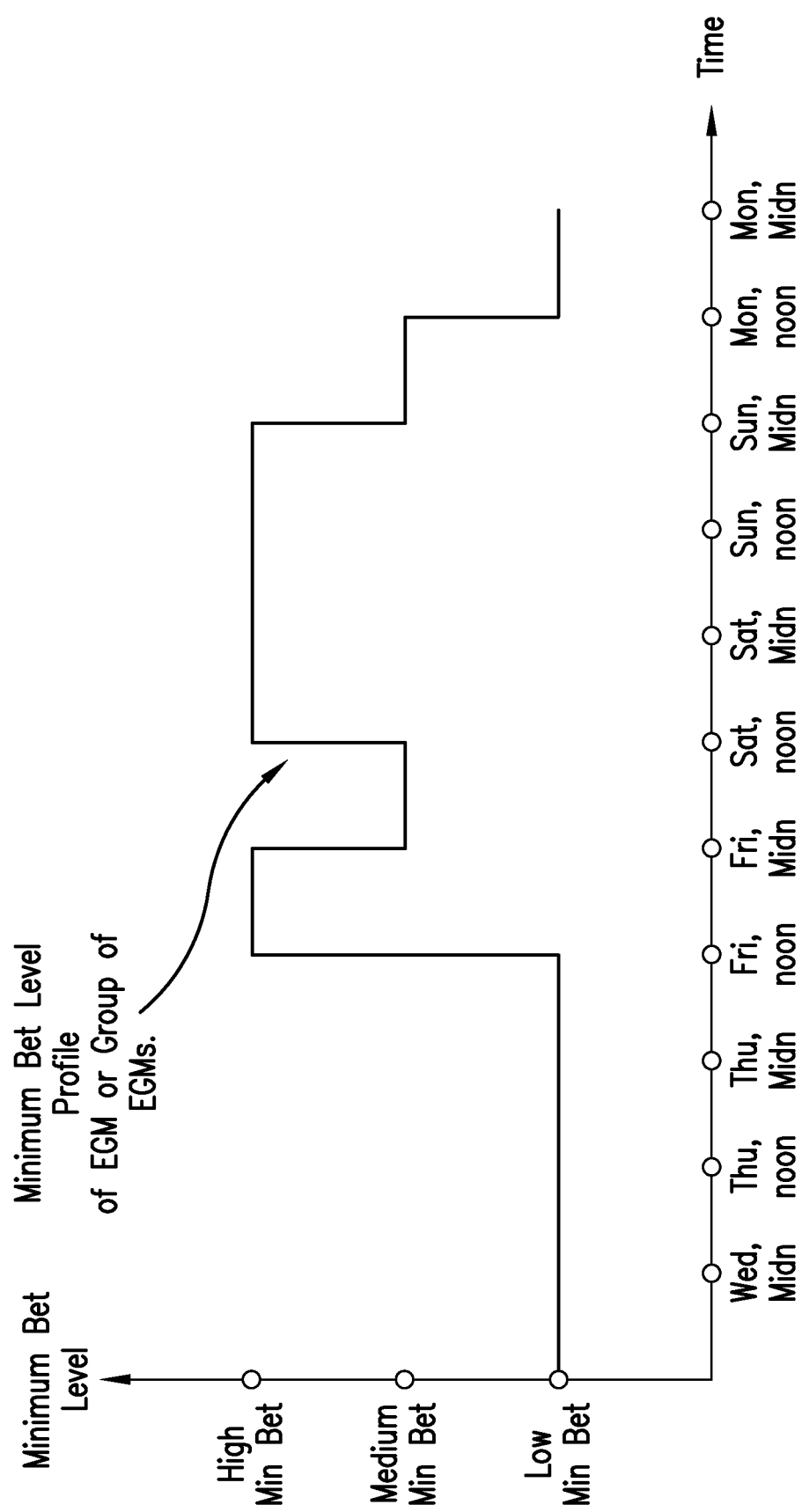
FIG. 14 illustrates a time versus minimum bet profile that may be generated from a gaming machine in accordance with one or more embodiments.

Referring to FIG. 14, another profile is shown of a time versus minimum bet level that can be assigned to one or more gaming machines. Just like the volume profile, the vertical axis shows a minimum bet level not a specific setting value.

The different configurations to be set could be:

Low, Medium and High Configurations volume reel speed minimum bet master volume jackpots Absolute Configurations denominations game themes operating systems In the case of an absolute configuration like denomination, there is no need for a low, medium or high level. The profile can instruct the machine to convert to a specific denomination.

What is needed is a lookup table for each machine on the system that is accessible by the command and control system when a profile driven change instruction set is scheduled to be made.

Gaming Machine Specific Lookup Tables

| Manufacturer | Cabinet Type | Game Theme | Game Volume Level | Game Volume Level Setting |
|---|---|---|---|---|
| Bally | V2020 | Winning Times | low | 2 |
| Bally | Cinevision | Winning Times | medium | 5 |
| Bally | S9e | Winning Times | high | 8 |
| WMS | Bluebird Stepper | Top Gun | low | 12 |
| WMS | Bluebird Video | Top Gun | medium | 45 |
| WMS | Bluebird Slant | Top Gun | high | 88 |
| IGT | AVP | Fort Knox | low | 17 |
| IGT | AVP Reel | Fort Knox | medium | 32 |
| IGT | AVP Slant | Fort Knox | high | 49 |
| Novomatic | Novo 1 | Grey Goose | low | 2 |
| Novomatic | Novo 2 | Grey Goose | medium | 6 |
| Novomatic | Novo 3 | Grey Goose | high | 11 |
| ... | | | | |
| ... | | | | |
| ... | | | | |

For volume, this is what a lookup table would look like. As you can see, when a volume change is requested by the profile driven schedule, the command and control system gets the machine characteristics and can use the lookup table to determine what game volume setting value to use when it wants to switch to low game volume.

Slot managers and manufacturers will need to create these tables one time on installation of the command and control system and then only make changes if there are new settings that they want.

For instance, the system would attempt to change the game volume on floor machines to high on Friday at noon, if the user adjusts the settings. If the change was to be made on a WMS, Bluebird Stepper that was running the Top Gun game theme, then the game volume level setting would be 45 as may be noted in the table above.

There are hundreds of cabinets on the floor and each may need to be changed so the command and control system would need to know what manufacturer, cabinet type, game theme and volume level to set to and then use the lookup table to make the correct change.

LookUp Table - Minimum Bet

| Manufacturer | Cabinet Type | Theme | Pay Table | Denomination | Minimum Bet | Bet Per Line Options | Minimum Bet Per Line Setting | # of Lines Options | Minimum # of Lines Setting |
|---|---|---|---|---|---|---|---|---|---|
| Bally V2020, Winning Times Minimum Bet Lookup Table | | | | | | | | | |
| Bally | V2020 | Winning Times | 90% | $0.01 | low - $.60 | 1, 2, 3, 4, 5 | 3 | 1, 3, 5, 9, 15, 20, 50 | 20 |
| Bally | V2020 | Winning Times | 90% | $0.01 | medium - $1.25 | 1, 2, 3, 4, 5 | 3 | 1, 3, 5, 9, 15, 20, 50 | 50 |
| Bally | V2020 | Winning Times | 90% | $0.01 | high - $2.50 | 1, 2, 3, 4, 5 | 5 | 1, 3, 5, 9, 15, 20, 50 | 50 |
| Bally | V2020 | Winning Times | 90% | $0.05 | low - $.60 | 1, 2, 3, 4, 5 | 2 | 1, 3, 5, 9, 15, 20, 50 | 9 |
| Bally | V2020 | Winning Times | 90% | $0.05 | medium - $1.25 | 1, 2, 3, 4, 5 | 3 | 1, 3, 5, 9, 15, 20, 50 | 9 |
| Bally | V2020 | Winning Times | 90% | $0.05 | high - $2.50 | 1, 2, 3, 4, 5 | 4 | 1, 3, 5, 9, 15, 20, 50 | 15 |
| Bally | V2020 | Winning Times | 90% | $0.10 | low - $.60 | 1, 2, 3, 4, 5 | 4 | 1, 3, 5, 9, 15, 20, 50 | 3 |
| Bally | V2020 | Winning Times | 90% | $0.10 | medium - $1.25 | 1, 2, 3, 4, 5 | 3 | 1, 3, 5, 9, 15, 20, 50 | 9 |
| Bally | V2020 | Winning Times | 90% | $0.10 | high - $2.50 | 1, 2, 3, 4, 5 | 2 | 1, 3, 5, 9, 15, 20, 50 | 9 |
| WMS Bluebird, Top Gun Minimum Bet Lookup Table | | | | | | | | | |
| WMS | Bluebird | Top Gun | 92% | $0.01 | low - $.60 | 1, 2, 3, 4, 5, 6, 7, 8, 9 | 4 | 1, 5, 9, 15, 50 | 15 |
| WMS | Bluebird | Top Gun | 92% | $0.01 | medium - $1.25 | 1, 2, 3, 4, 5, 6, 7, 8, 9 | 4 | 1, 5, 9, 15, 50 | 50 |
| WMS | Bluebird | Top Gun | 92% | $0.01 | high - $2.50 | 1, 2, 3, 4, 5, 6, 7, 8, 9 | 6 | 1, 5, 9, 15, 50 | 50 |
| WMS | Bluebird | Top Gun | 92% | $0.05 | low - $.60 | 1, 2, 3, 4, 5, 6, 7, 8, 9 | 3 | 1, 5, 9, 15, 50 | 15 |
| WMS | Bluebird | Top Gun | 92% | $0.05 | medium - $1.25 | 1, 2, 3, 4, 5, 6, 7, 8, 9 | 4 | 1, 5, 9, 15, 50 | 9 |
| WMS | Bluebird | Top Gun | 92% | $0.05 | high - $2.50 | 1, 2, 3, 4, 5, 6, 7, 8, 9 | 5 | 1, 5, 9, 15, 50 | 15 |
| WMS | Bluebird | Top Gun | 92% | $0.10 | low - $.60 | 1, 2, 3, 4, 5, 6, 7, 8, 9 | 5 | 1, 5, 9, 15, 50 | 3 |

LookUp Table - Minimum Bet

| Manufacturer | Cabinet Type | Theme | Pay Table | Denomination | Minimum Bet | Bet Per Line Options | Minimum Bet Per Line Setting | # of Lines Options | Minimum # of Lines Setting |
|---|---|---|---|---|---|---|---|---|---|
| WMS | Bluebird | Top Gun | 92% | $0.10 | medium - $1.25 | 1, 2, 3, 4, 5, 6, 7, 8, 9 | 4 | 1, 5, 9, 15, 50 | 3 |
| WMS | Bluebird | Top Gun | 92% | $0.10 | high - $2.50 | 1, 2, 3, 4, 5, 6, 7, 8, 9 | 3 | 1, 5, 9, 15, 50 | 9 |

Another example of a profile driven change would be minimum bet. In this case, the operator would want to control the minimum bet that a customer could make on each machine. One way to control minimum bet on a slot titles is by setting the number of lines on the game and the minimum coins to be bet per line.

Here is an example of a lookup table for minimum bet. In this case, only Bally and WMS are show for one of each of their games but other manufacturers would be added as they are connected to the command and control system.

Real-Time Inventory and Interrogation

The command and control system uses G2S to communicate with the gaming devices and has the capability to perform a complete interrogation of the gaming device and get all settings including game theme, current denominations, current game volume, current game reel speed, current bet options and line options, current host settings and almost all other machine settable parameters. The system can request and get these values in real-time.

XML Data Structure—Use of XML For Messages

The basic idea is to let the user, or an external system, specify a profile to modify any of the available options, or meta options like Minimum Bet. The bet profile input file which you currently use to set bet amount can easily be formatted to specify a series of times and a list of options and values for any options as shown below:

```
<!-- Showing use for minimum bet />
<ChangeProfile>
    <ChangeInstance StartTime="Jan 30, 2007 6:00am">
        <OptionItem name="MinBetAmount", value="Low">
    </ChangeInstance>
    <ChangeInstance StartTime="Jan 30, 2007 4:00pm">
        <OptionItem name="MinBetAmount", value="High">
    </ChangeInstance>
</ChangeProfile>
<!-- Showing use for game speed and game volume together* />
<ChangeProfile>
    <ChangeInstance StartTime="Jan 30, 2007 6:00am">
        <OptionItem name="BAL__GameSpeed", value="1">
        <OptionItem name="BAL__GameVolume", value="5">
    </ChangeInstance>
    <ChangeInstance StartTime="Jan 30, 2007 4:00pm">
        <OptionItem name="BAL__GameSpeed", value="3">
        <OptionItem name="BAL__GameVolume", value="6">
    </ChangeInstance>
</ChangeProfile>
```

When the system executes the profile, it uses the table you've outlined to resolve what each item means on a per EGM basis. The table would be made more generic so that it had columns for OptionName, OptionValue, G2S_DeviceClass, G2S_OptionGroup, G2S_OptionItem, and G2SOptionValue.

When the system creates a job, it will look up the OptionItem Name in the table for the given EGM's theme, paytable, and denom. If one or more matching rows exists we can map it to the actual G2S options and send the appropriate command. (for example MinBetAmount becomes Bal_MinBetPerLine and Bal_MinNumberOfLines) If no rows match, we can still send the command if it happens to match a actual G2SOption for that game. (Like BAL_GameSpeed). If there is still no match, it would be logged as an error.

In addition, wildcards in the Table may be supported so we can reduce the number of rows. For instance, if we would do the same thing for every pay table, then instead of have rows for each payTable, we would just put a * in that column.

A manufacture column may be added to the Table. In this way we get support for meta options that we can display in the UI and allow customers to make generic assignments that work across disparate manufacturers. These meta options could be displayed in the standard configuration wizards as well as the special profile wizard.

XML Format of Profile Data

```
<?xml version="1.0" encoding="utf-8" ?>
- <ChangeProfile name="Sample MinBet Profile" author="Haiyang">
- <ChangeInstance startingTime="2007-07-20 00:00:00">
    <optionItem name="MinBetAmount" value="Low" />
    </ChangeInstance>
- <ChangeInstance startingTime="2007-07-25 00:00:00">
    <optionItem name="MinBetAmount" value="Medium" />
    </ChangeInstance>
- <ChangeInstance startingTime="2007-07-29 00:00:00">
    <optionItem name="MinBetAmount" value="High" />
    </ChangeInstance>
- <ChangeInstance startingTime="2007-08-05 00:00:00">
    <optionItem name="MinBetAmount" value="Medium" />
    </ChangeInstance>
- <ChangeInstance startingTime="2007-08-29 00:00:00">
    <optionItem name="MinBetAmount" value="High" />
    </ChangeInstance>
- <ChangeInstance startingTime="2007-09-20 00:00:00">
    <optionItem name="MinBetAmount" value="Low" />
    </ChangeInstance>
- <ChangeInstance startingTime="2007-10-21 21:00:00">
    <optionItem name="BAL__WaveVolume" value="7" />
    <optionItem name="BAL__LineVolume" value="7" />
    </ChangeInstance>
- <ChangeInstance startingTime="2007-11-21 21:00:00">
    <optionItem name="BAL__WaveVolume" value="6" />
    </ChangeInstance>
- <ChangeInstance startingTime="2007-12-22 21:00:00">
    <optionItem name="BAL__WaveVolume" value="8" />
    </ChangeInstance>
    </ChangeProfile>
```

The system would use the XML data in the format above to build a visual representation of the profile curve as shown in figures above.

Figure 15:
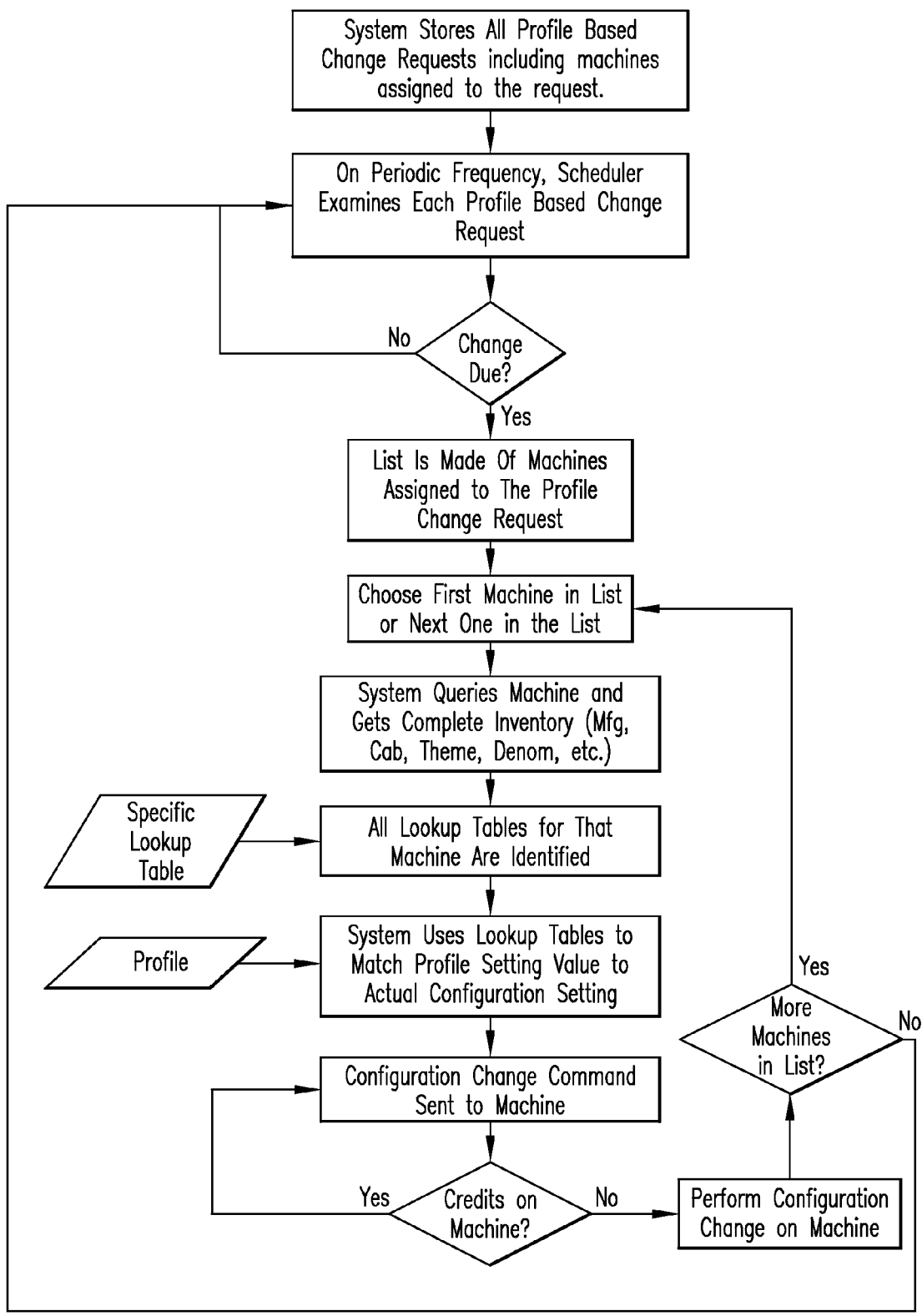
FIG. 15 illustrates an example process flow for generating gaming machine performance tables.

Referring to FIG. 15, a process diagram illustrates an example process flow that may be implemented in programming implemented on the system and executed to generate the Tables shown above.

Figure 16:
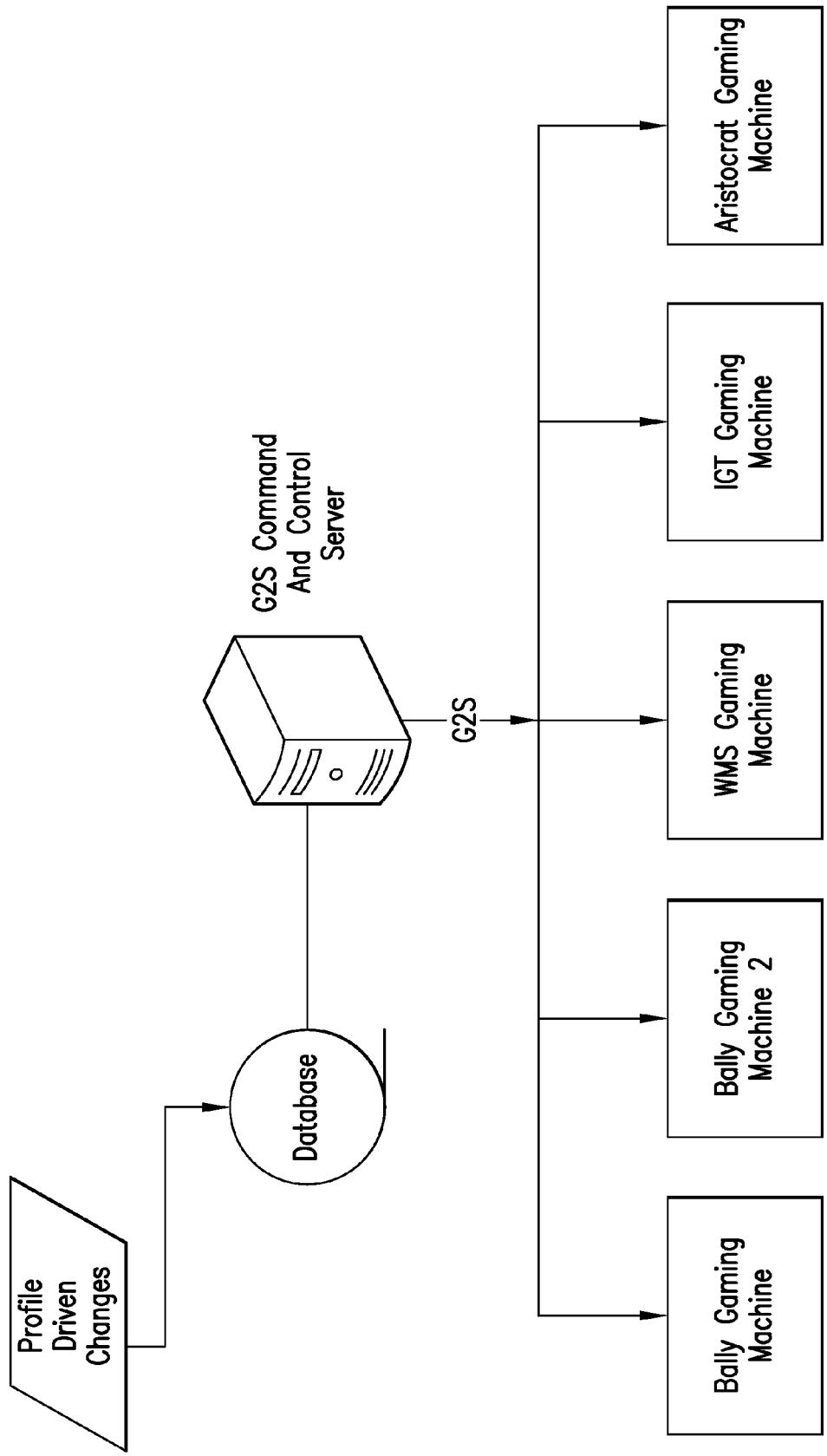
FIG. 16 illustrates an example system diagram for generating profile driven changes within the system.

Referring to FIG. 16, a system network is illustrated for generating profile driven changes within the system.

Meta-Options

Electronic slot machines combine hardware and software to deliver gaming applications to customers. The software is comprised of operating system and game software both of which have configurable parameters or options. Each configurable option has a variable name and one or more valid values that can be set; only valid values can be set in the software. The Table below illustrates some examples of configurable options, valid option values and the option variable name:

| Software Component | Configurable Option | Valid Option Values | Option Variable Name |
|---|---|---|---|
| Operating System | Jackpot Limit | 0-5000 | Jackpot_Lim |
| Operating System | Download Transfer Speed | 0-2,000,000 | Idle_Sp_Tran |
| Operating System | Bill Stacker Limit | 0-12,000 | B_StackLim |
| Game | Game Volume | 0-10 | G_Vol |
| Game | Bet Per Line | 1, 2, 3, 4, 5, 10, 25, 50 | BP_Line |
| Game | Denomination | 1, 5, 10, 25, 50, 100, 500, 1000 | Denom |

The available configurable options, the valid option values and the option variable names are a unique set to each electronic slot machine manufacturer's operating system and game software. Further, each of the games from a single manufacturer can have a completely different configurable option list with unique option values and option variable names so there is a unique set of this data for each manufacturer and game combination.

The operation of the electronic slot machine can be changed by making changes to the configurable options within the permitted or valid configurable option values. For example, the game volume can be changed to low by changing the G_Vol option variable to 1 or changed to high by changing the G_Vol option variable to 9. As you can see, the game volume is controlled by a single configurable option just as the Bill Stacker Limit or Bet Per Line is. Changing those individual configurable options to one of the valid option values would have an affect on the electronic slot machine.

However, there are several issues that need to be overcome to efficiently change configurations on a gaming floor.

First, for many slot floor changes, casino slot directors does not think in terms of absolute values of configuration options; they think in terms of low, medium and high. As an example, they think of game volume as low, medium and high. On a busy Friday night, they want the volume on all electronic gaming machines to be set to high but after midnight they want to have the game volume set to low. The slot floor director wants to set options like game volume, minimum bet, game speed and other game settings to an subjective value and does not think in terms of the absolute valid option values. There needs to be a way to direct the entire floor to switch to high volume, for example.

Second, the slot floor director wants to make changes to the floor as a whole, not as individual gaming machines. The slot floor director wants to set the entire floor game volume to high with one command. The problem is that the slot floor is composed of a wide variety of electronic gaming machines from different manufacturers each with multiple game themes on the electronic gaming machines. Each of the manufacturers will provide a means of setting game volume but there is no guarantee that the valid option values or the option variable name will be consistent between games from different manufacturers or even different games within the same manufacturer. There needs to be a way to create a "look-up" table for each manufacturer and game combination that defines. The Table below illustrates a look-up table for game volume for different manufacturers and different games from the same manufacturer:

| Manufacturer | Game Theme | Software Component | Configurable Option | Valid Option Values | Option Variable Name |
|---|---|---|---|---|---|
| Bally | Blazing 7s | Game | Game Volume | 0-10 | G_Vol |
| Bally | Bonus 7s | Game | Game Volume | 0-10 | G_Vol |
| Bally | Winning Times | Game | Game Volume | 0-10 | G_Vol |
| Bally | Fixin' to Win | Game | Game Volume | 0-10 | G_Vol |
| IGT | Fort Knox | Game | Game Volume | 1-100 | GameVol |
| IGT | Wheel of Fortune | Game | Game Volume | 1-500 | GameVol |
| WMS | Top Gun | Game | Game Volume | 0-50 | Vol_Gm |
| WMS | Monopoly | Game | Game Volume | 0-50 | Vol_Gm |
| Aristocrat | Double Dolphins | Game | Game Volume | 0-5 | Game_Vol_Level |
| Aristocrat | Queen of the Nile | Game | Game Volume | 0-10 | Game_Vol_Level |

This invention introduces the concept of a meta-option. A meta-option is a configuration option that does not use an absolute option value as the setting but instead uses a subjective value such as:

- low volume, medium volume, high volume
- slow reel speed, medium reel speed, fast reel speed
- low denomination, medium denomination, high denomination small jackpot limit, medium jackpot limit, high jackpot limit low minimum bet, medium minimum bet, high minimum bet Friday night game mix, Saturday night game mix, Sunday night game mix, Tuesday thru Thursday game mix Volume reduction by 30%

Game speed increase by 20%

Bet per line increase by 15%

Number of lines increase by 30%

A meta-option is an arbitrary way of identifying a configuration option(s) change that is tied by business logic to a set of pre-defined configuration option values. The meta-option tie to specific configuration option values must be done in advance and stored in the database of the system in schema before a meta-option change can occur. An example of a low, medium and high volume meta-option change tie to the game volume configuration option value is shown below.

| Manufacturer | Game Theme | Configurable Option | Volume Level | Option Setting | Option Variable Name |
|---|---|---|---|---|---|
| Bally | Blazing 7s | Game Volume | Low | 1 | G_Vol |
| Bally | Blazing 7s | Game Volume | Medium | 5 | G_Vol |
| Bally | Blazing 7s | Game Volume | High | 9 | G_Vol |
| Bally | Bonus 7s | Game Volume | Low | 1 | G_Vol |
| Bally | Bonus 7s | Game Volume | Medium | 5 | G_Vol |
| Bally | Bonus 7s | Game Volume | High | 9 | G_Vol |
| Bally | Winning Times | Game Volume | Low | 1 | G_Vol |
| Bally | Winning Times | Game Volume | Medium | 5 | G_Vol |
| Bally | Winning Times | Game Volume | High | 9 | G_Vol |
| Bally | Fixin' to Win | Game Volume | Low | 1 | G_Vol |
| Bally | Fixin' to Win | Game Volume | Medium | 5 | G_Vol |
| Bally | Fixin' to Win | Game Volume | High | 9 | G_Vol |
| IGT | Fort Knox | Game Volume | Low | 5 | GameVol |
| IGT | Fort Knox | Game Volume | Medium | 50 | GameVol |
| IGT | Fort Knox | Game Volume | High | 85 | GameVol |
| IGT | Wheel of Fortune | Game Volume | Low | 25 | GameVol |
| IGT | Wheel of Fortune | Game Volume | Medium | 250 | GameVol |
| IGT | Wheel of Fortune | Game Volume | High | 400 | GameVol |
| WMS | Top Gun | Game Volume | Low | 8 | Vol_Gm |
| WMS | Top Gun | Game Volume | Medium | 20 | Vol_Gm |
| WMS | Top Gun | Game Volume | High | 45 | Vol_Gm |
| WMS | Monopoly | Game Volume | Low | 8 | Vol_Gm |
| WMS | Monopoly | Game Volume | Medium | 20 | Vol_Gm |
| WMS | Monopoly | Game Volume | High | 45 | Vol_Gm |
| Aristocrat | Double Dolphins | Game Volume | Low | 1 | Game_Vol_Level |
| Aristocrat | Double Dolphins | Game Volume | Medium | 3 | Game_Vol_Level |
| Aristocrat | Double Dolphins | Game Volume | High | 4 | Game_Vol_Level |
| Aristocrat | Queen of the Nile | Game Volume | Low | 2 | Game_Vol_Level |
| Aristocrat | Queen of the Nile | Game Volume | Medium | 6 | Game_Vol_Level |
| Aristocrat | Queen of the Nile | Game Volume | High | 8 | Game_Vol_Level |

This table shows how a tie is made between low, medium and high volume meta-option and specific valid configuration option values. The slot floor operator can set a meta-option change to set all game volumes to low and the system uses this table (a table in the database) to know what valid configuration option value to set which machine to. Note that the ber of lines and bet per line that define the minimum number of credits that can be wagered on a single game play. A meta-option for minimum bet could be constructed and then defined for every different combination of manufacturer and game theme on the floor. The Table below illustrates the creation of a meta-option table for minimum bet:

| Manufacturer | Cabinet Type | Theme | Pay Table | Denomination | Minimum Bet | Bet Per Line Options | Minimum Bet Per Line Setting | Bet Per Line Variable Name | # of Lines Options | Minimum # of Lines Setting | Number of Lines Variable Name |
|---|---|---|---|---|---|---|---|---|---|---|---|
| Bally | V2020 | Winning Times | 90% | $0.01 | low - $.60 | 1, 2, 3, 4, 5 | 3 | B_Lines | 1, 3, 5, 9, 15, 20, 50 | 20 | Num_Lines |
| Bally | V2020 | Winning Times | 90% | $0.01 | medium - $1.25 | 1, 2, 3, 4, 5 | 3 | B_Lines | 1, 3, 5, 9, 15, 20, 50 | 50 | Num_Lines |
| Bally | V2020 | Winning Times | 90% | $0.01 | high - $2.50 | 1, 2, 3, 4, 5 | 5 | B_Lines | 1, 3, 5, 9, 15, 20, 50 | 50 | Num_Lines |
| Bally | V2020 | Winning Times | 90% | $0.05 | low - $.60 | 1, 2, 3, 4, 5 | 2 | B_Lines | 1, 3, 5, 9, 15, 20, 50 | 9 | Num_Lines |
| Bally | V2020 | Winning Times | 90% | $0.05 | medium - $1.25 | 1, 2, 3, 4, 5 | 3 | B_Lines | 1, 3, 5, 9, 15, 20, 50 | 9 | Num_Lines |
| Bally | V2020 | Winning Times | 90% | $0.05 | high - $2.50 | 1, 2, 3, 4, 5 | 4 | B_Lines | 1, 3, 5, 9, 15, 20, 50 | 15 | Num_Lines |
| Bally | V2020 | Winning Times | 90% | $0.10 | low - $.60 | 1, 2, 3, 4, 5 | 4 | B_Lines | 1, 3, 5, 9, 15, 20, 50 | 3 | Num_Lines |
| Bally | V2020 | Winning Times | 90% | $0.10 | medium - $1.25 | 1, 2, 3, 4, 5 | 3 | B_Lines | 1, 3, 5, 9, 15, 20, 50 | 9 | Num_Lines |
| Bally | V2020 | Winning Times | 90% | $0.10 | high - $2.50 | 1, 2, 3, 4, 5 | 2 | B_Lines | 1, 3, 5, 9, 15, 20, 50 | 9 | Num_Lines |
| WMS | Bluebird | Top Gun | 92% | $0.01 | medium - $1.25 | 1, 2, 3, 4, 5, 6, 7, 8, 9 | 4 | Bet_PL | 1, 5, 9, 15, 50 | 50 | Number_L |
| WMS | Bluebird | Top Gun | 92% | $0.01 | high - $2.50 | 1, 2, 3, 4, 5, 6, 7, 8, 9 | 6 | Bet_PL | 1, 5, 9, 15, 50 | 50 | Number_L |
| WMS | Bluebird | Top Gun | 92% | $0.05 | low - $.60 | 1, 2, 3, 4, 5, 6, 7, 8, 9 | 3 | Bet_PL | 1, 5, 9, 15, 50 | 15 | Number_L |
| WMS | Bluebird | Top Gun | 92% | $0.05 | medium - $1.25 | 1, 2, 3, 4, 5, 6, 7, 8, 9 | 4 | Bet_PL | 1, 5, 9, 15, 50 | 9 | Number_L |
| WMS | Bluebird | Top Gun | 92% | $0.05 | high - $2.50 | 1, 2, 3, 4, 5, 6, 7, 8, 9 | 5 | Bet_PL | 1, 5, 9, 15, 50 | 15 | Number_L |
| WMS | Bluebird | Top Gun | 92% | $0.10 | low - $.60 | 1, 2, 3, 4, 5, 6, 7, 8, 9 | 5 | Bet_PL | 1, 5, 9, 15, 50 | 3 | Number_L |
| WMS | Bluebird | Top Gun | 92% | $0.10 | medium - $1.25 | 1, 2, 3, 4, 5, 6, 7, 8, 9 | 4 | Bet_PL | 1, 5, 9, 15, 50 | 3 | Number_L |
| WMS | Bluebird | Top Gun | 92% | $0.10 | high - $2.50 | 1, 2, 3, 4, 5, 6, 7, 8, 9 | 3 | Bet_PL | 1, 5, 9, 15, 50 | 9 | Number_L |
| IGT | AVP | Fort Knox | 94% | $0.01 | low - $.60 | 2, 4, 6, 8 | 2 | Bet | 1, 2, 4, 7, 9, 12, 20 | 1 | Lines |
| IGT | AVP | Fort Knox | 94% | $0.01 | medium - $1.25 | 2, 4, 6, 8 | 4 | Bet | 1, 2, 4, 7, 9, 12, 20 | 2 | Lines |
| IGT | AVP | Fort Knox | 94% | $0.01 | high - $2.50 | 2, 4, 6, 8 | 6 | Bet | 1, 2, 4, 7, 9, 12, 20 | 4 | Lines |
| IGT | AVP | Fort Knox | 94% | $0.05 | low - $.60 | 2, 4, 6, 8 | 2 | Bet | 1, 2, 4, 7, 9, 12, 20 | 4 | Lines |
| IGT | AVP | Fort Knox | 94% | $0.05 | medium - $1.25 | 2, 4, 6, 8 | 2 | Bet | 1, 2, 4, 7, 9, 12, 20 | 7 | Lines |
| IGT | AVP | Fort Knox | 94% | $0.05 | high - $2.50 | 2, 4, 6, 8 | 4 | Bet | 1, 2, 4, 7, 9, 12, 20 | 9 | Lines |
| IGT | AVP | Fort Knox | 94% | $0.10 | low - $.60 | 2, 4, 6, 8 | 2 | Bet | 1, 2, 4, 7, 9, 12, 20 | 9 | Lines |
| IGT | AVP | Fort Knox | 94% | $0.10 | medium - $1.25 | 2, 4, 6, 8 | 2 | Bet | 1, 2, 4, 7, 9, 12, 20 | 12 | Lines |
| IGT | AVP | Fort Knox | 94% | $0.10 | high - $2.50 | 2, 4, 6, 8 | 2 | Bet | 1, 2, 4, 7, 9, 12, 20 | 20 | Lines | system must have the ability to interrogate the electronic gaming machine when it wants to make a meta-option change so it can use that data to look up the valid configuration option value to use.

For example, if the meta-option change sets the volume across the floor to low, the system would interrogate the floor to know what is on the floor. When it interrogates the first machine and detects that it is an Aristocrat-Queen of the Nile game, it uses the lookup table to know that it should set the Game_Vol_Level variable to 2. When it interrogates the next machine and detects that it is a Bally-Winning Times game, it uses the lookup table to know that it should set the G_Vol variable to 1.

Another use of meta-options is setting minimum bet. Setting minimum bet can be accomplished by changing the num- This table shows how a tie is made between low, medium and high minimum bet meta-option and two specific valid configuration option values. The slot floor operator can set a meta-option change to set all game minimum bets to low and the system uses this table (a table in the database) to know what valid configuration option value to set which machine to. Note that the system must have the ability to interrogate the electronic gaming machine when it wants to make a meta-option change so it can use that data to look up the valid configuration option value to use.

For example, if the meta-option change sets the minimum bet across the floor to low, the system would interrogate the floor to know what is on the floor. When it interrogates the first machine and detects that it is an IGT-Fort Knox-94%-Penny Game game, it uses the lookup table to know that it should set the Bet variable to 2 and Lines variable to 1. When it interrogates the next machine and detects that it is a Bally-Winning Times-90%-Nickel game, it uses the lookup table to know that it should set the B_Lines variable to 2 and the Num_Lines variable to 9.

It is important to note that the slot floor director must build these meta-option tables for each meta-option that they want to set and must include all of the possible manufacturer and game theme combinations in the table because this table data is the only way to index a subjective meta-option setting to a specific configuration option(s) valid value and variable name.

The meta-option solves the issues noted above with traditional configuration options.

First, the meta-option is more intuitive and understandable to the slot floor director.

Second, the meta-option is the only practical way to set an option across a diverse floor with machines that 1) have different valid option values and 2) name the option variable in different ways.

Third, the meta-option allows the slot floor director to set floor wide parameters that are not necessarily defined by one single configuration option. The meta-option allows the slot floor director to make up a configurable option and then bundle a collection of different individual configuration options into one meta-option. For example, setting volume across the entire floor would require knowledge of each manufacturer's valid game volume option value and the variable name for each option.

Figure 17:
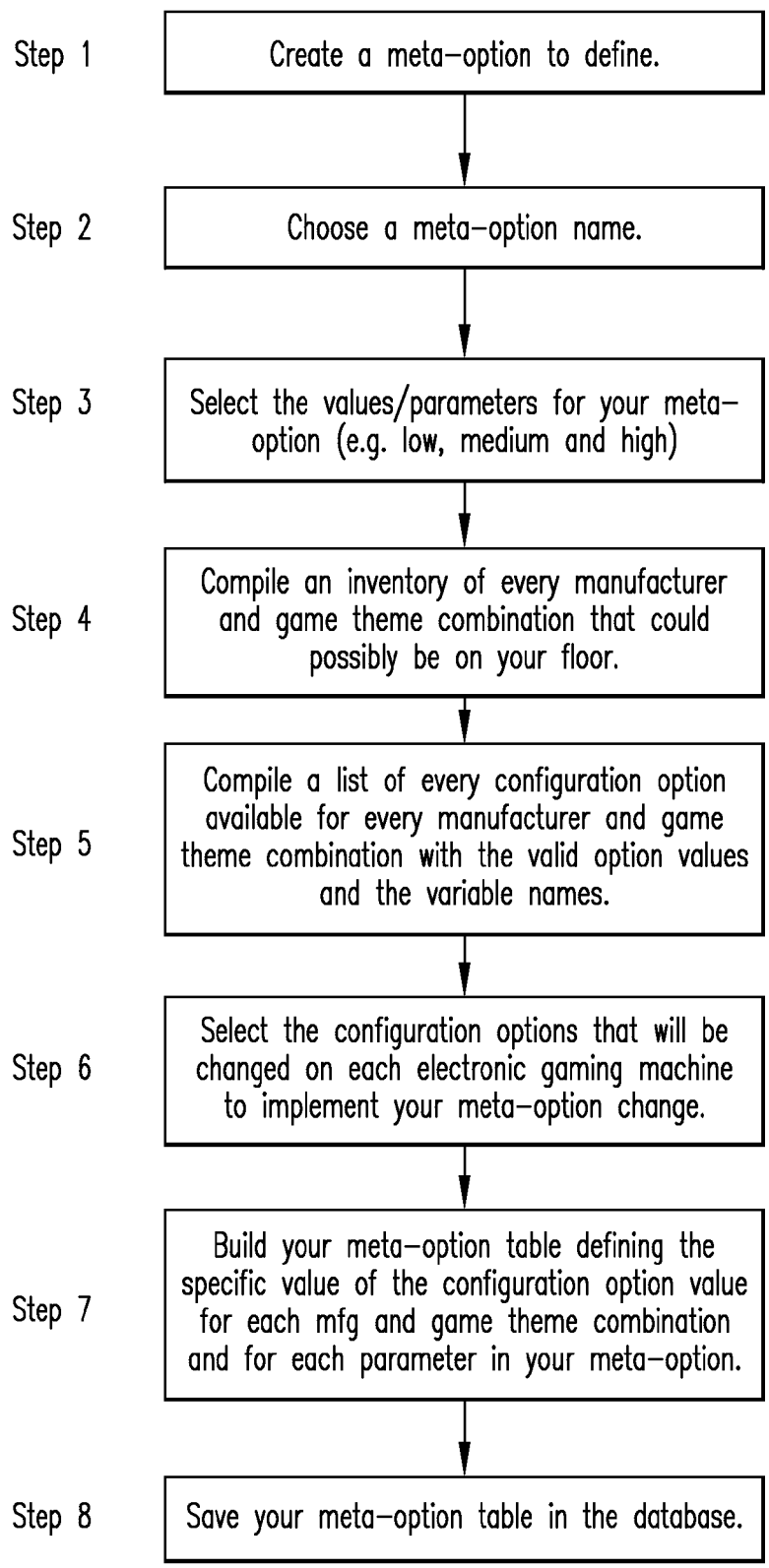
FIG. 17 illustrates an example process for a user for meta-options.

Referring to FIG. 17, a process used by a slot floor director for meta-options.

Step 1: In this step, a meta-option is defined. The meta-option is the change that will be applied to one or more electronic gaming machines. Examples of meta-options are volume level, slot game reel speed, game mix and minimum bet.

Step 2: In this step, the meta-option is named so that it can be referenced in the future.

Step 3: In this step, the values of the meta-option are established. These values are the subjective values of the meta-option. Examples of the meta option values are low, medium and high or slow or fast or % of current value.

Step 4: In this step, an inventory of all possible manufacturer and game theme combination is compiled.

Step 5: In this step, compile a list of all possible configuration options and all valid configuration option values and variable names for each configuration value.

Step 6: In this step, choose which of the specific configuration options will be changed on each electronic gaming machine to achieve the desired change effect. For example, if the meta-option change is to set all volumes to low, the specific configuration option would be game volume. If the meta-option change is to set all game speeds to fast, the specific configuration option would be reel speed. If the meta-option change is to set all minimum bets to high, the specific configuration options would be bets per line and number of lines.

Step 7: In this step, a table is made that cross-references the value of the meta-option (e.g. low, medium and high volume) to the actual configuration option values for each manufacturer and game theme combination. For example, if you have a Bally, Winning Times you would set the game volume to 2.

Step 8: In this step, the table is committed to the database for future use by an application like the profile driven egm configurator.

Figure 18:
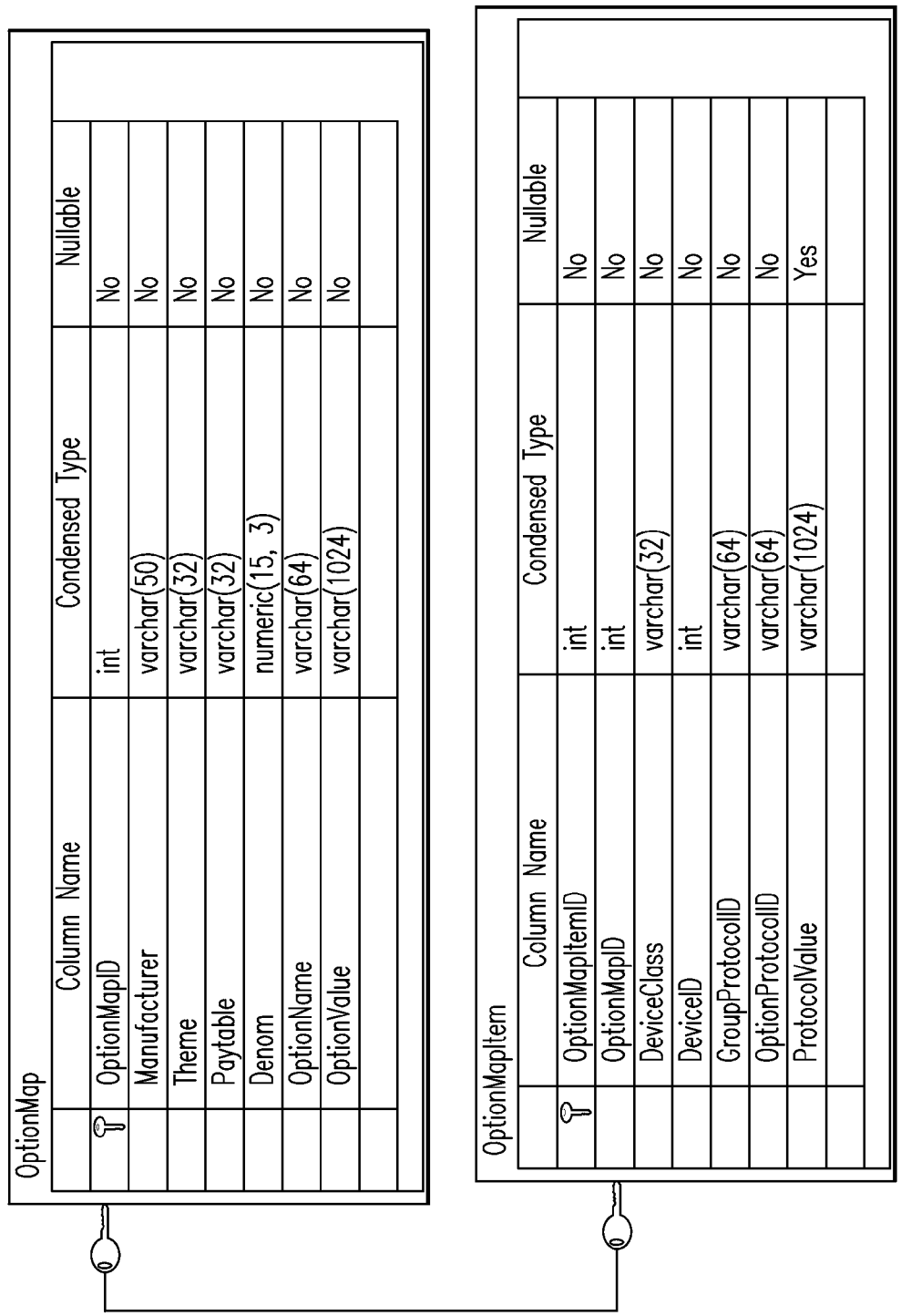
FIG. 18 illustrates a user panel display that may be generated from the meta information in accordance with one or more embodiments.

Referring to FIG. 18, a user panel display is shown that presents the schema in the database for each unique manufacturer and game theme combination.

Download and Configuration Engine for a Gaming System

The DCM Engine is the main component which enables the command and control of the DCM system. Clients command and control the DCM system by consuming/using the API extended by the DCM Engine. This API is exposed to clients via many different protocols (UDP, SOAP, TCP, Named Pipes, custom protocols) which are all callable at the same time. This allows the DCM System to interface with many different systems, technologies and platforms.

It facilitates communication between the G2S Host & DCM system Databases, manages the execution of assignments and their status, and contains most of the system's business logic.

DCM Engine is a Component of SOA architecture which delivers solutions to business agility and with flexibility. Because this service exists independently of one another as well as of the underlying IT infrastructure, they can be combined and reused with maximum flexibility.

DCM Engine's functionality is been made available for access (consumption) by other systems, clients. The goal of the consumption process is to deliver new, dynamic applications that enable increased productivity and enhanced insight into business performance. Users can consume the composed service through a number of avenues, including Web portals, rich clients, various business applications, complex services, or cross-functional business processes.

DCM Engine is well defined by XML messages & invokable Interfaces. Each interaction is independent of each and every other interaction and the interconnect protocols of the communicating devices (i.e., the infrastructure components that determine the communication system do not affect the interfaces). Because interfaces are platform-independent, a client from any device using any operating system in any language can use the service.

Figure 19:
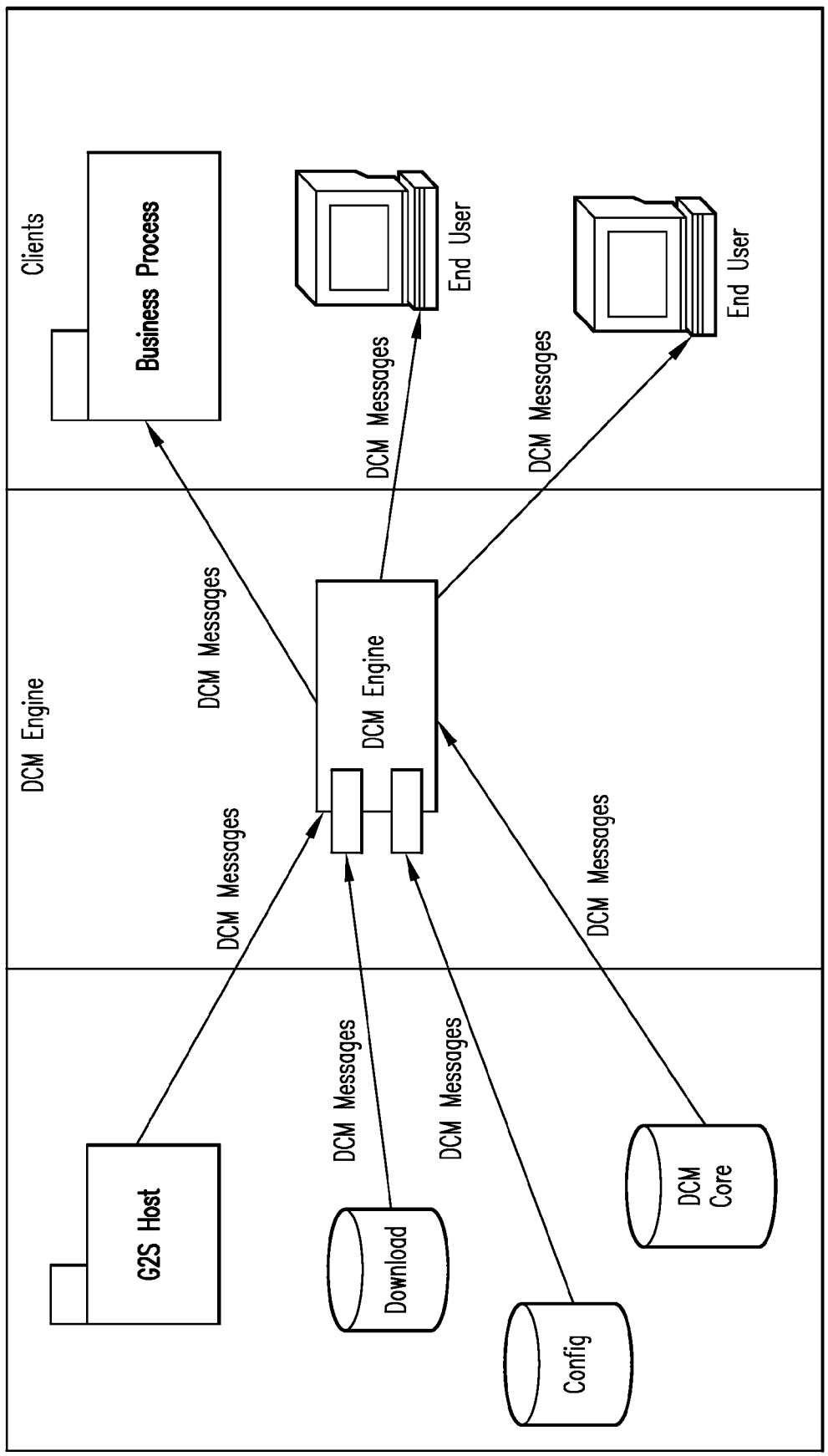
FIG. 19 illustrates a networked system including a DCM engine (server) in accordance with one or more embodiments.

Referring to FIG. 19, a networked system including a DCM engine (server) in accordance with one or more embodiments. DCM Engine runs on a collection of technologies such as SOAP & XML. The interaction between the Communicating system & the DCM Engine is done by XML messages through SOAP protocol. Internally the DCM Engines communicates to the Host of the G2S Protocol & the various databases.

Due to the decoupled nature of the system, the DCM engine needs to maintain DCM system state information during processing and system interactions. It does this by persisting state information using a key/value dictionary. The main purpose and function of the DCM engine state management is to persist and maintain the state of DCM operations even after a communication failure.

The DCM Engine, which runs as a Microsoft Windows service, is able to run by itself on a separate server. This server does not run any G2S Hosts or any Databases. The DCM Engine is physically disconnected from the G2S Host and runs on its own process and connects to the G2S host remotely which runs on its own process. Because of this, there is a need for the DCM engine to maintain state information about the status of the DCM jobs scheduled for the system. Whenever there is a change in the status of a Download, Install or Configuration on any EGMs, the G2S Host gets updated by the EGM through G2S messages. These G2S messages are based on the operations, and when their corresponding messages have been validated, the Status of the various operations is known. These messages are stored to a database by the G2Shosts for persistence (see FIG. 2). Based on the statuses of the operations, the messages get updated on the DCM Message Queue and corresponding databases. From this message queue, the messages are read and, as per the various operations, their corresponding statuses are sent to the end users or the business process which invoked them.

Figure 20:
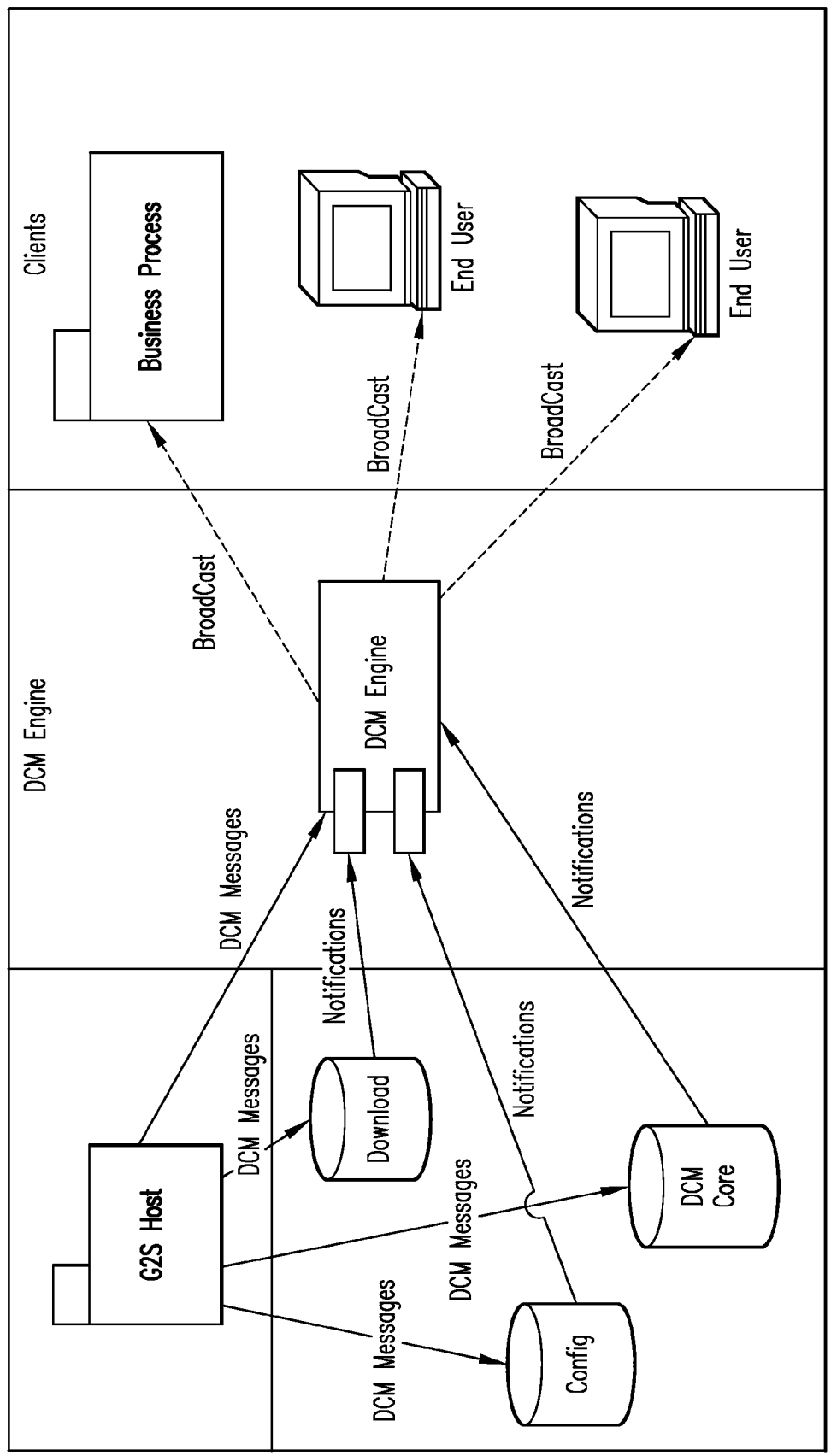
FIG. 20 illustrates networked gaming system.

Referring to FIG. 20, In the case of a power or communication failure, the DCM Engine will not be able to communicate to G2S Hosts. When the power or communication link has been restored, the DCM Engine receives the status notifications from the Database and it's broadcast to the registered end users or business processes in order to update them as to the status of DCM jobs.

The DCM Engine processes each message from the DCM Job status message queue. It identifies the Job ID from the message and gets the Job bundle information from the Database. Then it parses through the Job bundle identifying the next job to be run which is dependant on the on error conditions of the previous job. The Work Flow then calls the JobCreator passing in the new Job ID that has to be executed. This cycle is executed for each job in that bundle until all the jobs are executed.

The DCM Engine offers intelligence which manages multiple client requests to ensure that execution of requests are guaranteed, efficient, and prioritized based on a predetermined priority schedule.

Use of Assignment Templates in a Gaming Configuration and Download System.

Chris Arbogast, Farshid Atashband, Rajesh Swarna

An Assignment Template is a reusable Download and Configuration Manager (DCM) assignment describing what G2S download or configuration options are to be used.

This functionality allows the user of the DCM system to save commonly created assignments as reusable Assignment Templates for later use. This saves time by preventing the user from having to routinely create common assignments. This also reduces the complexity associated with creating assignments with advanced configurations which require additional effort in comparison with common assignments. An assignment template may apply to any download and configuration assignment for any G2S enabled gaming device regardless of the manufacturer.

The following example demonstrates the use of an Assignment Template named 'Fast Reel Speed'. The saved Assignment Template has been reopened and becomes an "assignment under construction". Now changes can be made before it is submitted for approval and executed.

Figure 21:
FIG. 21 illustrates a Graphical User Interface (GUI) display panel is shown where the user gives the assignment a name using an Assignment template.

Referring to FIG. 21, a Graphical User Interface (GUI) display panel is shown where the user gives the assignment a name using an Assignment template so that it can be referred to at a later time.

Figure 22:
FIG. 22 illustrates a GUI display panel enabling a selection of template options that may be set by a user.

Referring to FIG. 22, a GUI display panel allows a user to choose which options will be set by the template. The right side of the GUI is where the user is able to choose which options will be set by the template. Note that the "Protocol Options G2S Options (BAL_OsProtoG2S)" has been removed from the list as compared to the list of options on the left side of the GUI.

Figure 23:
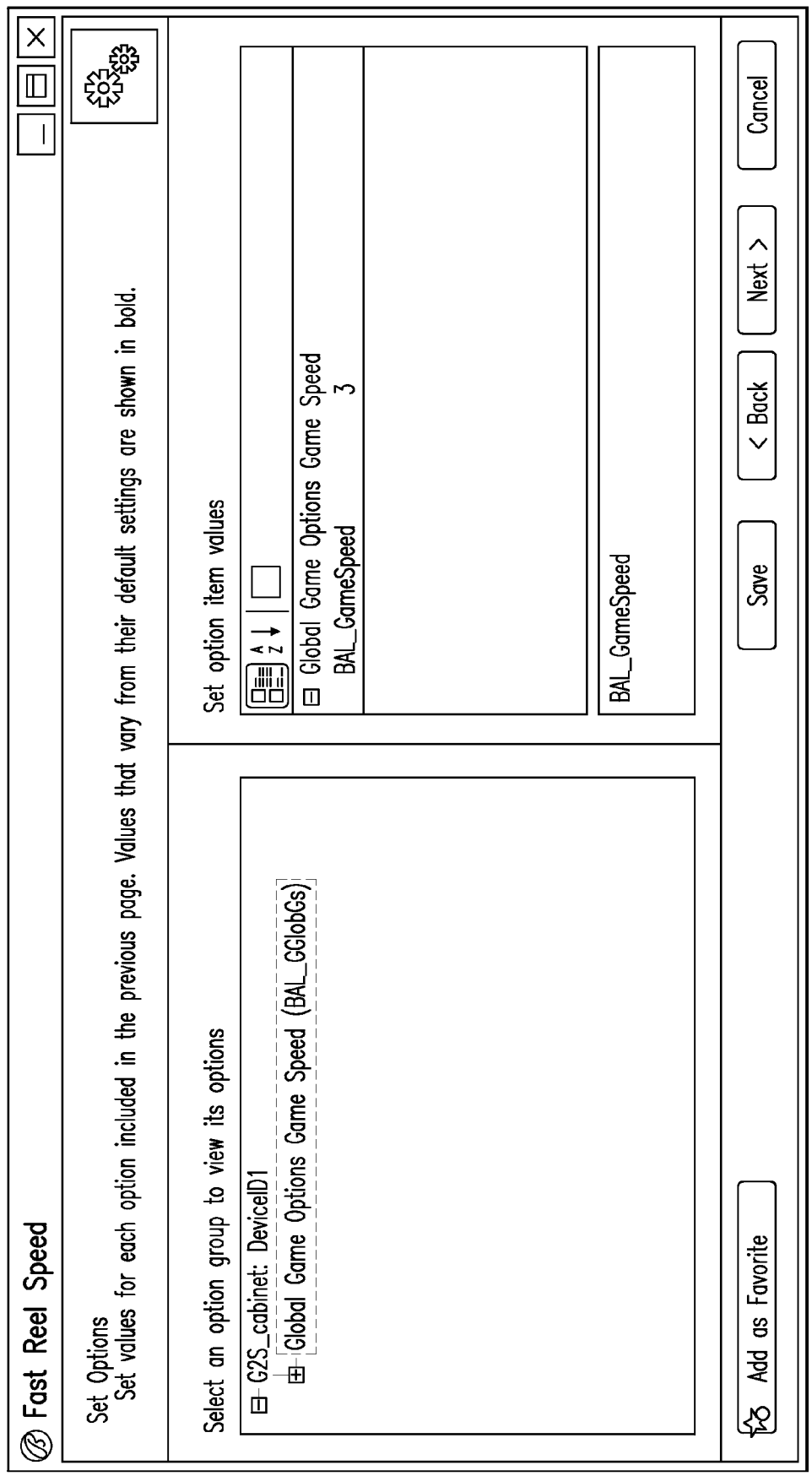
FIG. 23 illustrates a GUI display panel enabling a selection of template options that may be set by a user.

Referring to FIG. 23, a GUI display panel allows the user to change the value for the configuration options which remain in the assignment.

Figure 24:
FIG. 24 illustrates a GUI display panel that shows a completed assignment.

Referring to FIG. 24, a GUI display panel shows the completed assignment as "applied".

Figure 25:
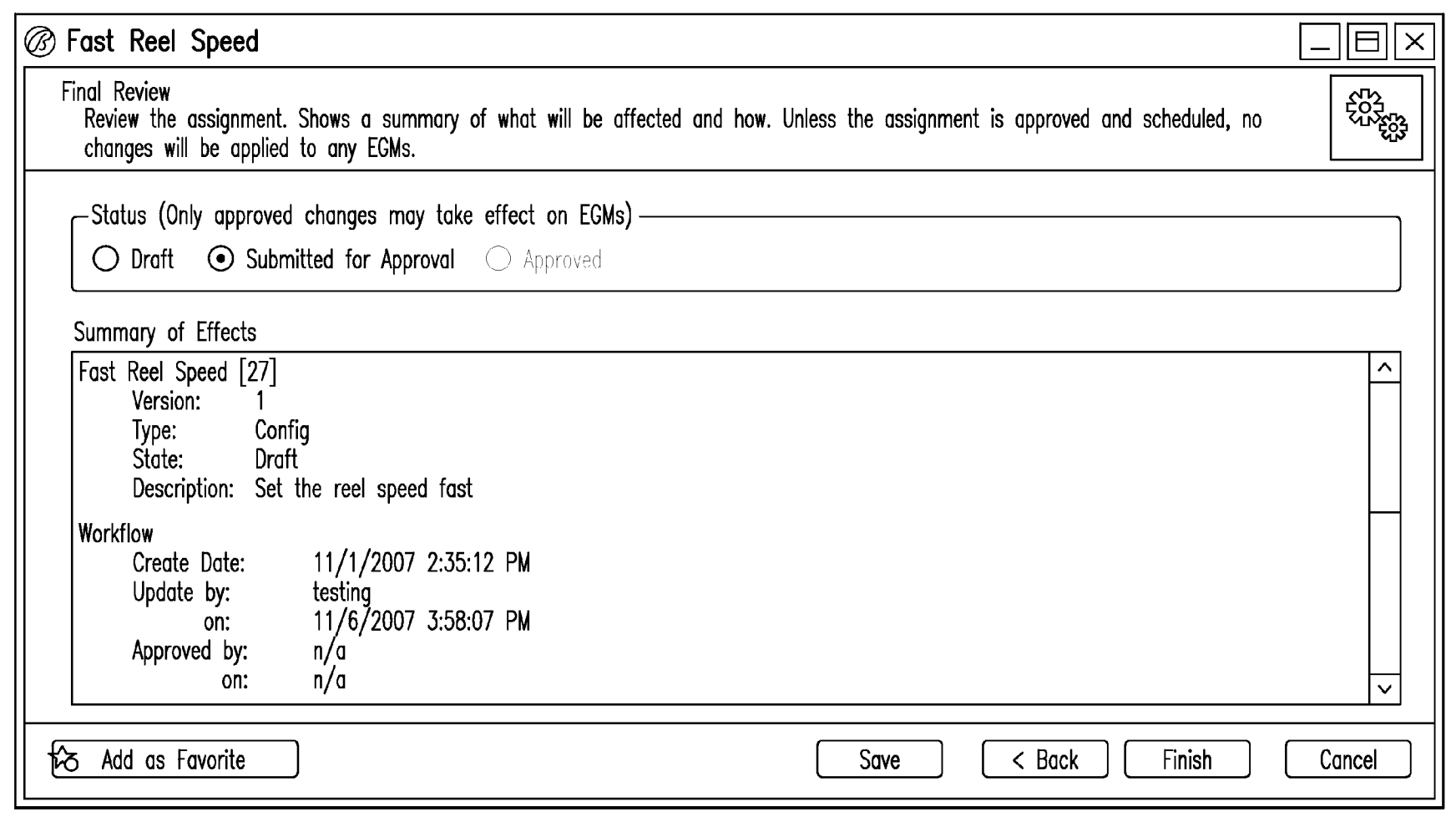

Referring to FIG. 25, a GUI display panel shows the final step which is to review the completed and applied assignment. This step is usually done by a different person from the one who created the assignment.

Another novel feature when scheduling an assignment is that one can make the assignment 'temporary'. This is a mechanism by which a DCM operator can schedule option changes that will be in effect for a limited period of time. When the time expires, the system automatically runs a job to restore the EGM's options to their previous state. This saves the operator from having to schedule two jobs, and also relieves them of the burden of knowing what to do to restore the previous state.

One example of the use of the GUI display panel would be to Configure the attract sound for the Halloween weekend to be 'spooky' across many game themes. When the override expires, the system will restore the sound to each of them correctly without the operator needing to know in each case what that value was. This is accomplished in part by keeping track of each option change the system makes in the DCM engine programming, such as with modules for an Option Item Assigned Value and Configuration.

Assignment Bundle

Figure 26:
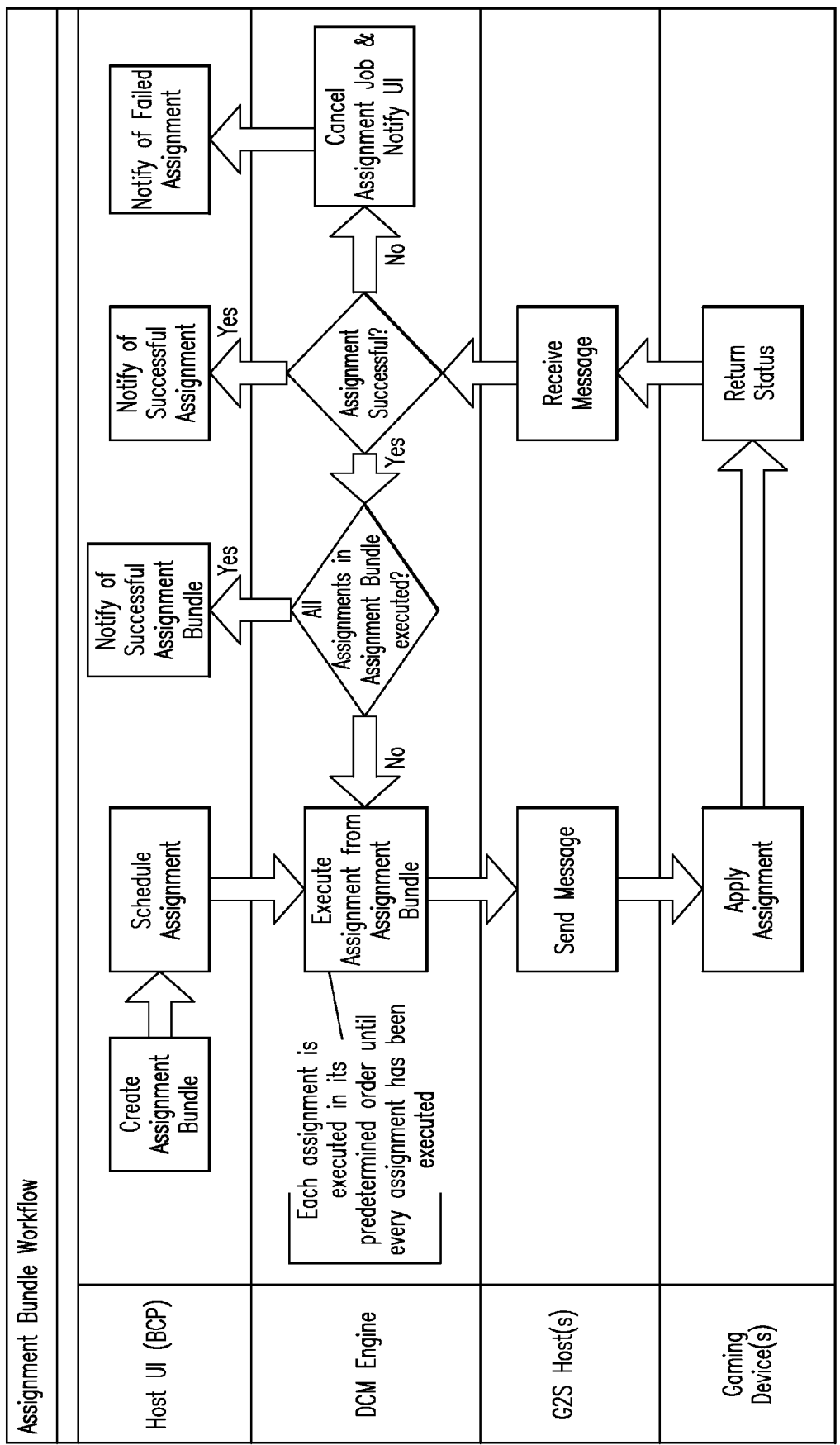
FIG. 26 illustrates an Assignment Bundle Window display panel.

Referring to FIG. 26, an Assignment Bundle window display panel which may be presented at a user console. This feature provides the ability to associate the apply order of various Assignments associated in the particular Assignment Bundle. The user creates an assignment bundle by selecting one or more Assignments like Download, Install & Various Options to be configured be the EGM(s). This feature allows the EGM centric management and serial execution with intelligent success fail logic for such assignments.

This Assignment Bundle can be applied to multiple gaming devices on the floor. Workflow is configured in such way that once the DCM Engine picks up a job from a Queue and it has been processed on the EGM, based on the status of that job, it is intelligent enough to pick the next job from the same Queue to be processed on those EGMS.

User Authorization System

Figure 27:
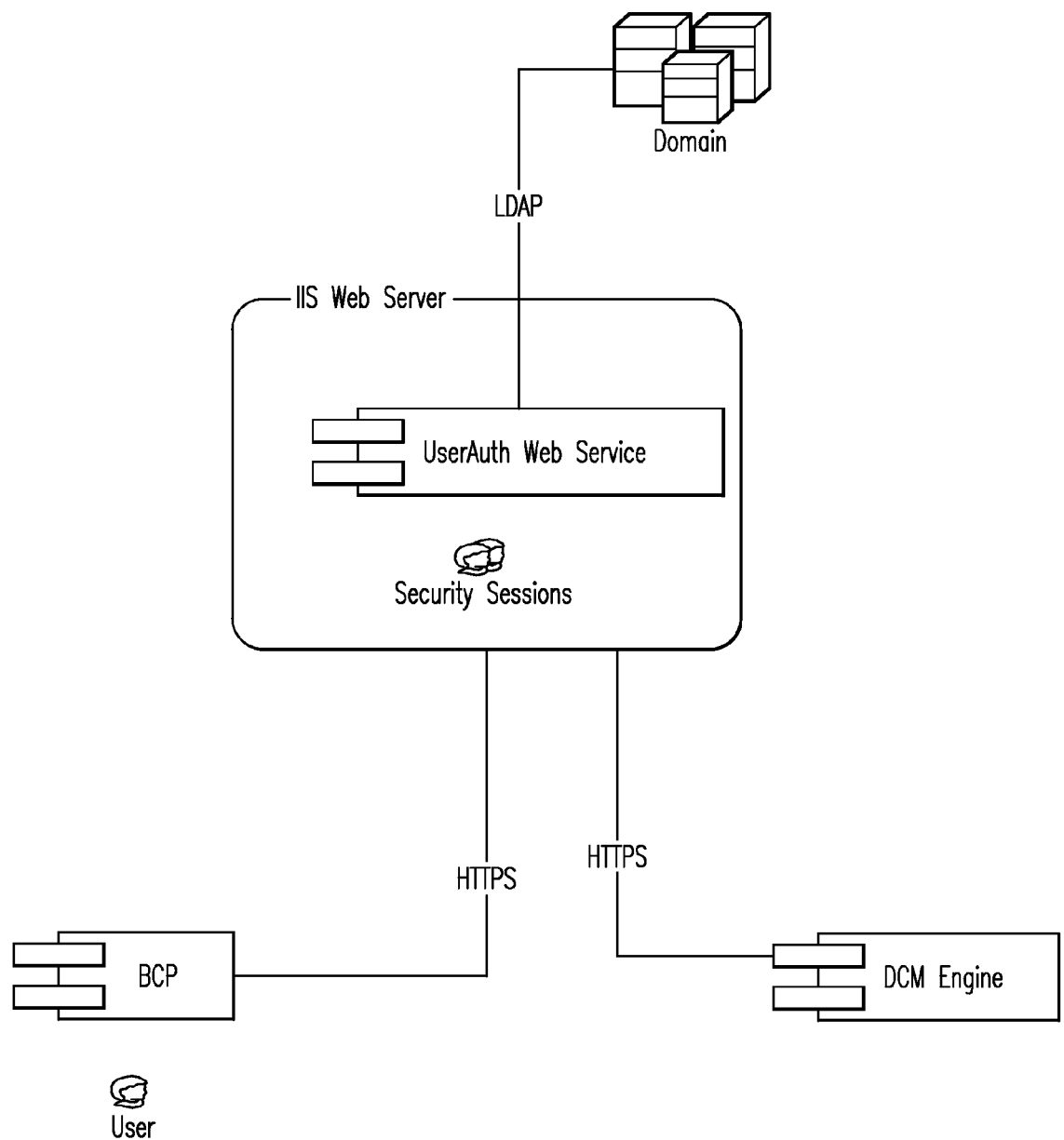
FIG. 27 illustrates a networked gaming system including a DCM engine including a User Authorization Web Service.
Figure 28:
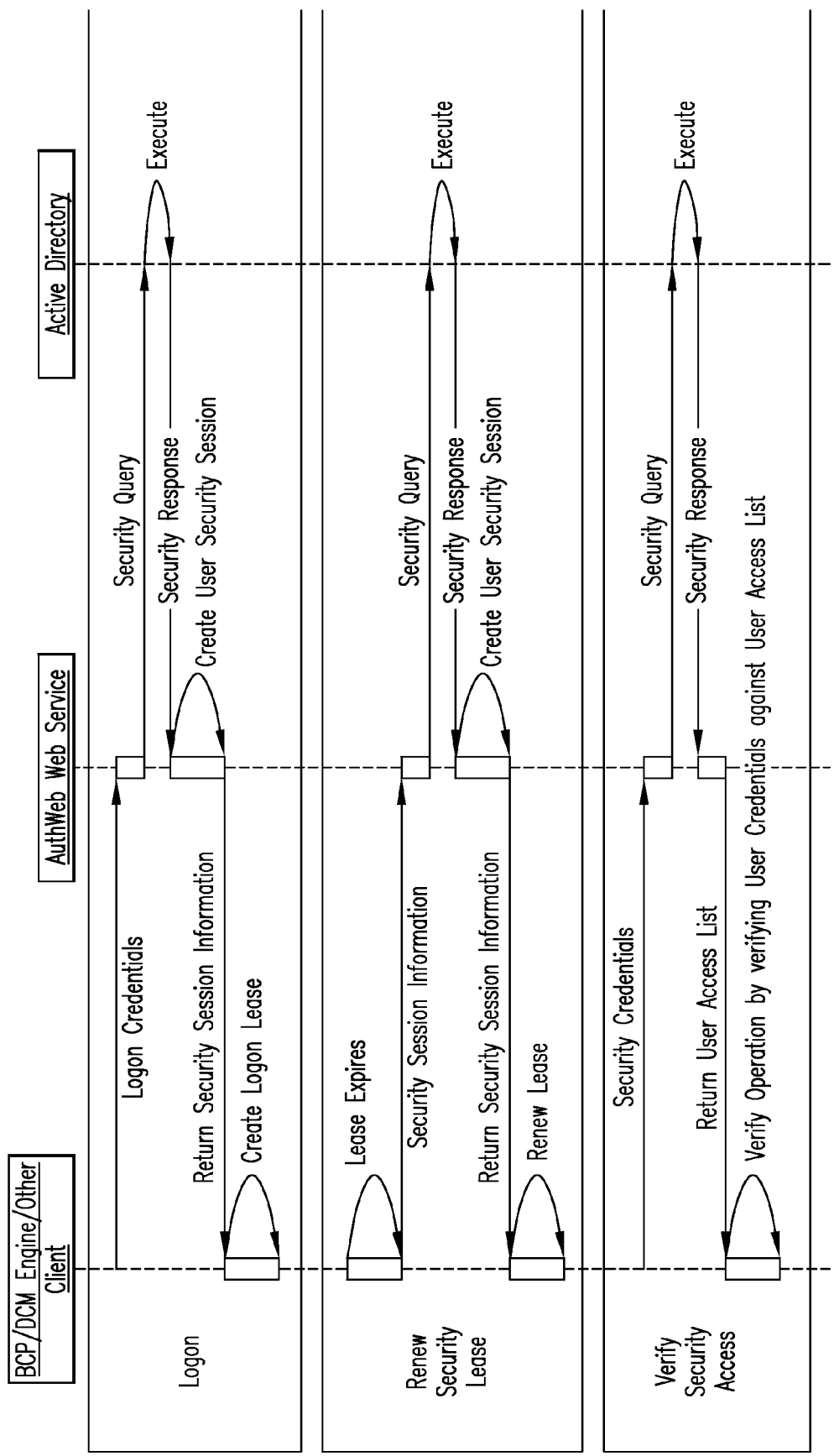
FIG. 28 illustrates a process flow of networked gaming system including a DCM engine including a User Authorization Web Service.

Referring to FIG. 27, a User Authorization System (Authweb) is shown which is a Service Oriented security system. The architecture of this system follows the Service Oriented Architecture (SOA) which offers the advantage of being interoperable with various systems and technologies.

The Client:
1. Defines SoapHeader attribute using "UserAuthHeader", which will be applied to XML web method to process
2. Defines a public attribute—"UserAuthHeader", which contains "UserToken" and "UserName" properties that will be updated by "AuthWeb" during the process. All of properties of "UserAuthHeader" will be checked before the web method is executed for Soap Header validation
3. Assigns operation permission to each web method based on Role-based access policy defined in Authorization store. Before the web method is called, the web method needs to send its operation permission to UserAuthWeb to match the users' permission so as to decide if user has proper rights to run the called web method. The checking process is executed by UserAuthWeb based on users' token, users' operation, and application name.

The AuthWeb:
1. Check operation permission, which is defined by Authorization store, being sent by client applications to make sure if user has proper rights to perform a secured task.
2. Check client application name, users' token, and users' operation.
3. Get users' session from Http runtime cache if user if running there,
4. Check users' session on Logon Credential, which consists of users' name, application name, authority name, user password, terminal name attributes
5. Check users' session on Logon Lease, which consists of Logon Token, session minutes, password expiration time attributes 6. Retrieve specific user account information from active directory
7. Retrieve user account list being defined in active directory
8. Create a new user account inside active directory
9. Reset and change user password inside active directory
10. Enable and disable specific user account inside active directory
11. Lock and unlock specific user account inside active directory
12. Add user account to a specific user group
13. Remove user account from a specific user group
14. Add or delete a computer from active directory organization unit
15. Retrieve operation definitions from authorization store The Interaction:
1. Client web application is using "UserAuthHeader" attribute as Soap Header to define web methods. This attributes contains user logon information that will be updated by AuthWeb using session current runtime cache.
2. AuthWeb retrieves information from both Active Directory and Authorization Store.
3. AuthWeb compares user session information on logon credential and logon lease to make sure if current user has enough rights and permissions to run requested secured operations being defined by authorization store policy.

The User Authorization System offers a single role based authorization security solution for multiple systems, platforms, and technologies.

Figure 29:
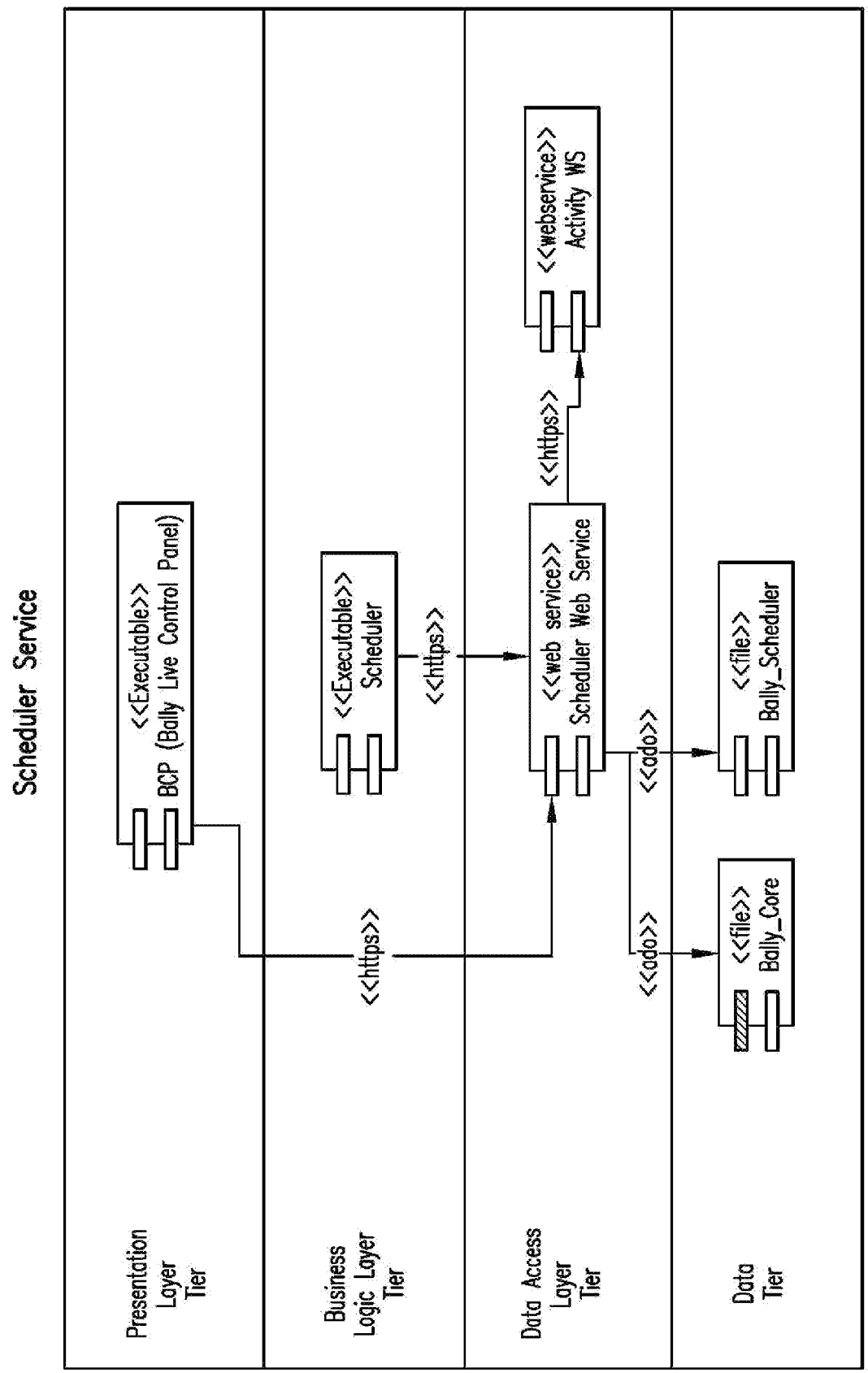
FIG. 29 illustrates a scheduler service in a gaming network.

Referring to FIG. 29, an example block diagram of a scheduler service is shown. The Scheduler (Scheduler Service) may be implemented as an executable program. There are two types of Scheduling: Download Scheduling and Config Scheduling.

Configuration assignments may be run in order by schedule type: Permanent, Permanent with start date, Re-occurring Override, One Time Override. Within a schedule type, the assignment with the earlier start date may be initiated first. Within matching start dates, assignments having static collections may be initiated before dynamic; if still tied, those assignments with earlier create dates may be initiated first. Configuration assignments of permanent and permanent with start date may only contain static collections.

Download Scheduling gets the start date that download process begins. It may take an indeterminate amount of time for the downloaded package to be ready to be installed on a given EGM. Also, to avoid download conflict, if multiple download assignments exist for the same module type on an EGM, the assignment with the latest creation date takes precedence.

The Scheduler may be reliant upon the Schedule database. An example Scheduler Composition may include:
  Subcomponent Description
  Error Handlers Process and gracefully handle exceptions
  Logging Output of event and diagnostics
  Example Interactions may include:
  Scheduler listens to Schedule database
  Scheduler interacts with Schedule Web service The Web Service may require a Windows Server version 2000 or 2003 (hereby incorporated by reference) with the following Windows components running:
  .net Framework version 2.0
  Internet Information Server (IIS)

Processing—The Scheduler Service may query the Schedule database for jobs that are scheduled to be run. The Scheduler may initiate the processing of the jobs by notifying the GUI Download Web Service or the GUI Configuration Web Service.

Interface/Exports—The Scheduler Service may consume the Activity Web Service to log its processing events. It also interacts with the Schedule SQL database with ActiveX Data Objects (ADO) commands.

Figure 30:
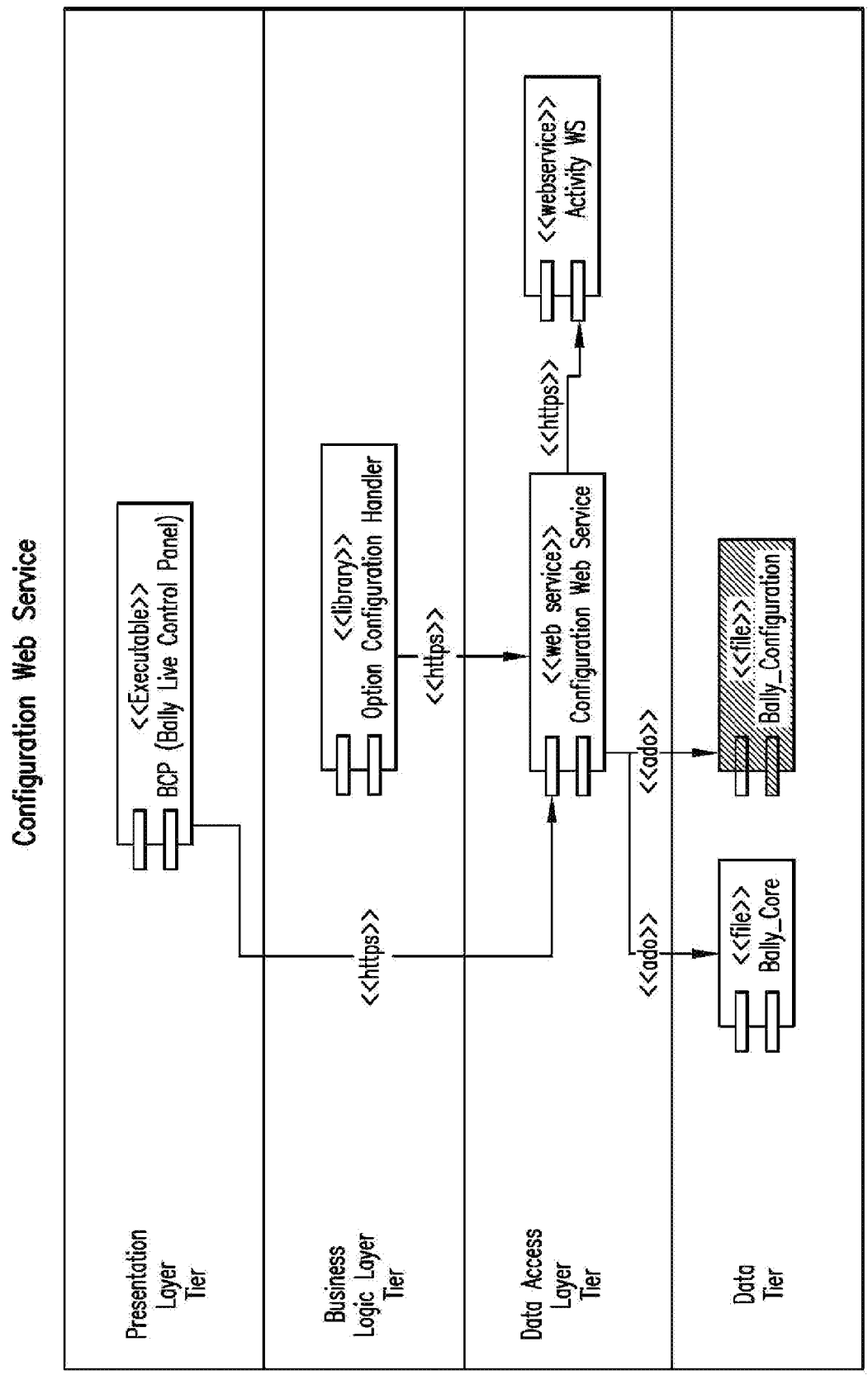
FIG. 30 illustrates a configuration web service in a gaming network.

Referring to FIG. 30, an example block diagram of a user interface download Web service is shown.

Classification—Web Service

Definition—The purpose of this Web Service is to expose Web Methods to consuming components to allow the interaction with the Download database. The data access logic required for the BCP to interact with the Download database may be contained within the Download Web Service.

The GUI Download Web Service may responsible for interacting with the Data Tier for those components that are consuming its exposed methods.

The BCP will consume this Web Service and utilize its Web Methods to create and read necessary Download data in the database.

The intent is for the GUI Download Web Service to be used explicitly by the BCP as communication layer with the Download database.

Example Constraints may include:
Consuming components will need to communicate via the Simple Object Access Protocol (SOAP) in order to consume the Web Service The Web Service will publish a Web Service Description Language (WSDL) to describe the Web service, the message format and protocol details.

The Web Service will return its requested results in the form of a Serialized DataSet.

An example Composition may include:

| Subcomponent | Description |
| --- | --- |
| SOAP Proxy | Communication |
| Data Access Handlers | Process requests made by consuming components by communicating with the database with ActiveX Data Objects (ADO) logic |
| Error Handlers | Process and gracefully handle exceptions |
| Logging | Output of event and diagnostics |

Example Interactions may include:
The GUI Download Web Service may interact specifically with the Control Panel (BCP) via Simple Object Access Protocol (SOAP).

The GUI Download Web Service may interact with the Download SQL database with ActiveX Data Objects (ADO) logic.

The Web Service may require a Windows Server version 2000 or 2003 with the following Windows components running:
  .net Framework version 2.0
  Internet Information Server (IIS)

Processing—The GUI Download Web Service may process requests made by consuming components. The requests are made by the consuming component calling the GUI Download Web Services exposed Web Methods. A successfully request is dependent upon the consuming component calling a Web Method by supply the appropriate query parameters as dictated by the Web Service Description Language (WSDL) file. The Web Service processes the request by executing its embedded Business Logic while logging exceptions and events. The resulting output is returned to the consuming component.

Interface/Exports

The GUI Download Web Service may consume the Activity Web Service to log its processing events. It also interacts with the Download SQL database with ActiveX Data Objects (ADO) commands. Its capabilities are exposed as Web Methods which are accessed via the Simple Object Access Protocol (SOAP).

While the example embodiments have been described with relation to a gaming environment, it will be appreciated that the above concepts can also be used in various non-gaming environments. For example, such rewards can be used in conjunction with purchasing products, e.g., gasoline or groceries, associated with vending machines, used with mobile devices or any other form of electronic communications. Accordingly, the disclosure should not be limited strictly to gaming.

The foregoing description, for purposes of explanation, uses specific nomenclature and formula to provide a thorough understanding of the invention. It should be apparent to those of skill in the art that the specific details are not required in order to practice the invention. The embodiments have been chosen and described to best explain the principles of the invention and its practical application, thereby enabling others of skill in the art to utilize the invention, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 60/987,338, filed Nov. 12, 2007, are incorporated herein by reference, in their entirety. Aspects of the embodiments can be modified, if necessary to employ concepts of the various patents, applications and publications to provide yet further embodiments.

What is claimed is:

1. A computer-implemented method in a gaming machine for locating one or more of a plurality of gaming machine resources, comprising:
   receiving from a domain name server, by one or more configured computing devices, an indication of a specified directory service;
   sending, by the one or more configured computing devices, a query to the indicated directory service to provide information for accessing an available gaming resource, the resource being a database or a web service;
   receiving from the indicated directory service, by the one or more configured computing devices and based on the query, a response specifying a server that is available for handling requests to access the gaming resource and providing access information that includes one or more authentication parameters for accessing the gaming resource, the one or more authentication parameters being part of a directory services server entry that includes parameters for accessing the named gaming resource; and
   accessing, by the one or more configured computing devices, the gaming resource through the specified server using the provided information.

2. The computer-implemented method of claim 1 wherein the domain name server is a DNS server configured using DHCP (Dynamic Host Configuration Protocol).

3. The computer-implemented method of claim 1 wherein the indicated directory service is at least one of an LDAP or Active Directory service.

4. The computer-implemented method of claim 1 wherein the specified server that is available for handling requests received in response to the query is determined based upon a location of the gaming machine.

5. The computer-implemented method of claim 1 wherein the specified server that is available for handling requests received in response to the query is determined based upon server availability and load of one or more possible servers having access to the named gaming resource.

6. The computer-implemented method of claim 1 wherein the specified server is determined based upon a version of software that is running on one or more possible servers having access to the named gaming resource.

7. The computer-implemented method of claim 1 wherein the specified server is determined based upon a version of protocol that is available on one or more possible servers having access to the named gaming resource.

8. The computer-implemented method of claim 1 wherein the specified server is determined based upon a location of one or more possible servers having access to the named gaming resource.

9. The computer-implemented method of claim 1 wherein the specified server is used for testing.

10. The computer-implemented method of claim 1 wherein the specified server is a substitute for a server no longer available.

11. A non-transitory computer-readable medium containing content that, when executed, configures a computing system to perform a method comprising:
   determining, by the configured computing system and using a DNS server, an indicator of a specified directory services server available from a casino property;
   querying, by the configured computing system, the indicated directory services service to retrieve information for accessing a named gaming resource available from the casino property, the resource being a database or a web service;
   receiving from the indicated directory services server, by the configured computing system, a response that indicates a server to be used to access the named gaming resource and that indicates information including one or more authentication parameters for accessing the server and/or the resource, the one or more authentication parameters being part of a directory services server entry that includes parameters for accessing the named gaming resource; and
   accessing, by the configured computing system, the named gaming resource through the indicated server using the indicated information.

12. The non-transitory computer-readable medium of claim 11 wherein the medium is a memory of the configured computing system.

13. A system for managing access to a plurality of gaming resources, the system comprising:
   one or more directory services servers each configured to return, in response to a request for access to a gaming resource, an indication of one of a plurality of servers having access to the gaming resource and an indication of access information for accessing the gaming resource, the indication of the access information including one or more authentication parameters for accessing the gaming resource that are part of a directory services server entry;

one or more domain name servers each configured to identify one of the one or more directory services servers and return an indication of the identified directory services server; and one or more gaming machines each configured to query at least one of the domain name servers to obtain the indication of the identified directory services server and to query the identified directory services server for access to the gaming resource.

14. The system of claim 13 wherein the gaming resource is a web service, a database, or an activity related resource.

15. The system of claim 13 wherein at least one of the one or more directory services servers is an LDAP server.

16. The system of claim 13 wherein at least one of the one or more directory services servers is an Active Directory service server.

17. The system of claim 13 wherein at least one of the directory services servers is further configured to dynamically determine the one server based at least in part upon a location of a gaming machine from which the request for access to the gaming resource was received.

18. The system of claim 13 wherein at least one of the directory services servers is further configured to dynamically determine the one server based at least in part upon a determined location of the one server.

19. The system of claim 13 wherein at least one of the directory services servers is further configured to dynamically determine the one server based at least in part upon a version of software residing on the one server.

20. The system of claim 13 wherein the indicated access information includes login or authentication parameters for the gaming resource.

21. The system of claim 13 wherein the domain name server is configured to identify the one directory service server based at least in part upon availability or load parameters of the one of the directory service servers.

22. The system of claim 13 wherein the domain name server is configured to identify the one directory service server based at least in part upon staged deployment of the directory service servers.

* * * * *